(12) United States Patent
Combs et al.

(10) Patent No.: US 12,286,758 B2
(45) Date of Patent: Apr. 29, 2025

(54) RAIL TIE PLATE SINGULATING AND ORIENTING MACHINE

(71) Applicant: Herzog Railroad Services, Inc., St. Joseph, MO (US)

(72) Inventors: Matthew L. Combs, Agency, MO (US); Daniel L. Wilcoxson, Savannah, MO (US); Alex Jensen, Fort Worth, TX (US)

(73) Assignee: Herzog Railroad Services, Inc., St. Joseph, MO (US)

( * ) Notice: Subject to any disclaimer, the term of this patent is extended or adjusted under 35 U.S.C. 154(b) by 70 days.

(21) Appl. No.: 18/462,131

(22) Filed: Sep. 6, 2023

(65) Prior Publication Data
US 2024/0084518 A1 Mar. 14, 2024

Related U.S. Application Data

(60) Provisional application No. 63/480,076, filed on Jan. 16, 2023, provisional application No. 63/375,131, filed on Sep. 9, 2022.

(51) Int. Cl.
*E01B 29/32* (2006.01)
*B65G 47/12* (2006.01)
(Continued)

(52) U.S. Cl.
CPC .......... *E01B 29/32* (2013.01); *B65G 47/12* (2013.01); *B65G 47/1492* (2013.01);
(Continued)

(58) Field of Classification Search
CPC ..... E01B 29/32; B65G 47/12; B65G 47/1492; B65G 47/244; B65G 47/256; B65G 47/68
See application file for complete search history.

(56) References Cited

U.S. PATENT DOCUMENTS 1,048,748 A 12/1912 Seaman
3,943,858 A 3/1976 Dieringer et al.
(Continued)

FOREIGN PATENT DOCUMENTS

WO 2020006066 A1 1/2020

OTHER PUBLICATIONS

Admitted prior art comprising a still image from a video published on YouTube at youtube.com/watch?v=baxGrANg1WM at least as early as Mar. 26, 2015 by StreamTech Engineering, LLC showing of a singluating conveyor.

*Primary Examiner* — Zachary L Kuhfuss
(74) *Attorney, Agent, or Firm* — AVEK IP, LLC; Kent R. Erickson

(57) ABSTRACT

A rail tie plate singulating machine comprises a lift conveyor sloping upward and adjacent to a singulating conveyor. The lift conveyor extends below the singulating conveyor from a lift conveyor inlet end to a y-axis intercept between the conveyors and above the singulating conveyor past the y-axis intercept. A transfer guide extending above the lift conveyor redirects rail tie plates laterally off the lift conveyor onto the singulating conveyor past the y-axis intercept. A singulating guide extending in spaced relation above the singulating conveyor redirects tie plates thereon toward an edge adjacent the lift conveyor in a spacing that allows rail tie plates oriented longitudinally to advance therealong. A driven roller supported over the reduced width section engages a rail tie plate supported on top of another rail tie plate to advance the engaged rail tie plate laterally onto the lift conveyor.

18 Claims, 31 Drawing Sheets

(51) Int. Cl.
*B65G 47/14* (2006.01)
*B65G 47/244* (2006.01)
*B65G 47/256* (2006.01)
*B65G 47/68* (2006.01)

(52) U.S. Cl.
CPC ......... *B65G 47/244* (2013.01); *B65G 47/256* (2013.01); *B65G 47/68* (2013.01)

(56) References Cited

U.S. PATENT DOCUMENTS

| | | |
|---|---|---|
| 4,241,663 A | 12/1980 | Lund et al. |
| 4,280,613 A | 7/1981 | Stewart |
| 4,691,639 A | 9/1987 | Holley |
| 4,727,989 A | 3/1988 | Cotic et al. |
| 4,907,686 A | 3/1990 | Cotic |
| 4,909,375 A | 3/1990 | Cotic et al. |
| 4,942,822 A | 7/1990 | Cotic |
| 4,974,518 A | 12/1990 | Cotic et al. |
| 5,067,412 A | 11/1991 | Theurer et al. |
| 5,275,051 A | 1/1994 | Beer |
| 5,331,899 A | 7/1994 | Holley |
| 5,487,341 A | 1/1996 | Newman et al. |
| 5,655,455 A | 8/1997 | Smith |
| 5,671,679 A | 9/1997 | Straub et al. |
| 5,722,325 A | 3/1998 | Glomski et al. |
| 5,904,098 A | 5/1999 | Theurer et al. |
| 6,158,353 A | 12/2000 | Theurer |
| 6,301,763 B1 | 10/2001 | Pryor |
| 6,317,953 B1 | 11/2001 | Pryor |
| 6,807,909 B1 | 10/2004 | Coots |
| 7,386,367 B2 | 6/2008 | Watanabe et al. |
| 7,497,166 B2 | 3/2009 | Fuerst et al. |
| 7,658,152 B2 | 2/2010 | Brenny et al. |
| 7,827,916 B2 | 11/2010 | Coots, Jr. |
| 8,042,473 B2 | 10/2011 | Buckley et al. |
| 8,070,409 B2 | 12/2011 | Burke et al. |
| 8,082,852 B2 | 12/2011 | Plyler et al. |
| 8,132,512 B2 | 3/2012 | Helmick |
| 8,166,883 B1 | 5/2012 | Coots |
| 8,171,855 B2 | 5/2012 | Noll et al. |
| 8,220,397 B2 | 7/2012 | Sperling |
| 8,316,774 B1 | 11/2012 | Coots |
| 8,326,460 B2 | 12/2012 | Ban et al. |
| 8,365,673 B2 | 2/2013 | Plyler et al. |
| 8,443,733 B2 | 5/2013 | Coots |
| 8,468,948 B2 | 6/2013 | Delmonico et al. |
| 8,474,597 B2 | 7/2013 | Pier et al. |
| 8,528,484 B2 | 9/2013 | Helmick |
| 8,534,195 B2 | 9/2013 | Noll et al. |
| 8,625,878 B2 | 1/2014 | Haas et al. |
| 8,724,904 B2 | 5/2014 | Fujiki et al. |
| 8,954,183 B2 | 2/2015 | Kayani et al. |
| 9,016,208 B2 | 4/2015 | Coots |
| 9,036,025 B2 | 5/2015 | Haas et al. |
| 9,038,542 B2 | 5/2015 | Coots |
| 9,047,668 B2 | 6/2015 | Haas et al. |
| 9,050,984 B2 | 6/2015 | Li et al. |
| 9,156,623 B1 | 10/2015 | Buzdum |
| 9,260,122 B2 | 2/2016 | Haas et al. |
| 9,428,867 B2 | 8/2016 | Harman et al. |
| 9,441,956 B2 | 9/2016 | Kainer et al. |
| 9,745,132 B2 | 8/2017 | Coots et al. |
| 9,745,150 B2 | 8/2017 | Coots et al. |
| 9,752,286 B2 | 9/2017 | Coots et al. |
| 10,094,071 B2 | 10/2018 | Coots et al. |
| 10,112,215 B1 | 10/2018 | Coots |
| 10,427,876 B2 | 10/2019 | Coots et al. |
| 10,487,458 B2 | 11/2019 | Harman et al. |
| 10,745,208 B1 | 8/2020 | Coots |
| 11,136,726 B1 | 10/2021 | Coots |
| 11,572,660 B2 * | 2/2023 | Coots ................ E01B 29/24 |
| 11,668,054 B2 * | 6/2023 | Helmick ............ B65G 47/244 104/2 |
| 2011/0113981 A1 | 5/2011 | Coots |
| 2011/0146527 A1 | 6/2011 | Plyler et al. |
| 2011/0100248 A1 | 10/2011 | Buckley et al. |
| 2011/0239893 A1 | 10/2011 | Delmonico et al. |
| 2011/0274232 A1 | 11/2011 | Doll |
| 2011/0301741 A1 | 12/2011 | Kayani et al. |
| 2012/0192756 A1 | 8/2012 | Miller et al. |
| 2012/0204752 A1 | 8/2012 | Helmick |
| 2012/0204753 A1 | 8/2012 | Noll et al. |
| 2012/0209415 A1 | 8/2012 | Casanelles et al. |
| 2012/0240811 A1 | 9/2012 | Pier et al. |
| 2013/0247793 A1 | 9/2013 | Coots |
| 2014/0260643 A1 | 9/2014 | Delmonico |
| 2016/0249040 A1 | 8/2016 | Mesher |
| 2019/0382962 A1 | 12/2019 | Coots |
| 2020/0131713 A1 | 4/2020 | Sperling et al. |
| 2020/0131714 A1 | 4/2020 | Sperling et al. |
| 2020/0131715 A1 | 4/2020 | Sperling et al. |
| 2020/0141065 A1 | 5/2020 | Coots |
| 2020/0332475 A1 | 10/2020 | Harman et al. |
| 2021/0269986 A1 | 9/2021 | Helmick |
| 2022/0010499 A1 | 1/2022 | Coots |
| 2023/0183925 A1 * | 6/2023 | Coots ................ E01B 29/32 198/382 |
| 2024/0125053 A1 * | 4/2024 | Coots .............. B65G 47/244 |
| 2024/0150969 A1 * | 5/2024 | Combs ............ E01B 29/32 |
| 2024/0150973 A1 * | 5/2024 | Combs ............ B65G 15/12 |
| 2024/0150974 A1 * | 5/2024 | Combs ............ B65G 47/252 |

* cited by examiner

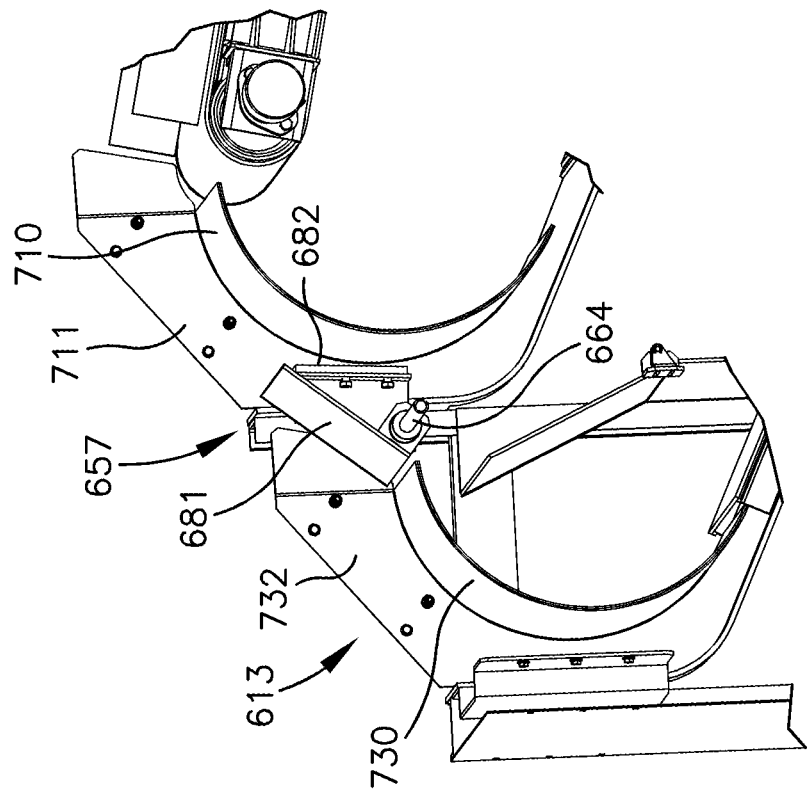
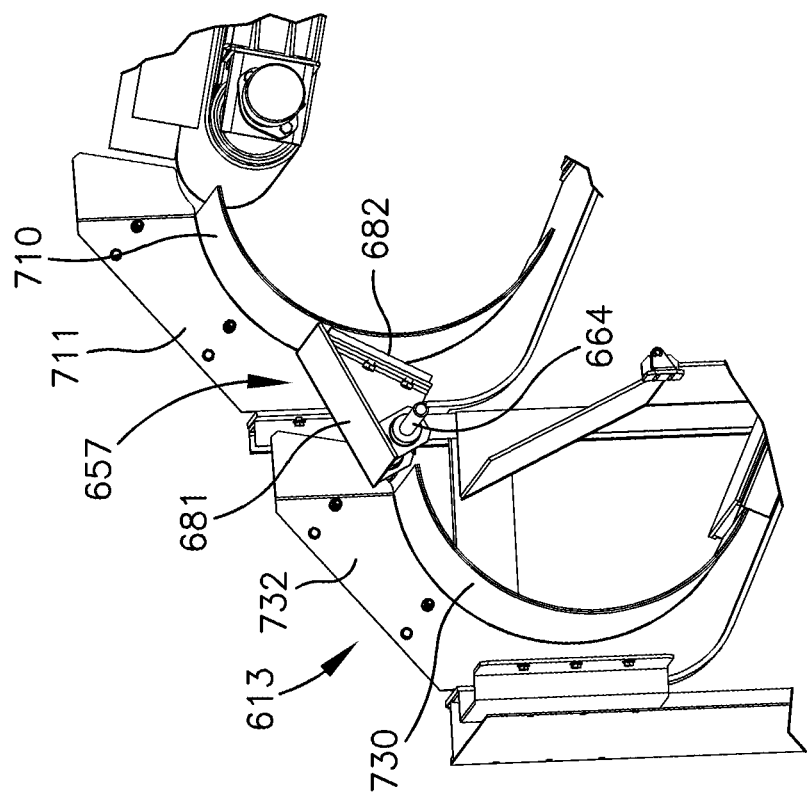

RAIL TIE PLATE SINGULATING AND ORIENTING MACHINE

CROSS-REFERENCE TO RELATED APPLICATIONS

This application claims the benefit of U.S. Provisional Patent Application Ser. No. 63/375,131, entitled RAIL TIE PLATE SINGULATING AND ORIENTING MACHINE, filed Sep. 9, 2022 and this application claims the benefit of U.S. Provisional Patent Application Ser. No. 63/480,076, filed Jan. 16, 2023, the disclosures of which are incorporated herein in their entirety by reference.

BACKGROUND OF THE INVENTION

Field of the Invention

This invention relates to machines for singulating and orienting rail tie plates for distribution along a section of track of a railroad.

Background

Rail tie plates 10 are used to connect a rail 11 to a railroad tie or crosstie 12 and are typically made of iron or steel. A tie plate 10 provides a proper cant to the rail and distributes the load transferred through the rail 11 to the crosstie 12 over a larger area to protect the crosstie 12 against undue wear. An example of a conventional, double shoulder rail tie plate 10 is shown in FIGS. 1 and 2. A section of railroad track having rails 11 secured to crossties 12 by tie plates 10 is shown in FIG. 5. The tie plate 10 is rectangular and includes a generally planar, rectangular bottom surface 14 with a pair of shoulders 15 and 16 extending upward from an upper surface 17 of the tie plate 10 transverse to a longitudinal axis of the tie plate 10. The shoulders 15 and 16 are spaced apart a distance between which the base of the rail 11 will fit.

In the embodiment of the tie plate 10 shown, the upper surface 17 of the tie plate 17 slopes upward from shoulder 15 to shoulder 16 to provide the desired cant to a rail 11 secured thereto between shoulders 15 and 16. The portion of the tie plate 10 extending outward from the shoulder 15, which may be referred to as the short end 18, is shorter in length than the portion of the tie plate 10 extending outward from the shoulder 16, which may be referred to as the long end 19. The height of shoulder 15 relative to the bottom surface 14 is lower than the height of shoulder 16 relative to the bottom surface 14.

Railroad ties 12 are occasionally replaced due to wear. After a tie 12 is replaced, tie plates 10 are provided between the rail 11 and the tie 12 so that the rail 11 may be properly secured to the tie 12. Additionally, it is desirable, at times, to replace tie plates 10 during the same procedure that rail 11 is replaced. A variety of machines or systems have been developed for singulating a plurality of rail tie plates 10, orienting the rail tie plates 10 in desired orientation and then discharging the properly oriented tie plates 10 on selected rail ties 12. There remains a need for a rail tie plate singulating and distribution system having means for consistently providing a continuous supply of singulated rail tie plates 10 to equipment for properly orienting and distributing the rail tie plates 10 individually onto cross-ties along a section of track and at a desired rate.

SUMMARY OF THE DISCLOSED EMBODIMENTS

A rail tie plate singulating machine for singulating a plurality of rail tie plates comprises a singulating conveyor to which ties plates may be fed from a lift conveyor. A rail tie plate orientation and distribution assembly for orienting and distributing the plurality of rail tie plates along a section of track of a railroad comprises a rail tie plate flipping assembly, a rail tie plate quarter turn assembly, and a distribution assembly.

The lift conveyor includes a lift conveyor run sloping upward from a lift conveyor inlet end toward a lift conveyor distal end. The singulating conveyor extends adjacent the lift conveyor and includes a singulating conveyor run extending from a singulating conveyor distal end to a singulating conveyor outlet end. An inner edge of the singulating conveyor extends longitudinally adjacent an outer edge of the lift conveyor. The lift conveyor run extends below the singulating conveyor run from the lift conveyor inlet end to a y-axis intercept between the lift conveyor run and the singulating conveyor run and the lift conveyor run extends at least level with or above the singulating conveyor run from the y-axis intercept to the lift conveyor distal end.

A conveyor transfer guide extends in spaced relation above the lift conveyor run in a spacing less than the height of a rail tie plate supported on the lift conveyor run. The conveyor transfer guide extends from a first position spaced inward from the lift conveyor outer edge, and proximate or past the y-axis intercept, toward the lift conveyor outer edge and toward the distal end of the lift conveyor such that at least some of the plurality of rail tie plates advanced up the lift conveyor run engage the conveyor transfer guide and are guided laterally toward and onto the singulating conveyor run past the y-axis intercept in a direction of conveyance of the lift conveyor run.

A singulating guide extends in spaced relation above the singulating conveyor run in a spacing less than the height of a rail tie plate supported on the singulating conveyor run. The singulating guide includes a first portion extending from an outer side of the singulating conveyor and past the y-axis intercept in a direction of conveyance of the singulating run toward the outlet end of the singulating conveyor and toward the singulating conveyor inner edge. A second portion of the singulating guide extends parallel to and spaced outward from the singulating conveyor inner edge a distance approximately equal to a width of a rail tie plate to form a reduced width conveying section on the singulating conveyor run. The second portion of the singulating guide extends toward the outlet end of the singulating conveyor such that at least some of the rail tie plates advanced onto the singulating conveyor from the lift conveyor are guided by the singulating guide into longitudinal alignment on the reduced width conveying section. Rail tie plates which are not advanced into longitudinal alignment with the reduced width conveying section are advanced off of the singulating conveyor past the y-axis intercept in the conveying direction and fall onto the lift conveyor.

A redirecting means, which may comprise a driven roller, is supported over the reduced width conveying section and is operable to engage a rail tie plate supported on top of another rail tie plate advancing longitudinally along the reduced width conveying section to advance the rail tie plate engaged by the redirecting means laterally towards and onto the lift conveyor. The driven roller, used as the redirecting means, may be mounted on the rail tie plate singulating machine so that the lower periphery of the driven roller is spaced above the singulating conveyor a height which is slightly greater than a maximum height of a rail tie plate supported on the singulating conveyor with a bottom of the rail tie plate supported generally or approximately flush on an upper surface of the singulating conveyor. Most or many rail tie plates have a generally flat bottom or bottom surface. However, as shown in FIGS. 1 and 2, some rail tie plates 10 may include ridges formed on a bottom surface 14 with the ridges adapted to be pressed into an upper surface of a rail tie on which they are placed to provide traction to resist lateral shifting of the tie plates 10. As used herein, an approximately or generally flush alignment includes an alignment in which the bottom surface of the tie plate includes ridges which space the rest of the bottom surface slightly above the singulating conveyor.

The rail tie plate singulating machine may also include a bin sized to receive and hold a plurality of rail tie plates. The bin may be mounted on the rail tie plate singulating machine proximate the distal end of the lift conveyor with a feed conveyor extending above the lift conveyor run and extending from proximate the bin toward an inlet end of the lift conveyor. A magnetic crane may be pivotably mounted proximate the bin and operable to lift a plurality of rail tie plates from the bin and release the plurality of rail tie plates onto the feed conveyor proximate the lift conveyor distal end. The plurality of rail tie plates released onto the feed conveyor are conveyed by the feed conveyor to an outlet end of the feed conveyor where the plurality of rail tie plates fall onto the lift conveyor proximate the lift conveyor inlet end.

The rail tie plate singulating machine may be supported on flanged wheels for movement on a railroad track. The rail tie plate singulating machine may be supported on a trailer having wheels adapted for travel on roads and retractable and extendable flanged wheels to facilitate travel on railroad rails.

The rail tie plate singulating machine for singulating a plurality of rail tie plates may include first and second singulating conveyors extending adjacent opposite, outer edges of the lift conveyor with a first singulating conveyor extending adjacent a first outer edge of the lift conveyor and a second singulating conveyor extending adjacent a second outer edge of the lift conveyor. The lift conveyor run extends below first and second singulating conveyor runs of the first and second singulating conveyors from the lift conveyor inlet end to a y-axis intercept between the lift conveyor run and the first and second singulating conveyor runs. The lift conveyor run extends at least level with or above the first and second singulating conveyor runs from the y-axis intercept to the distal ends of the first and second singulating conveyors.

First and second conveyor transfer guides extend in spaced relation above the lift conveyor run in a spacing less than the height of a rail tie plate supported on the lift conveyor run. The first conveyor transfer guide extends from a first position spaced inward from the first outer edge of the lift conveyor, and proximate or past the y-axis intercept, toward the first outer edge of the lift conveyor and toward the distal end of the lift conveyor such that at least some of the rail tie plates advanced up the lift conveyor run engage the first conveyor transfer guide and are guided laterally toward and onto the first singulating conveyor run past the y-axis intercept. The second conveyor transfer guide extends in spaced relation above the lift conveyor run in a spacing less than the height of a rail tie plate supported on the first conveyor run and the second conveyor transfer guide extends from a first position spaced inward from the second outer edge of the lift conveyor, and proximate or past the y-axis intercept, toward the second outer edge of the lift conveyor and toward the distal end of the lift conveyor such that at least some of the rail tie plates advanced up the lift conveyor run engage the second conveyor transfer guide and are guided laterally toward and onto the second singulating conveyor run past the y-axis intercept;

Each of the first and second singulating conveyors has a singulating guide extending in spaced relation above the respective singulating conveyor run in a spacing less than the height of a rail tie plate supported on the respective singulating conveyor run. The first singulating guide has a first section extending from an outer side of the respective singulating conveyor and past the y-axis intercept in a direction of conveyance of the respective singulating conveyor run toward the outlet end of the respective singulating conveyor and toward the respective singulating conveyor inner edge. A second end of the first section of the first singulating guide terminates proximate a second section of the first singulating guide. The second section of the first singulating guide extends parallel to and is spaced outward from the respective singulating conveyor inner edge a distance approximately equal to a width of a rail tie plate to form a reduced width conveying section on the respective singulating conveyor run and the second section of the first singulating guide extends toward the outlet end of the respective singulating conveyor such that at least some of the rail tie plates advanced onto the respective singulating conveyor from the lift conveyor are guided by the first singulating guide into longitudinal alignment on the first reduced width conveying section and rail ties which are not advanced into longitudinal alignment on the first reduced width conveying section are advanced off of the respective singulating conveyor past the y-axis intercept in the conveying direction and fall onto the lift conveyor.

A redirecting means is supported over the reduced width conveying section of each singulating conveyor and operable to engage a rail tie plate supported on top of another rail tie plate advancing longitudinally along the first reduced width conveying section to advance the rail tie plate engaged by the redirecting means laterally towards and onto the lift conveyor. In one embodiment, the redirecting means comprises a driven, plate engaging roller extending generally transverse to a direction of conveyance of the singulating conveyor. A lower periphery of the plate engaging roller, is supported above the singulating conveyor at a height that is greater than the height of a single rail tie plate sitting generally flush or horizontally on the singulating conveyor and less than the height of two rail tie plates stacked on top of each other. A lower periphery of the driven, plate engaging roller engages any tie plates stacked on top of another tie plate, as they are advanced by the singulating conveyor into the path of the roller, and redirects the upper tie plate laterally off of the reduced width conveying section of the singulating conveyor and onto the lift conveyor.

The rail tie plate flipping assembly receives the rail tie plates from the singulating conveyor and flips rail tie plates with their shoulders facing downward, and which may be referred to as a shoulder-side down orientation, into a shoulder-side up orientation in which the shoulders of the rail tie plates face upward. The rail tie plate flipping assembly maintains shoulder-side up tie plates in the shoulder-side up orientation. In one embodiment, the rail tie plate flipping assembly includes a launch conveyor with a launch conveyor run extending from a launch conveyor inlet end that receives the plurality of singulated rail tie plates to a launch conveyor outlet end. A dampening slide is spaced apart from the launch conveyor outlet end and has an upper section, and a middle section and a lower section. The dampening slide curves downward toward a flipping assembly outlet section that extends under the launch conveyor. The dampening slide is formed from a dampening lining and a resilient strip overlying the dampening lining that extend from the upper section to the lower section of the dampening slide. An adjustable paddle adjustably supports the middle section of the dampening slide. The spacing between the dampening slide and the distal end of the launch conveyor and the speed at which the launch conveyor is operated is selected such that rail tie plates oriented shoulder-side down rotate a sufficient degree after being launched off of the launch conveyor, and preferably at least ninety degrees such that after impacting the dampening slide, the rail tie plate further rotates to a shoulder-side up orientation as it exits the dampening slide and rail tie plates oriented shoulder-side up on the launch conveyor remain in a shoulder-side up orientation after impacting the dampening slide.

A rail tie plate quarter turn assembly for turning singulated, shoulder-side up rail tie plates includes at least one sensor for sensing an orientation of a rail tie plate and a rail tie plate quarter turn conveyor run on a rail tie plate quarter turn conveyor. The rail tie plate quarter turn conveyor includes an inlet end, a diverter, at least one rotation inducing abutment and a distal end with second guide walls. The diverter may include a selectively positionable pivotal paddle and quarter turn guides extending from sidewalls of the quarter turn conveyor and in spaced relation above the quarter turn conveyor run in a spacing less than the height of a rail tie plate supported on the quarter turn conveyor run. Each quarter turn guide has a first angled section and a second angled section. The first angled section cooperates with the paddle to form a funnel for guiding a tie plate on the quarter turn conveyor along the paddle and the second angled section cooperates with the paddle to direct the tie plate toward a rotation inducing abutment on a side of the quarter turn conveyor toward which the paddle is angled. The selectively positionable paddle is selectively positionable depending on the orientation of the rail tie plate.

The quarter turn guides and the selectively positionable rotation paddle advance the rail tie plates toward a selected rotation inducing abutment depending on the desired orientation of the tie plate as it exits the quarter turn conveyor assembly. The trailing edge of the rail tie plates advanced against the abutments rotate inward as the rail tie plate is conveyed past the abutment with the leading edge extending outward toward the side of the abutment it engaged. The leading edge of rail tie plates advanced against the left abutment will extend to the left after advancing past the left abutment and the leading edge of rail tie plates advanced against the right abutment will extend to the right after advancing past the right abutment. Using the scanner to determine whether the leading edge of the rail tie plate is the short end or long end of the rail tie plate, the controller can be operated to position the paddle to direct the rail tie plate to either the left or right abutment to control the resulting orientation of the tie plate as it exits the quarter turn assembly.

A rail tie plate distribution assembly for distributing rail tie plates includes an elevation conveyor having an inlet end, a distal end and an elevation conveyor run, and the elevation conveyor extends at an upward angle from the inlet end to the distal end. The rail tie plate distribution assembly further includes a first curve guide chute that extends from the distal end of the elevation conveyor and curves back under a first entry to the first curved guide chute to a first accumulation slide. The first accumulation slide includes a first dealer that advances the rail tie plates at a desired spacing between each of the rail tie plates to a first final orienting discharge assembly that discharges the rail tie plates. The rail tie plate distribution assembly further includes a second curved guide chute that curves back under a second entry to the second curved guide chute to a second accumulation slide. The second accumulation slide includes a second dealer that advances the rail tie plates at a desired spacing between each of the rail tie plates to a second final orienting discharge assembly that discharges the rail tie plates. The rail tie plate distribution assembly for distributing rail tie plates further includes a selectively positionable guide panel assembly that is selectively operable to direct rail tie plates through the first curved guide chute or the second curved guide chute. Rail tie plates passing through each curved guide chute are flipped, turned over or inverted from a shoulder-side up orientation to a shoulder-side down orientation. The first and second final orienting discharge assemblies can be configured to further flip or rotate the tie plates as they are advanced onto railroad ties or track beds to place the tie plates in the orientation requested to facilitate subsequent handling by a work crew.

Figure 16:
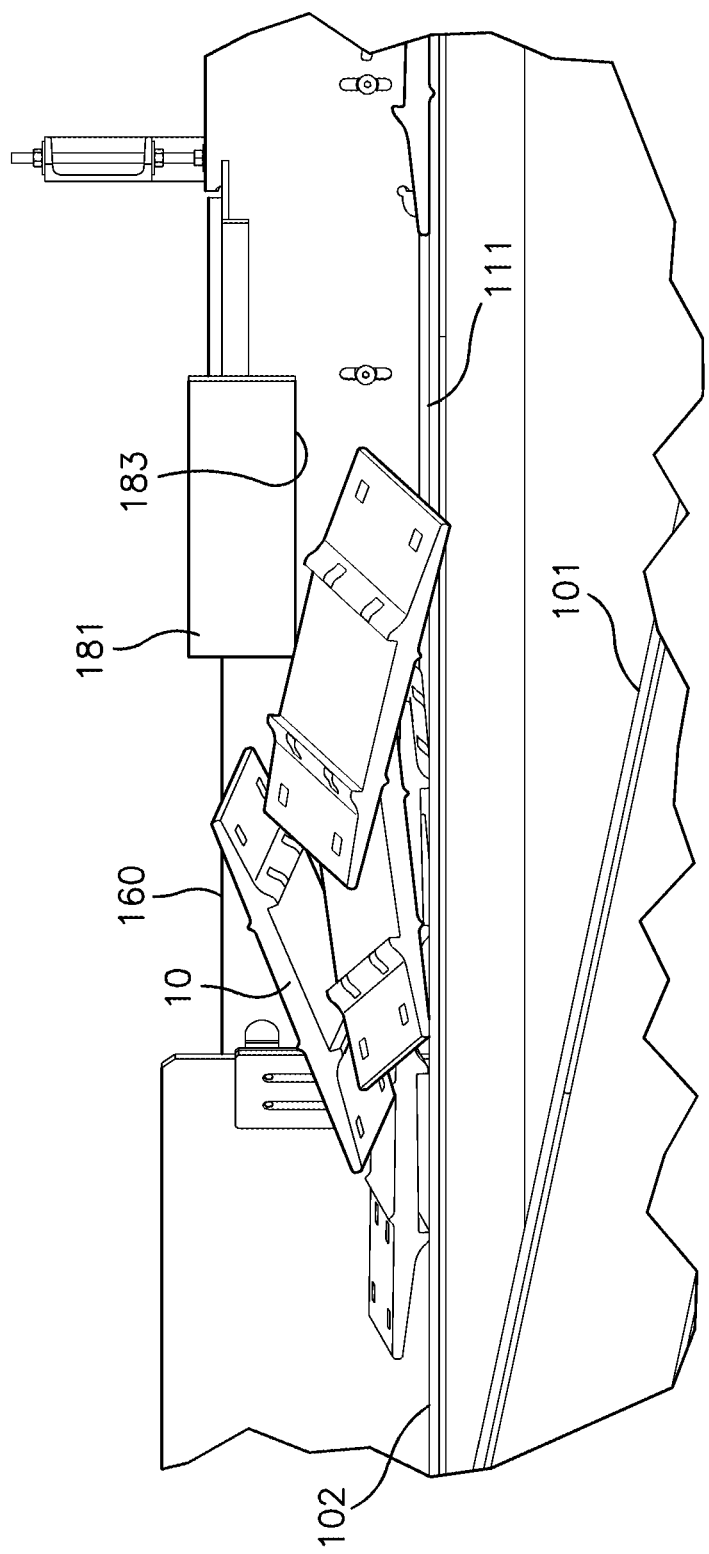
FIG. 16 is an enlarged and fragmentary elevational view of the rail tie plate singulating assembly as in FIG. 15 showing the plurality of rail tie plates advancing on the singulating conveyor toward the tie plate deflector.
Figure 17:
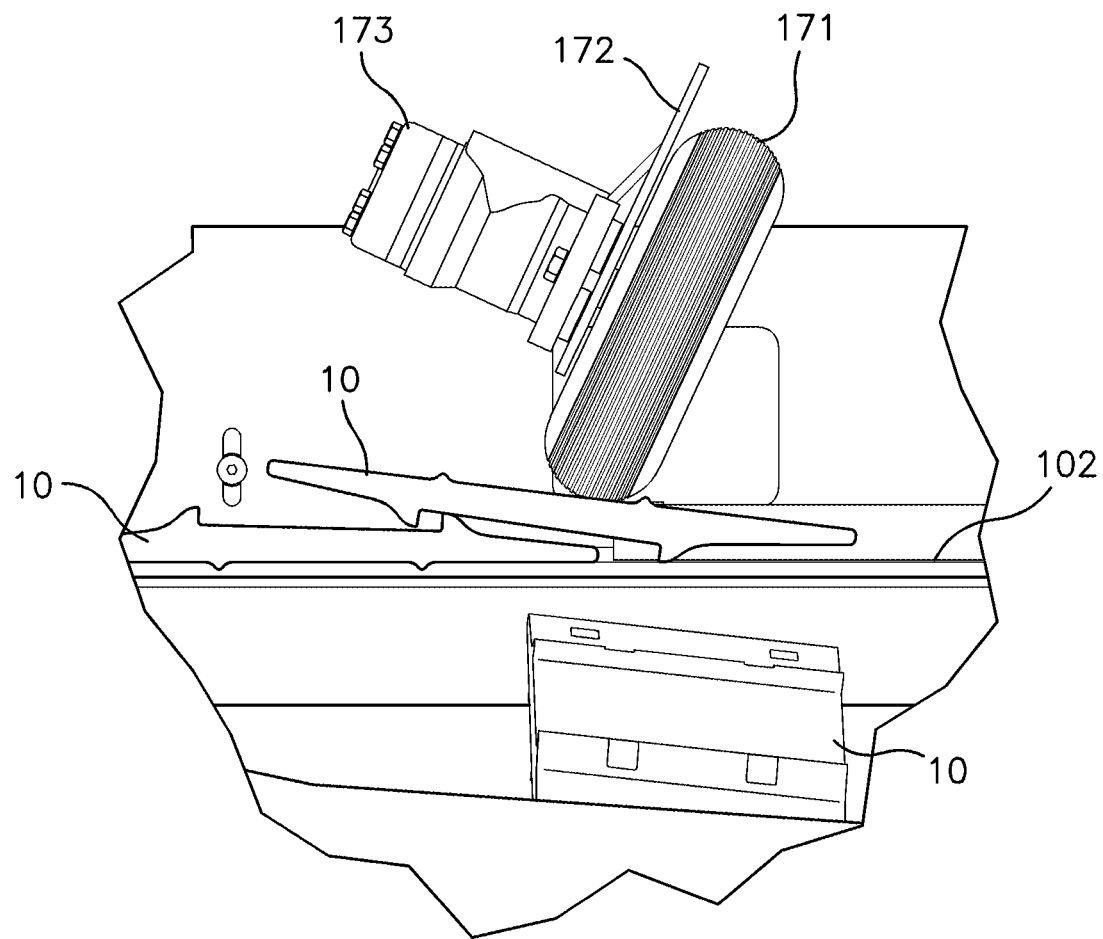

FIG. 17 is an enlarged and fragmentary elevational view of the rail tie plate singulating assembly as in FIG. 16 showing a rail tie plate stacked on top of another rail tie plate and advancing beneath a tie plate engaging roller and another rail tie plate having been redirected laterally by the tie plate engaging roller.

Figure 18:
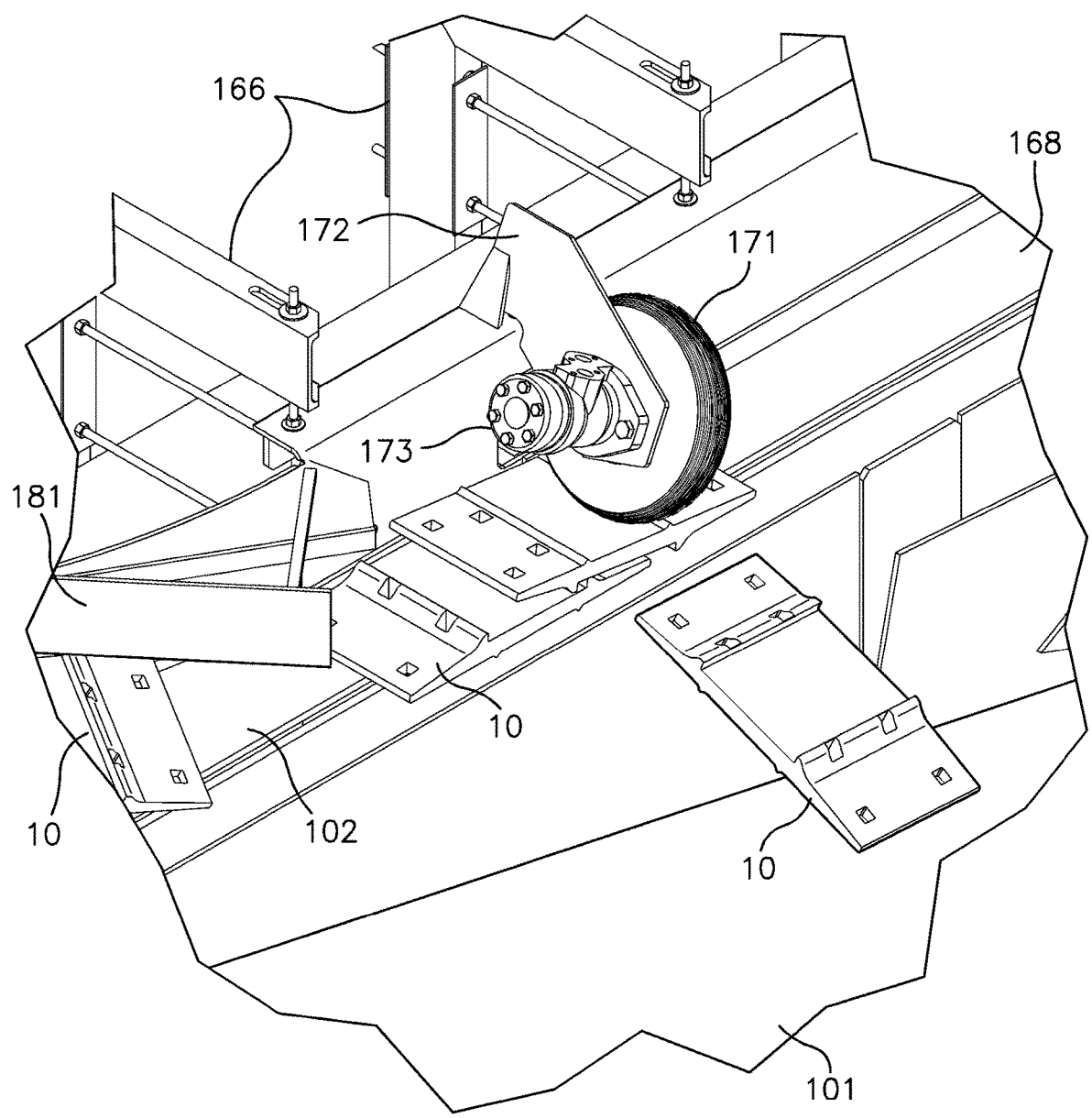

FIG. 18 is an enlarged and fragmentary perspective view of the rail tie plate singulating assembly and rail tie plates as in FIG. 17.

Figure 1:
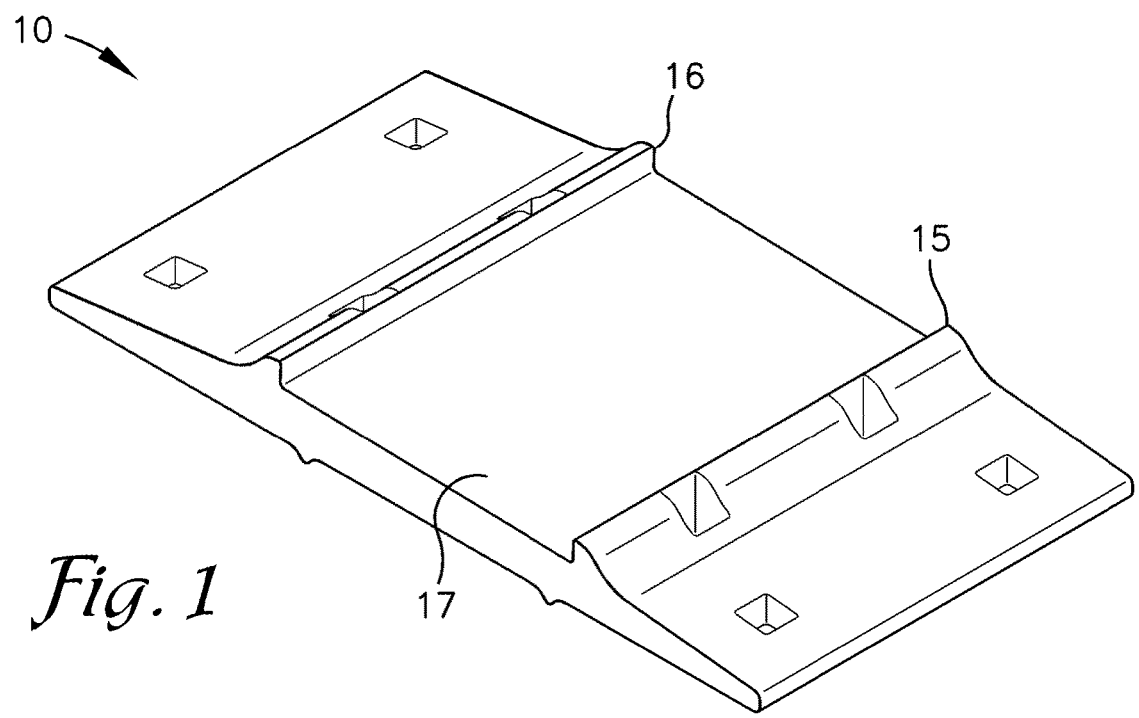
FIG. 1 is a perspective view of a rail tie plate.
Figure 2:
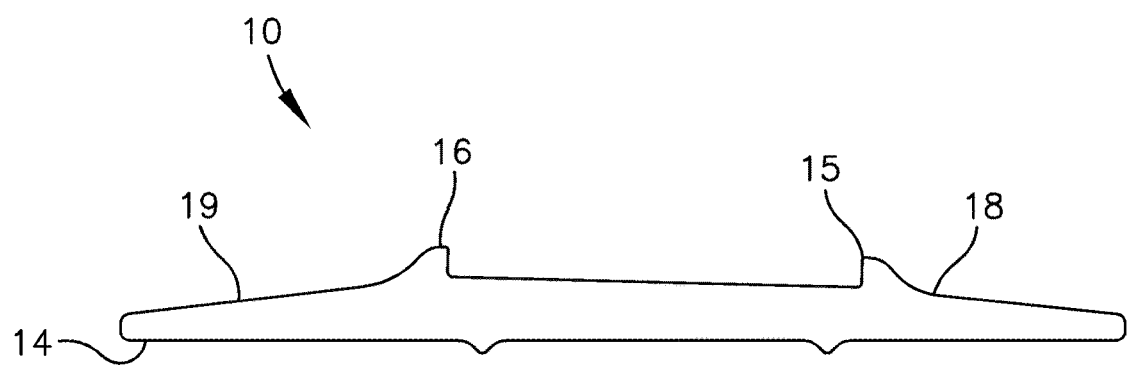
FIG. 2 is a left, side elevational view of the rail tie plate as shown in FIG. 1.
Figure 3:
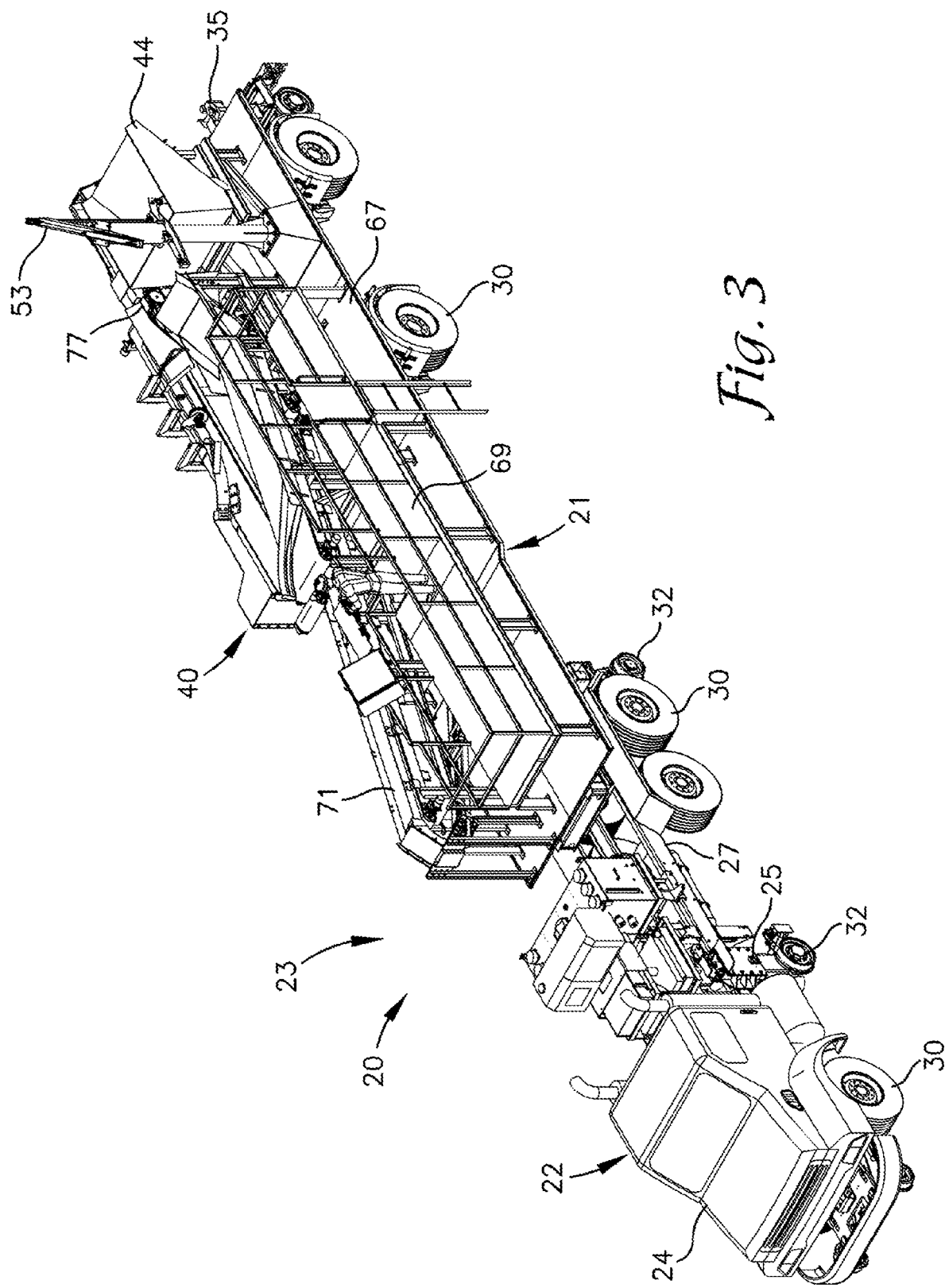
FIG. 3 is a front, perspective view of a rail tie plate distribution machine including a bin for storing tie plates, a rail tie plate singulating assembly and a rail tie plate distribution assembly mounted on a trailer frame of a trailer and connected to a tractor for towing the trailer.
Figure 4:
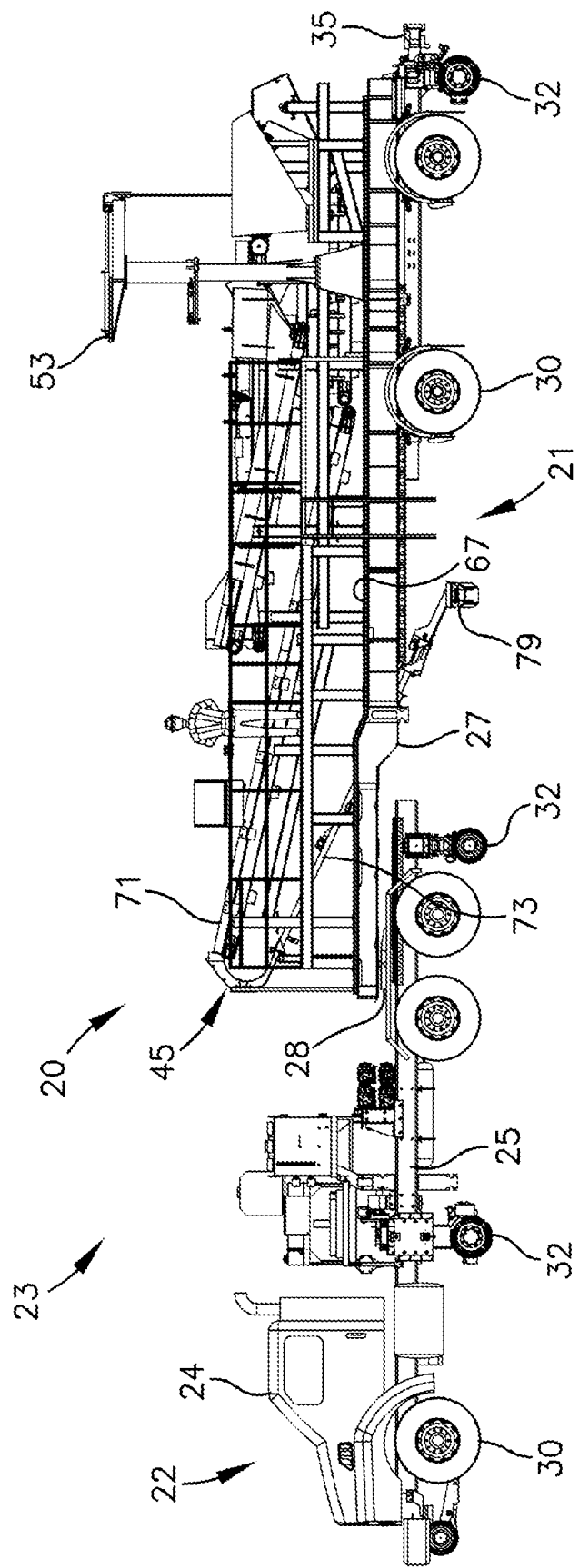
FIG. 4 is a right, side elevational view of the rail tie plate distribution machine.
Figure 19:
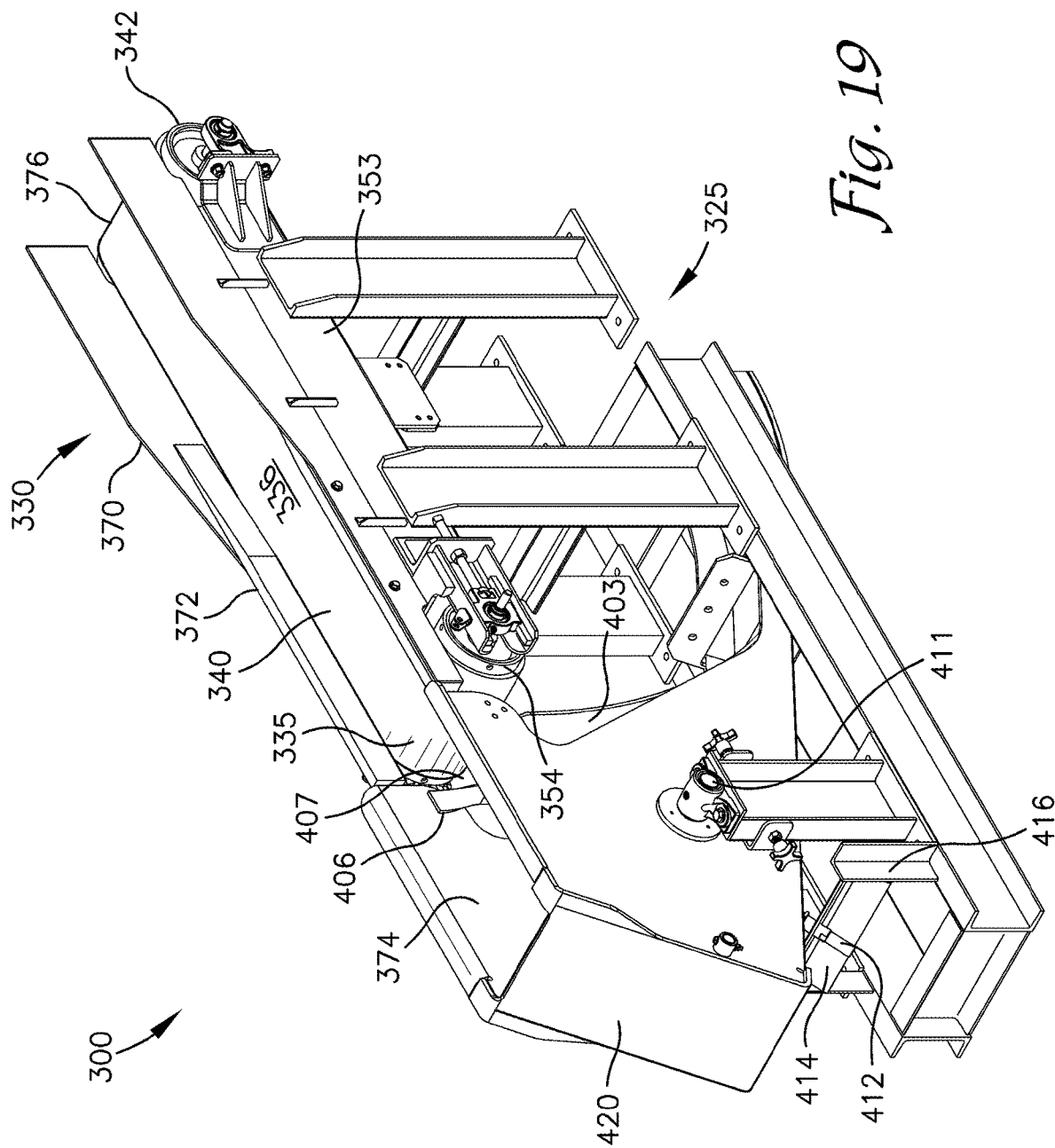

FIG. 19 is a top perspective view of a rail tie plate flipping assembly shown separated from the rail car shown in FIG. 3 and including a rail tie plate flipping frame supporting the assembly.

Figure 20:
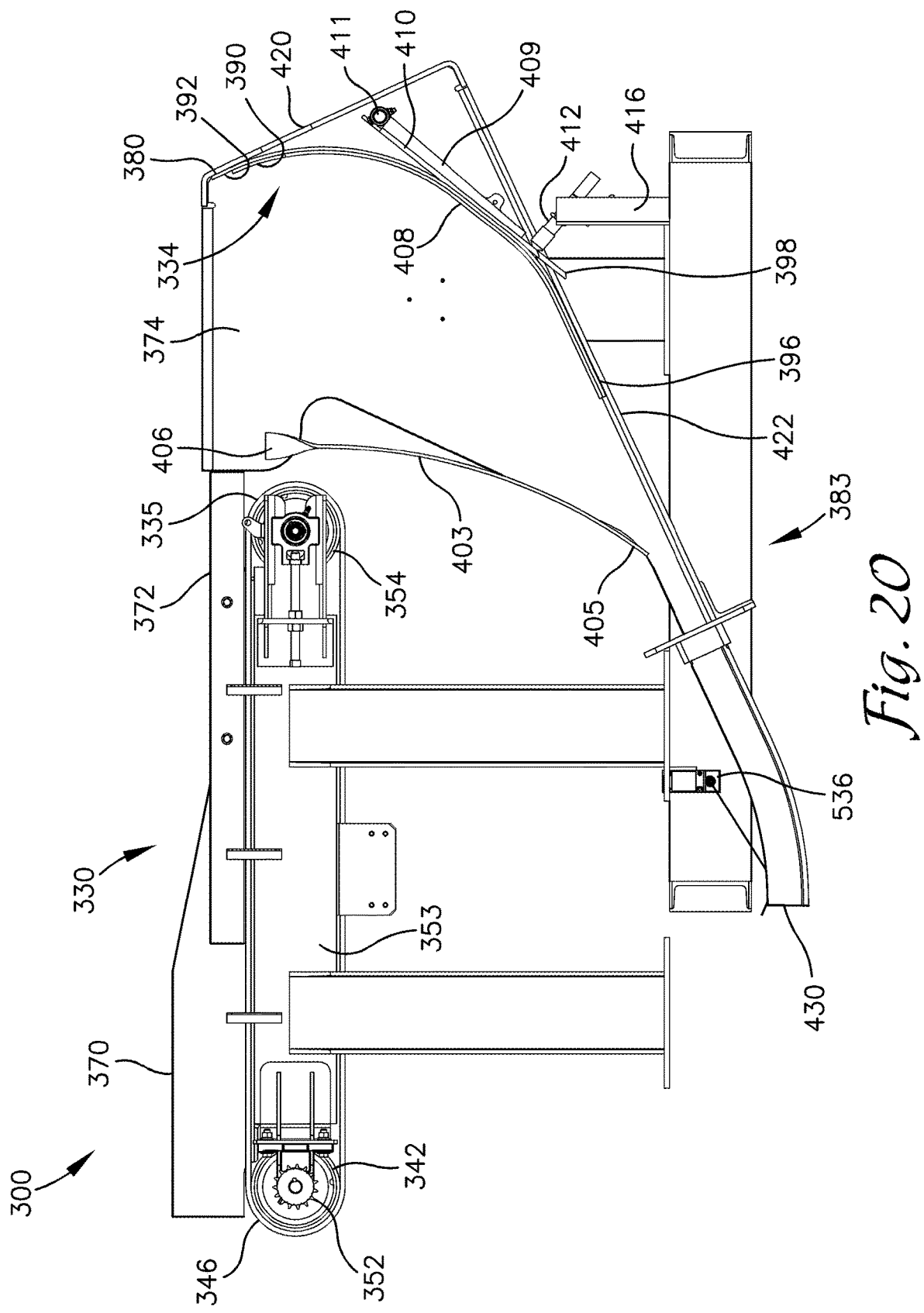

FIG. 20 is a right, side elevational view of the rail tie plate flipping assembly of FIG. 19, with a dampening slide wall and parts of the rail tie plate flipping frame removed.

Figure 21:
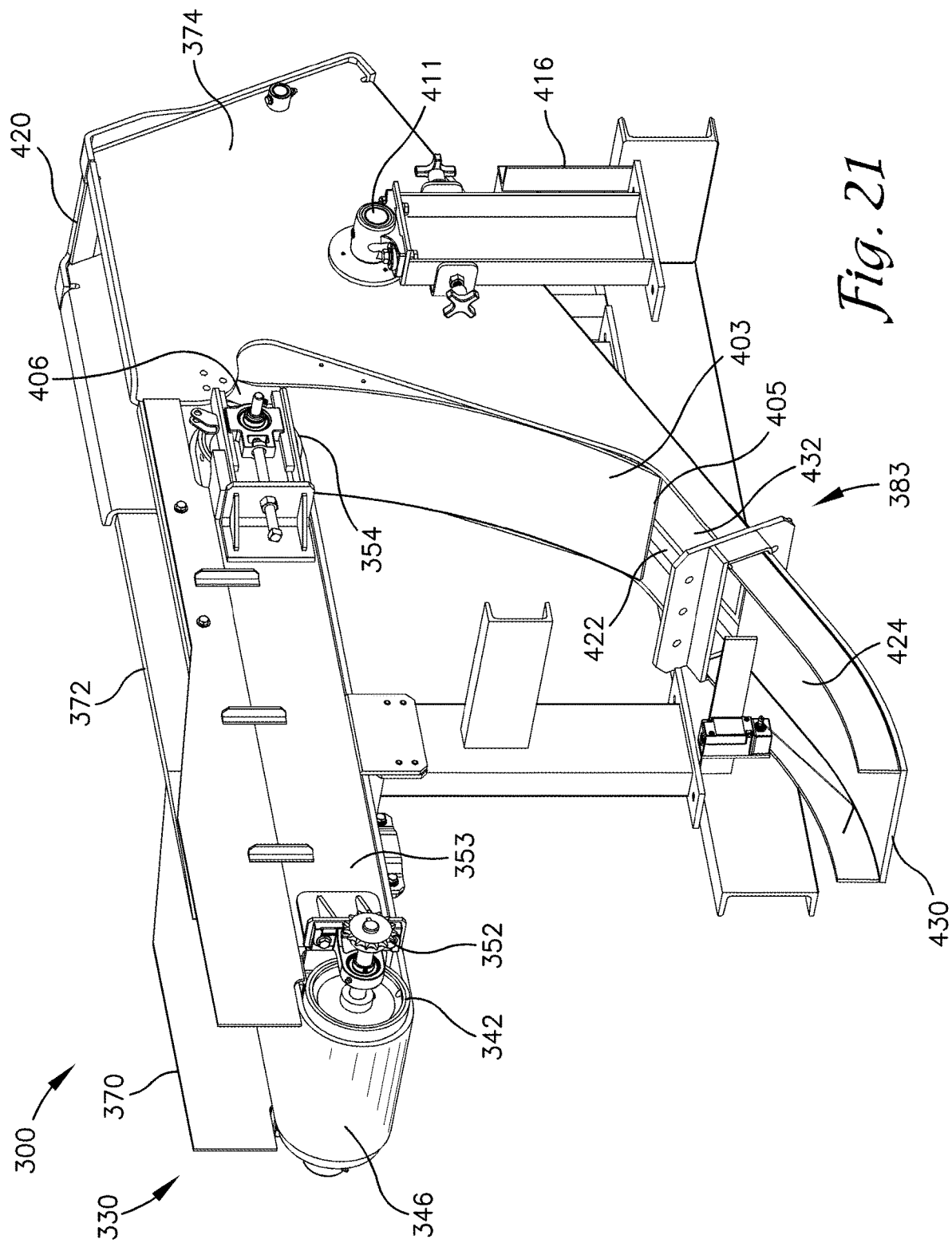

FIG. 21 is a perspective view of the rail tie plate flipping assembly of FIG. 19, with portions of the flipping frame supporting the assembly removed.

Figure 22:
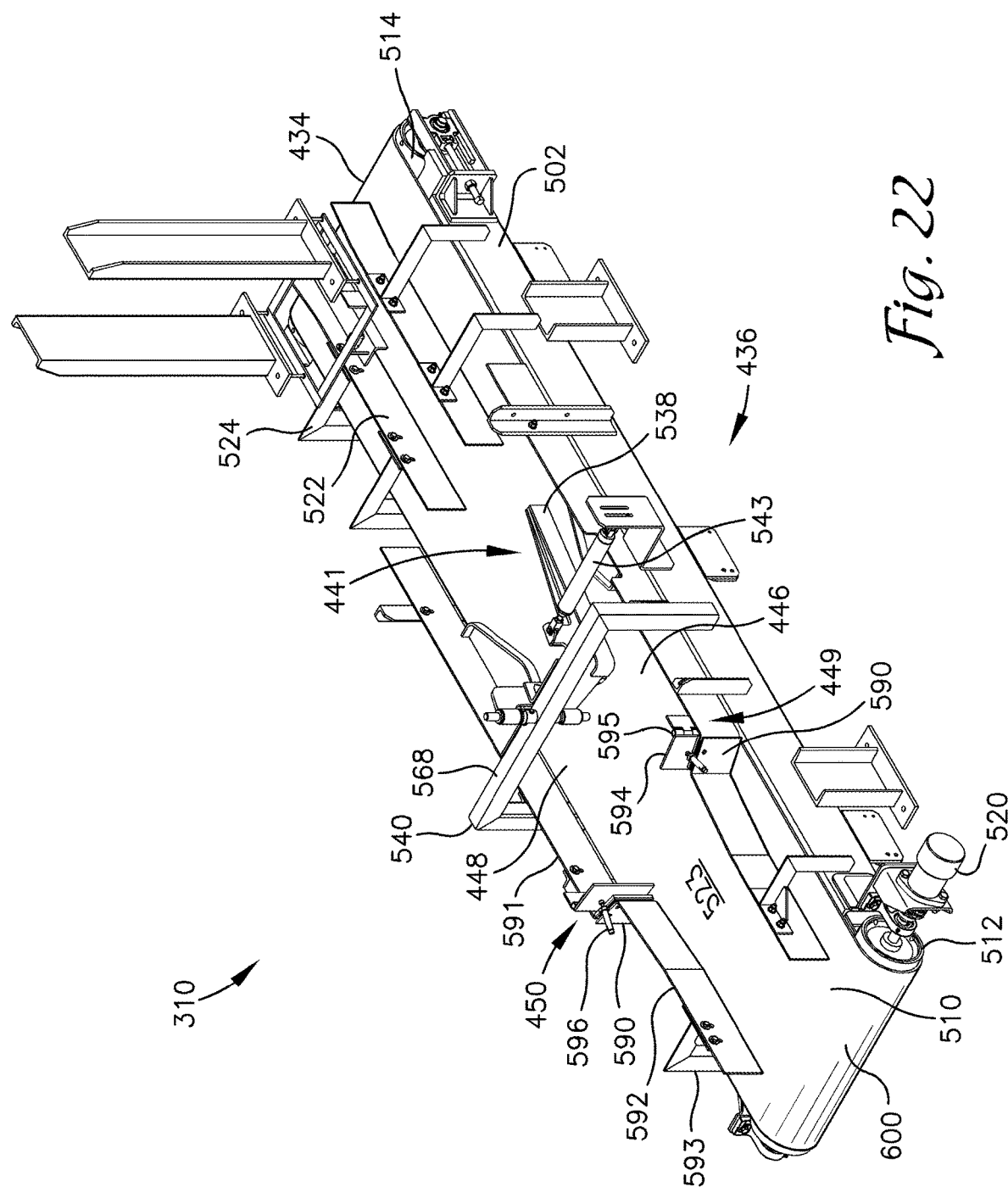

FIG. 22 is a top, perspective view of a rail tie plate quarter turn assembly separated from the rail car shown in FIG. 3.

Figure 23:
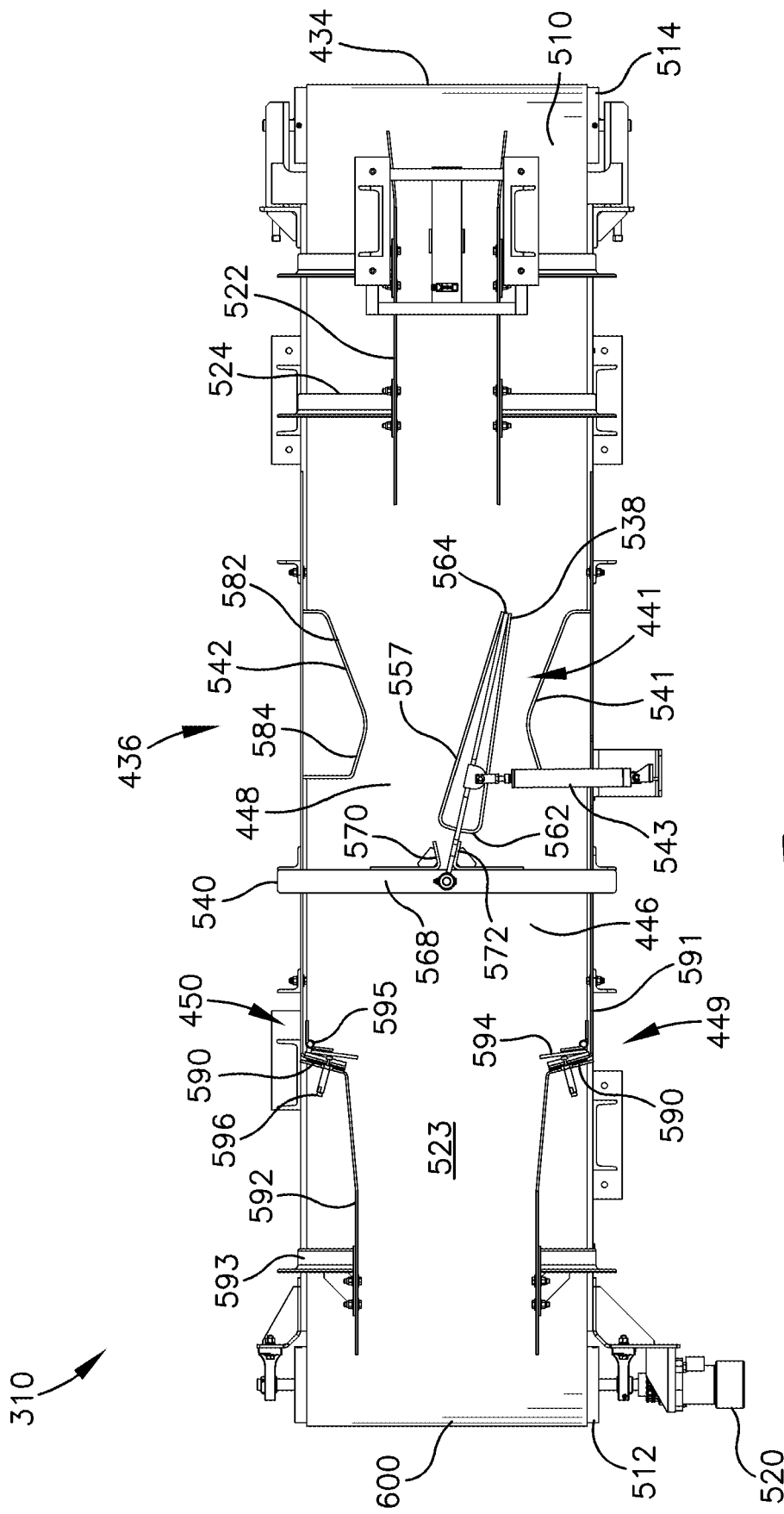

FIG. 23 is a top plan view of the rail tie plate quarter turn assembly of FIG. 22.

Figure 24:
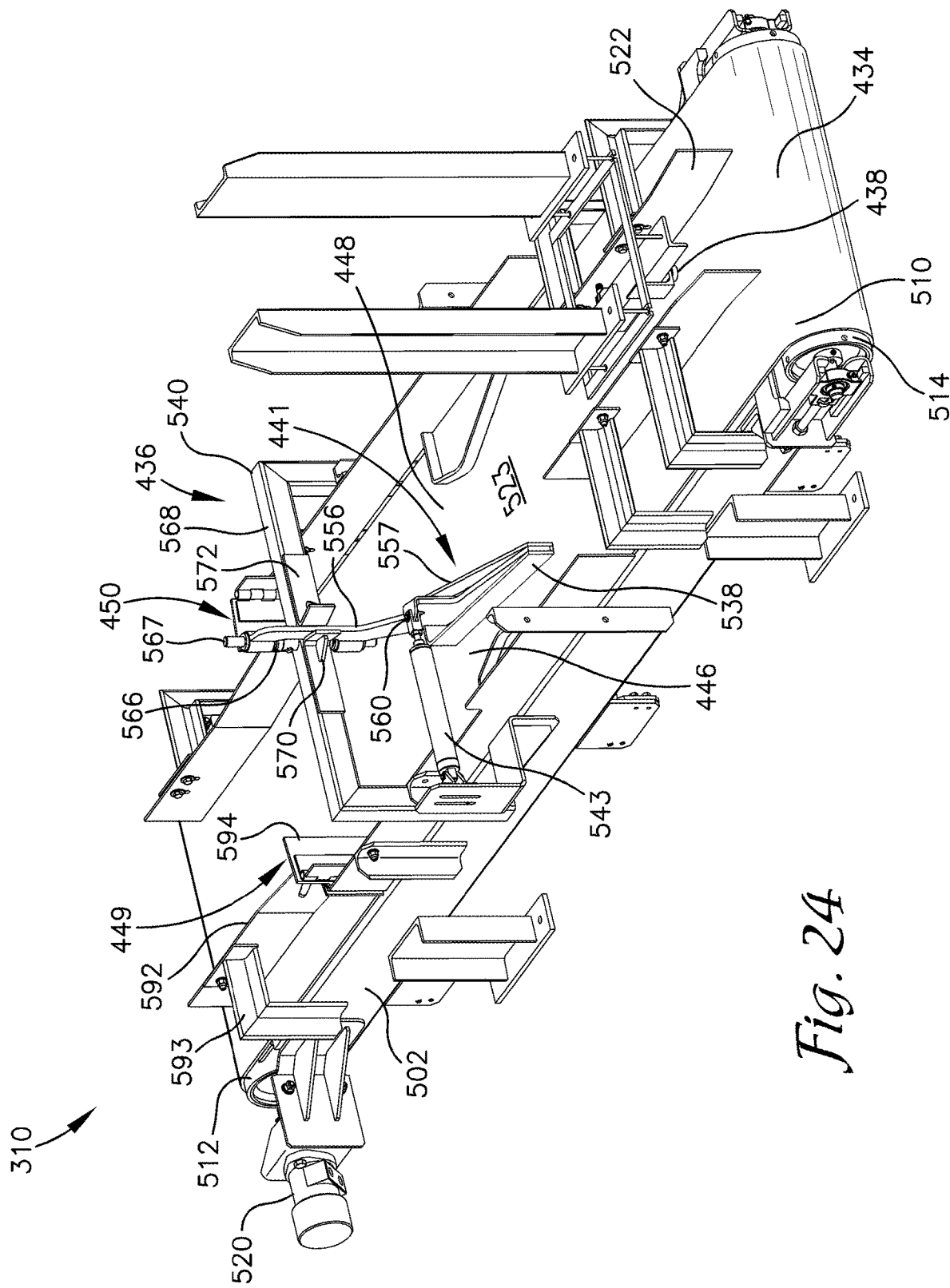

FIG. 24 is a perspective view of the rail tie plate quarter turn assembly of FIG. 22.

Figure 25:
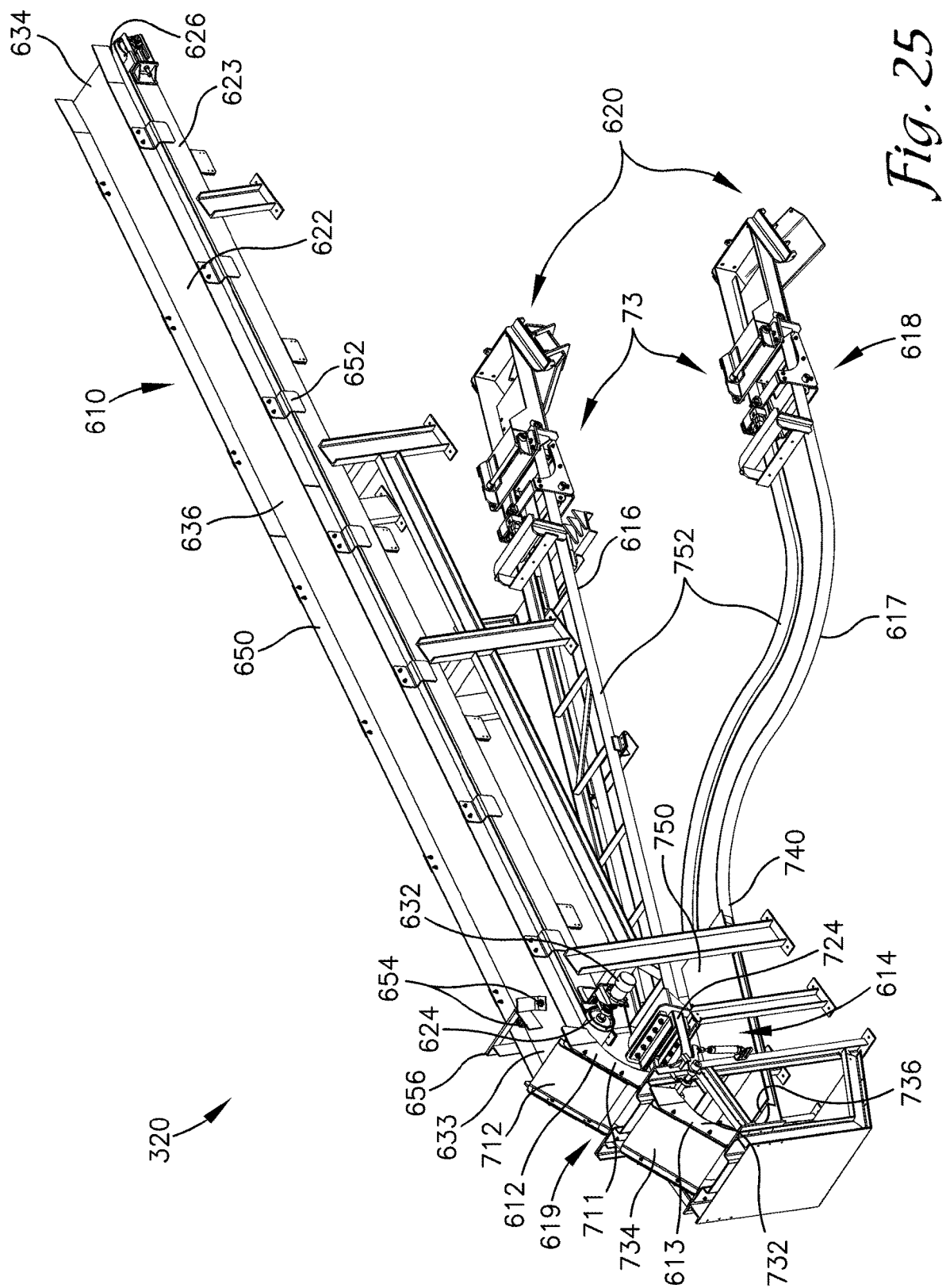

FIG. 25 is a top, perspective view of a rail tie plate distribution assembly shown removed from the rail car shown in FIG. 3.

Figure 26:
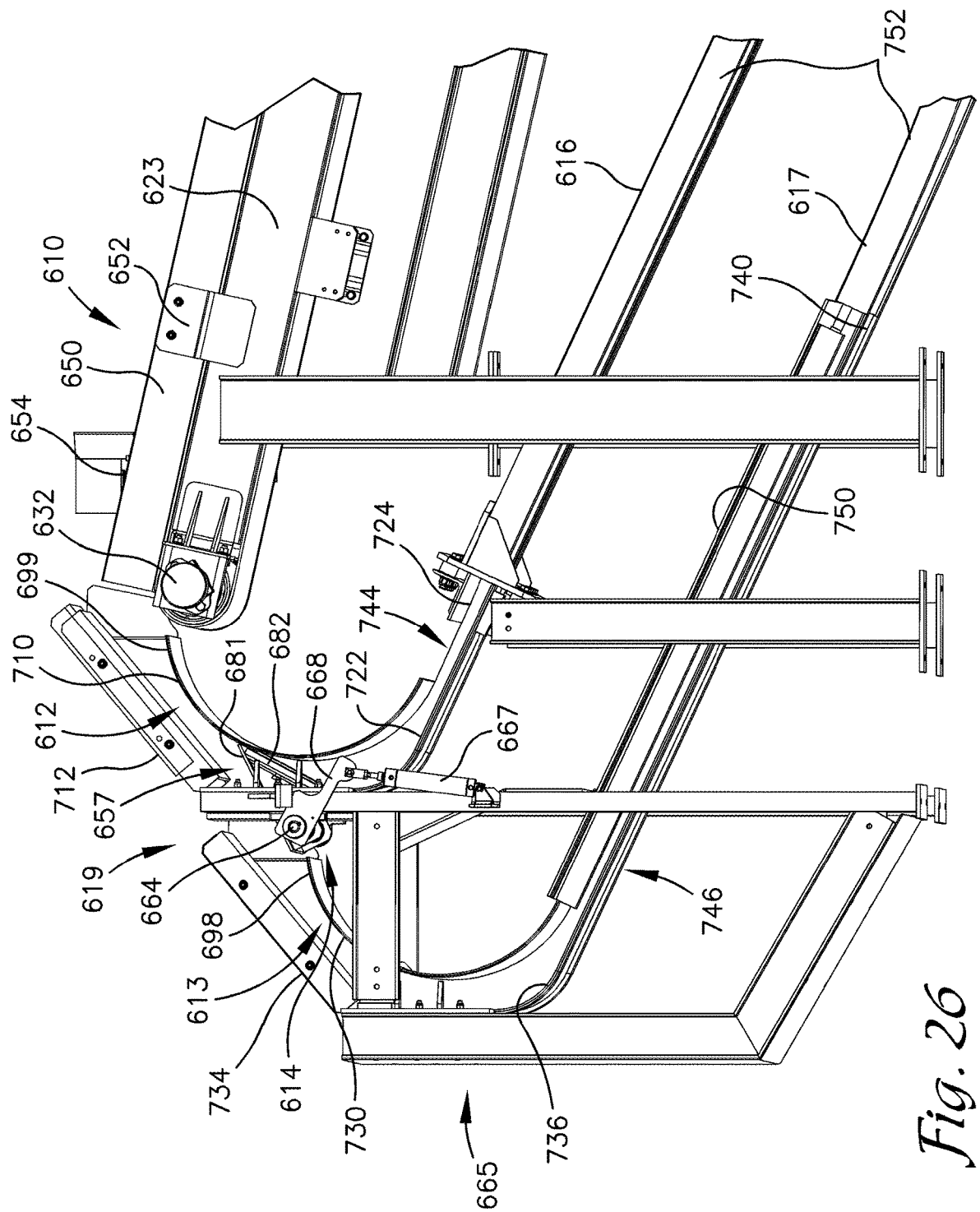

FIG. 26 is an enlarged and fragmentary side elevation view of a routing assembly of the distribution assembly, with portions broken away from the routing assembly as shown in FIG. 25 to show a first curved guide chute, a second curved guide chute, and a router.

Figure 27:
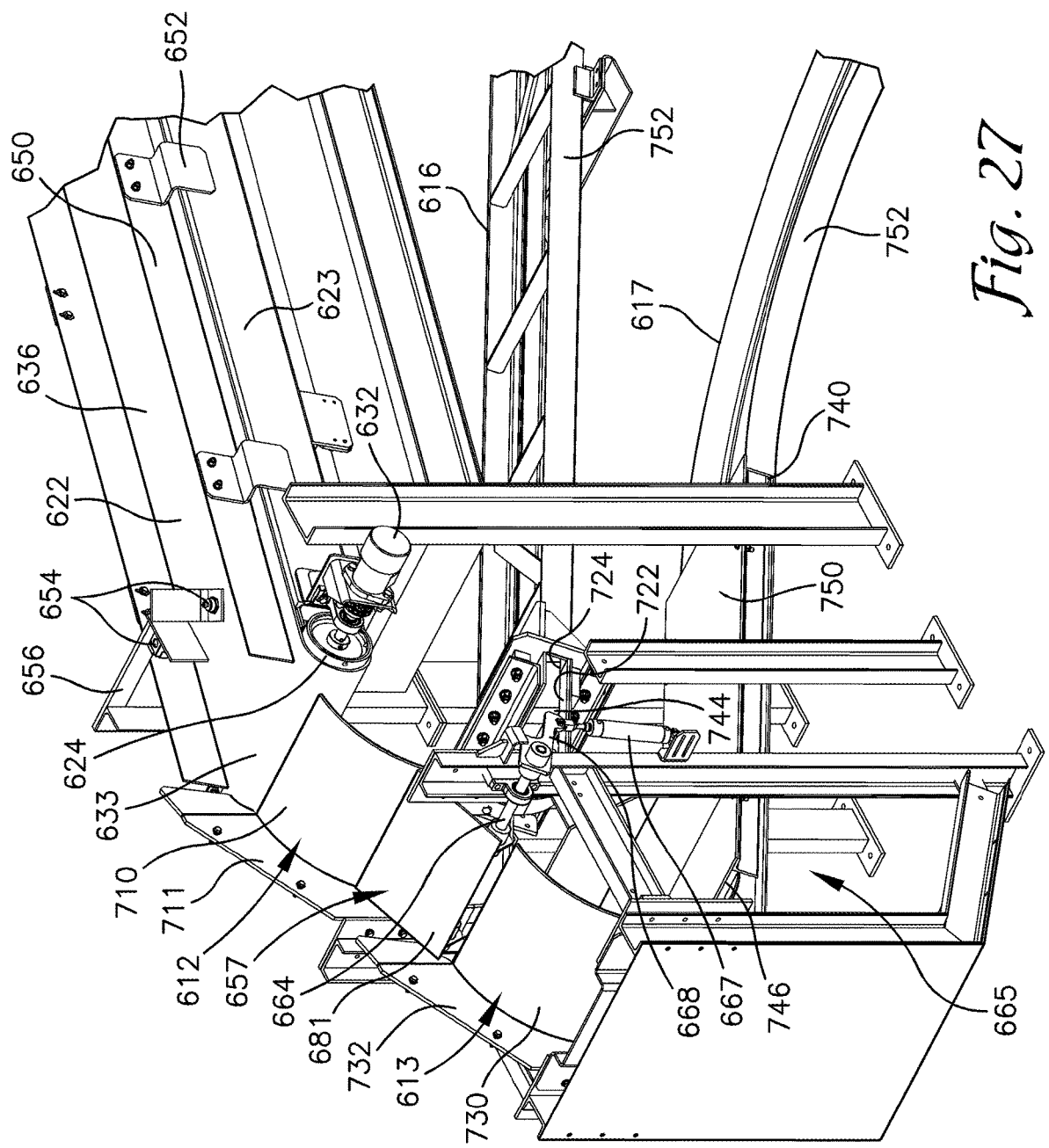

FIG. 27 is an enlarged and fragmentary perspective view of a routing assembly of the distribution assembly as shown in FIG. 25 with portions removed to show the first curved inner panel, the second curved inner panel and an upper bridge plate of the routing assembly.

Figure 28:
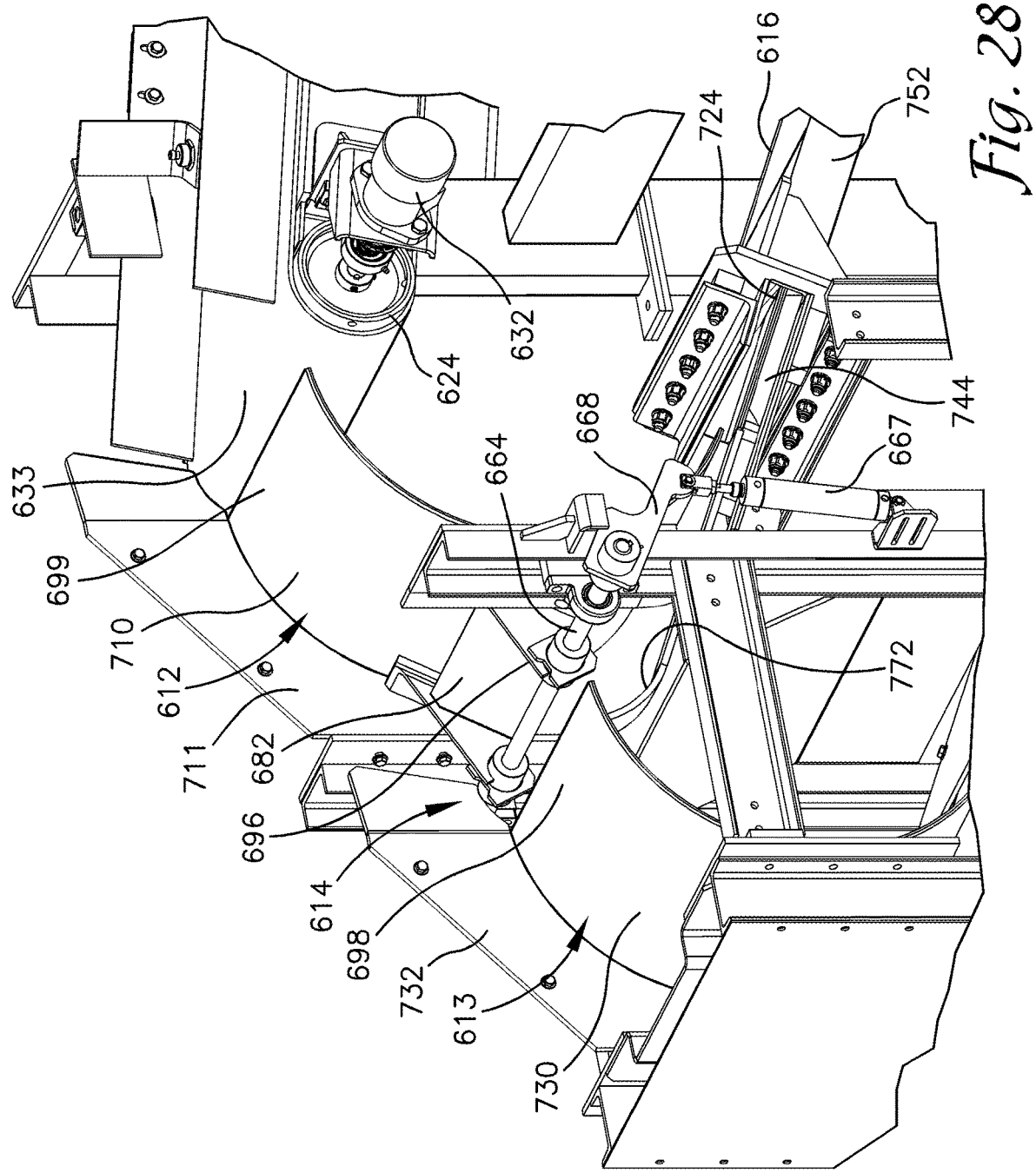

FIG. 28 is an enlarged and fragmentary perspective view of the routing assembly as shown in FIG. 27.

Figure 29:
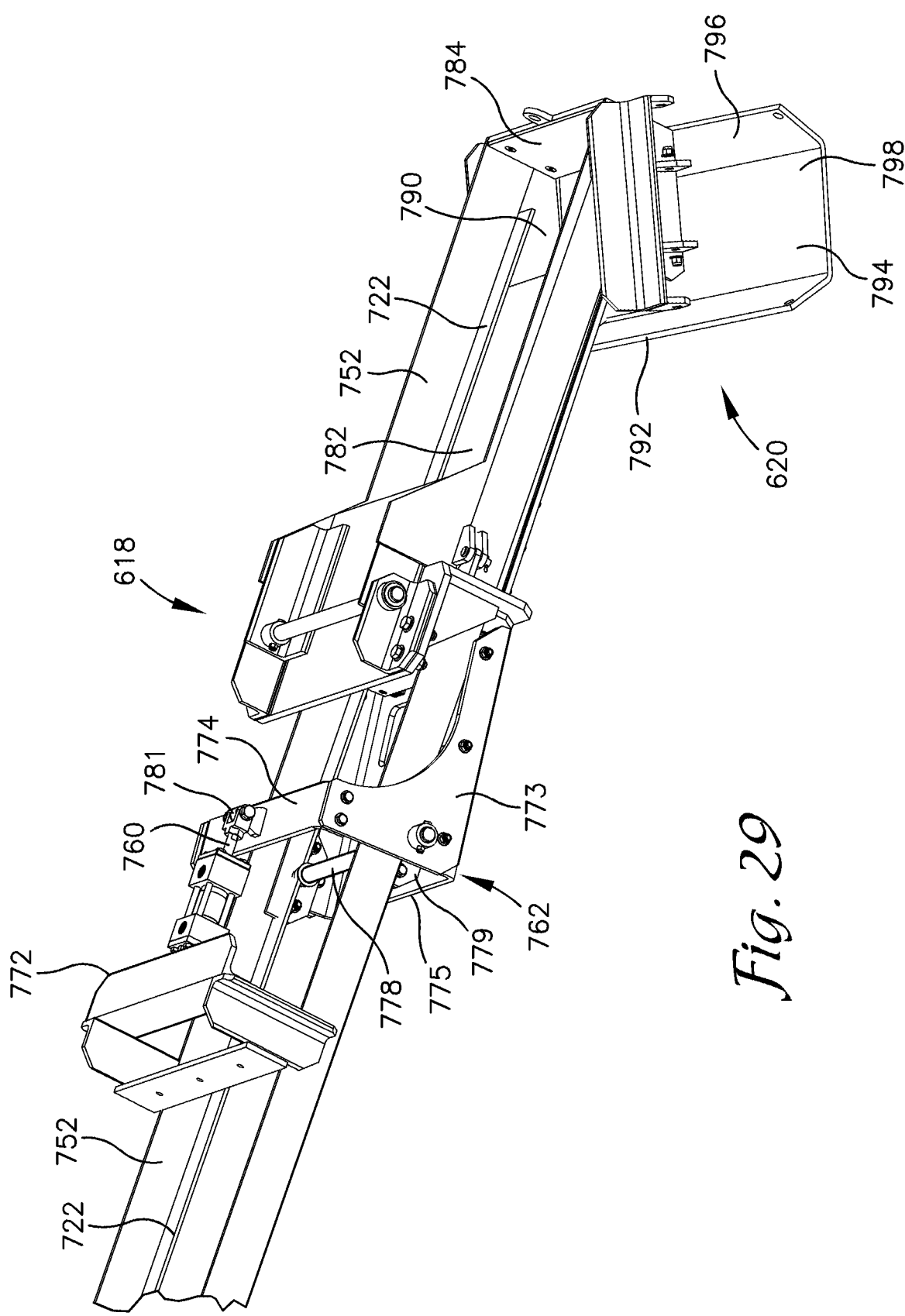

FIG. 29 is a fragmentary, side perspective view of a discharge end broken away from the rail tie plate distribution assembly shown in FIG. 25 and including a dealer assembly and a final orienting discharge assembly.

Figure 30:
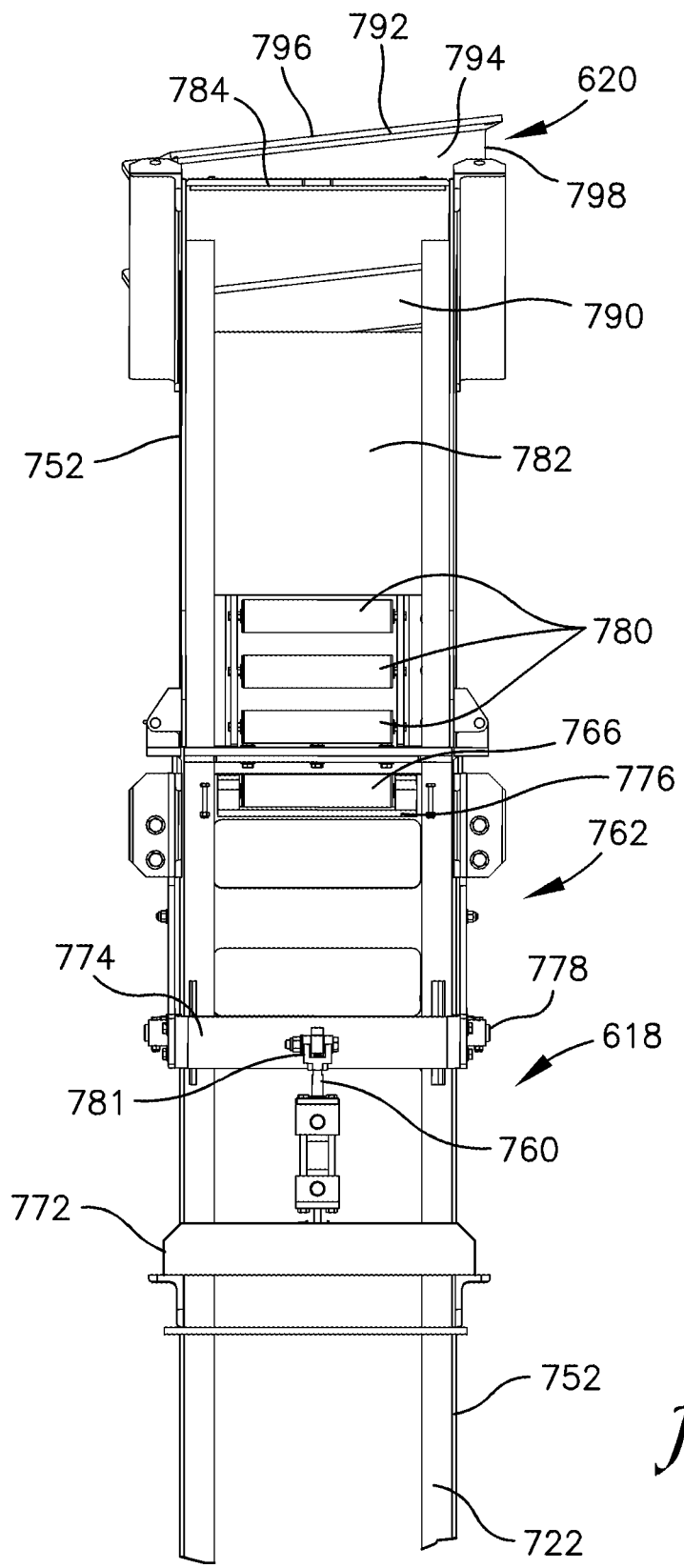

FIG. 30 is a fragmentary, top plan view of a discharge end broken away from the rail tie plate distribution assembly shown in FIG. 25.

Figure 31:
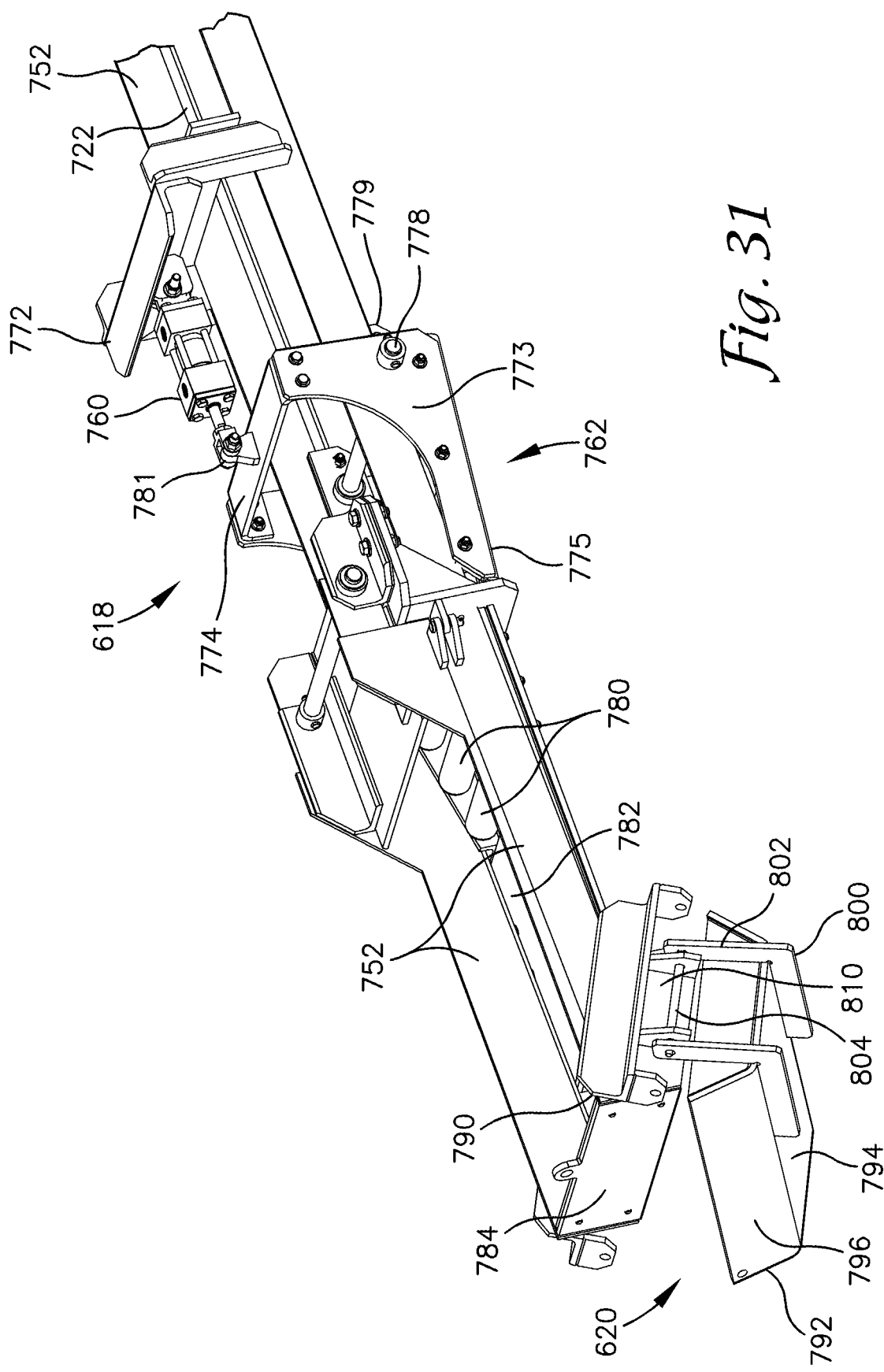

FIG. 31 is a fragmentary, side perspective view of a discharge end broken away from the rail tie plate distribution assembly shown in FIG. 25.

FIG. 32 is a fragmentary and enlarged perspective view of the routing assembly with portions removed to show first and second curved guide panels and the router of the rail tie plate distribution assembly as shown in FIG. 25 with the router lowered to direct rail tie plates from the elevation conveyor to the second curved guide panel.

FIG. 33 is a fragmentary and enlarged perspective view of the routing assembly as in FIG. 32 with portions removed to show the router raised to direct rail tie plates from the elevation conveyor to the first curved guide panel.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, reference numeral 20 generally designates a rail tie plate singulating, orienting and distribution machine, which in the embodiment shown in FIGS. 3-6 is incorporated into a trailer 21 which can be connected to and towed by a tractor 22 to form a self-propelled vehicle 23. Machine 20 may also be referred to herein as a rail tie plate distribution machine 20. The tractor 22 includes a cab 24 mounted on a rigid, tractor frame 25. The tractor 22 is equipped with a conventional engine for propelling the vehicle, such as a gasoline or diesel engine. A trailer frame 27 is coupled to the tractor frame 25 by means of a conventional swivel or fifth-wheel coupling 28.

The tractor frame 25 and trailer frame 27 are each equipped with a plurality of conventional wheels and tires 30 of the type used on tractor-trailers for over-the-road travel along a roadway. Each tractor frame 25 and trailer frame 27 is also equipped with a plurality of flanged rail wheels 32 having flanges 33 on their inside edges. The rail wheels 32 may be of the type commonly used on rail cars so that the rail wheels 32 can travel on the rails of a railroad track such as the rails mounted on ties which are installed on a railway bed.

The rail wheels 32 are mounted to the tractor frame 25 and trailer frame 27 for vertical movement via actuators, such as hydraulic actuators (not shown). When the actuators are fully retracted, the rail wheels 32 are raised above the lowermost points of the tires 30, enabling the tires 30 to engage and roll along a roadway in an over-the-road mode or configuration of the vehicle 23. The actuators may be extended in order to lower the flanged wheels 32 onto the rails 11 such that the tractor frame 25 and trailer frame 27 are raised sufficiently to raise the tires 30 above the railway bed and rails and the weight of the vehicle 23 is borne by the railway wheels 32 riding on the rails. The flanged wheels 32 are spaced apart in pairs on opposite sides of the tractor frame 25 and trailer frame 27 at a standard spacing between the two rails of a standard railway line.

Figure 5:
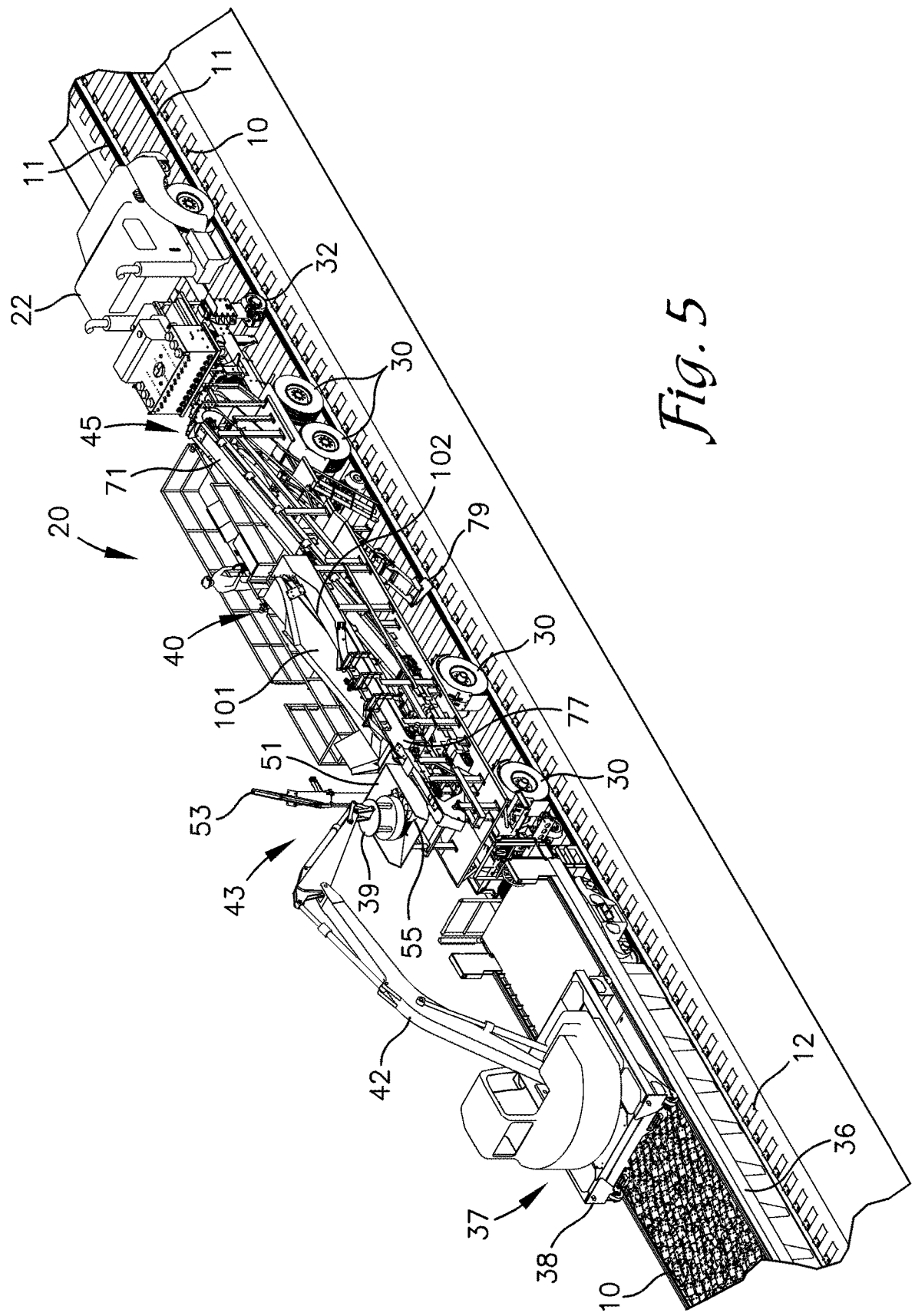
FIG. 5 is a front, perspective view of the rail tie plate distribution machine as shown in FIG. 3 in which the trailer is coupled to a gondola car and flanged wheels on the trailer and tractor are deployed to allow the machine to travel on a section of track relative to which rail tie plates are to be distributed.
Figure 6:
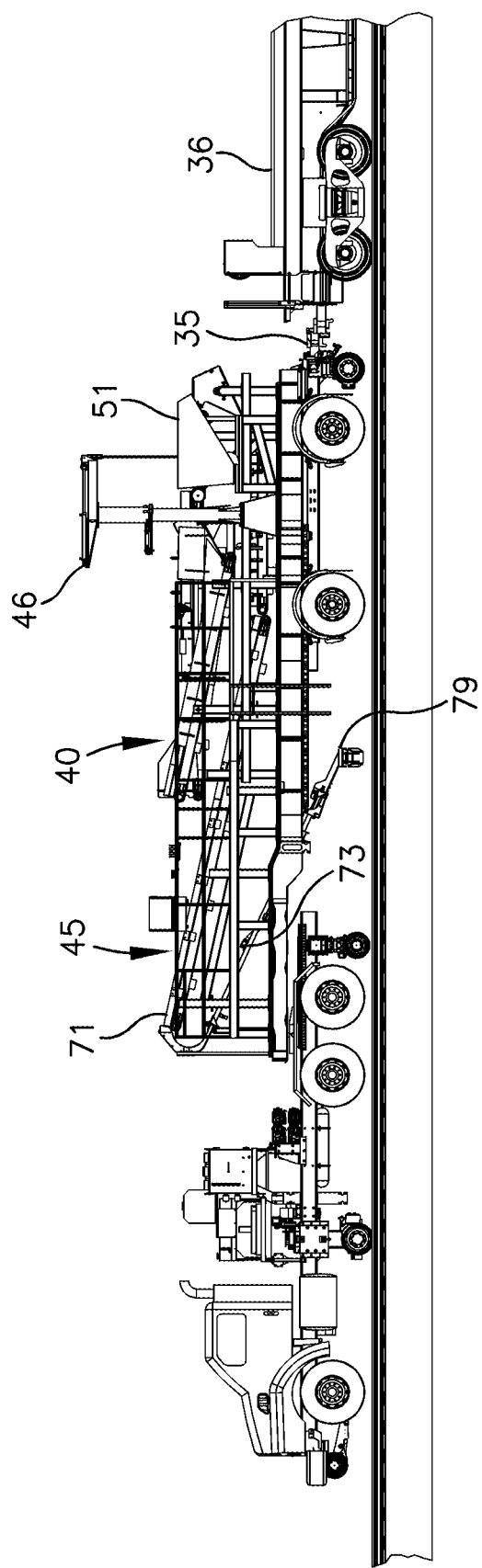
FIG. 6 is a right, side elevational view of the rail tie plate distribution machine coupled with a gondola car as shown in FIG. 5.

A coupler 35 may be connected to the trailer frame 27 at one or both ends to permit the trailer frame 27 to be coupled to a rail car, such as a gondola car 36 as generally shown in FIGS. 5 and 6 in which a relatively large quantity of rail tie plates 10 may be stored. The gondola car 36 may be part of a consist of gondola cars 36 adapted for traversal by a material loader 37 mounted on a flanged wheel bogey or carriage 38. An example of a material loader or material handling machine adapted to traverse the sidewalls of a gondola car or open top rail car 36 is shown in U.S. Pat. No.

6,561,742 of Crawford et al. and assigned to Herzog Contracting Corp. the contents of which are incorporated herein by reference. An electromagnetic head 39 or other tool for picking rail tie plates 10 out of the gondola cars 36 may be mounted on an end of a boom 42 for the material loader 37 for use in unloading rail tie plates 10 from the gondola car 36 and depositing them on the rail tie plate distribution machine 20. It is foreseen that the rail tie plate distribution machine 20 could be mounted on or formed as part of a dedicated rail car and coupled to a plurality of gondola cars 36 on which a material loader operates. The consist of rail cars incorporating the rail tie plate distribution machine 20 and a plurality of gondola cars 36 may be coupled to a locomotive or other prime mover to move the rail cars along the rails.

Figure 7:
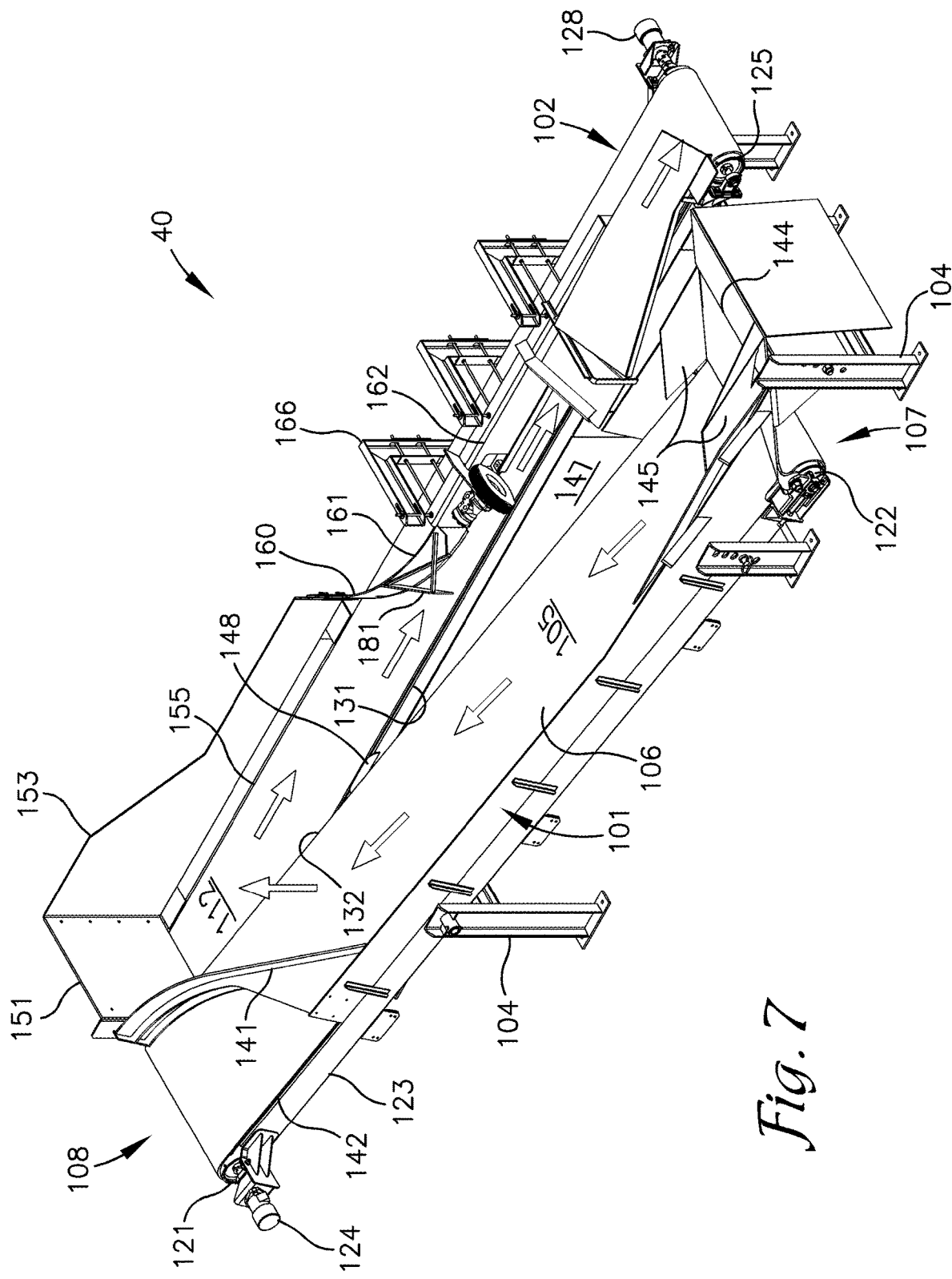
FIG. 7 is a perspective view of a rail tie plate singulating assembly shown separated from the rail car with arrows included to indicate a path of conveyance of rail tie plates through the rail tie plate singulating assembly.
Figure 8:
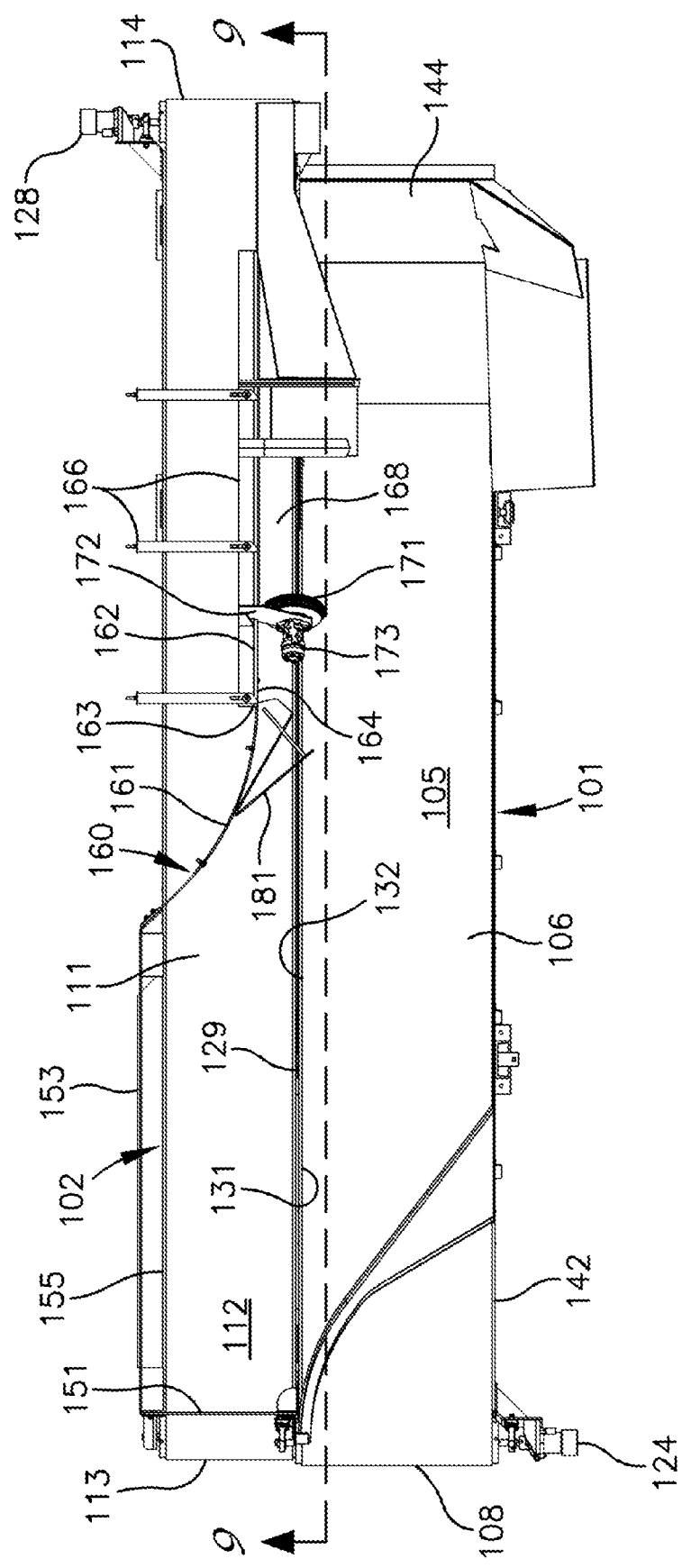
FIG. 8 is a top plan view of the rail tie plate singulating assembly as shown in FIG. 7.
Figure 9:
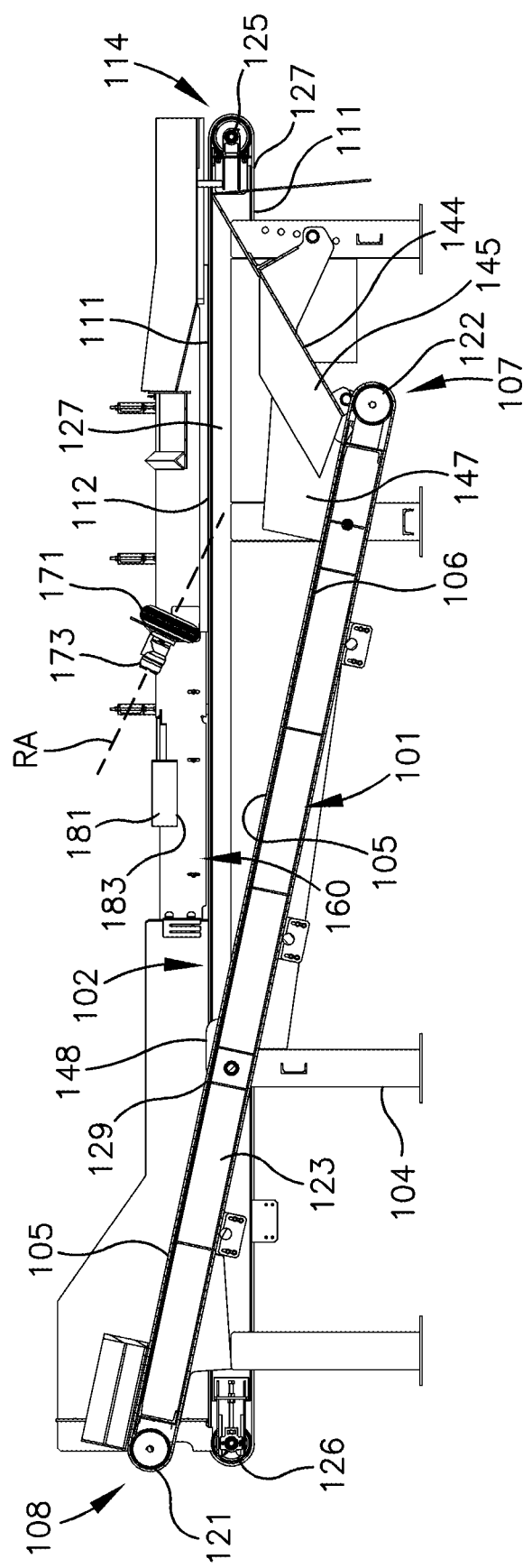
FIG. 9 is a cross-sectional view taken along line 9-9 of FIG. 8.
Figure 10:
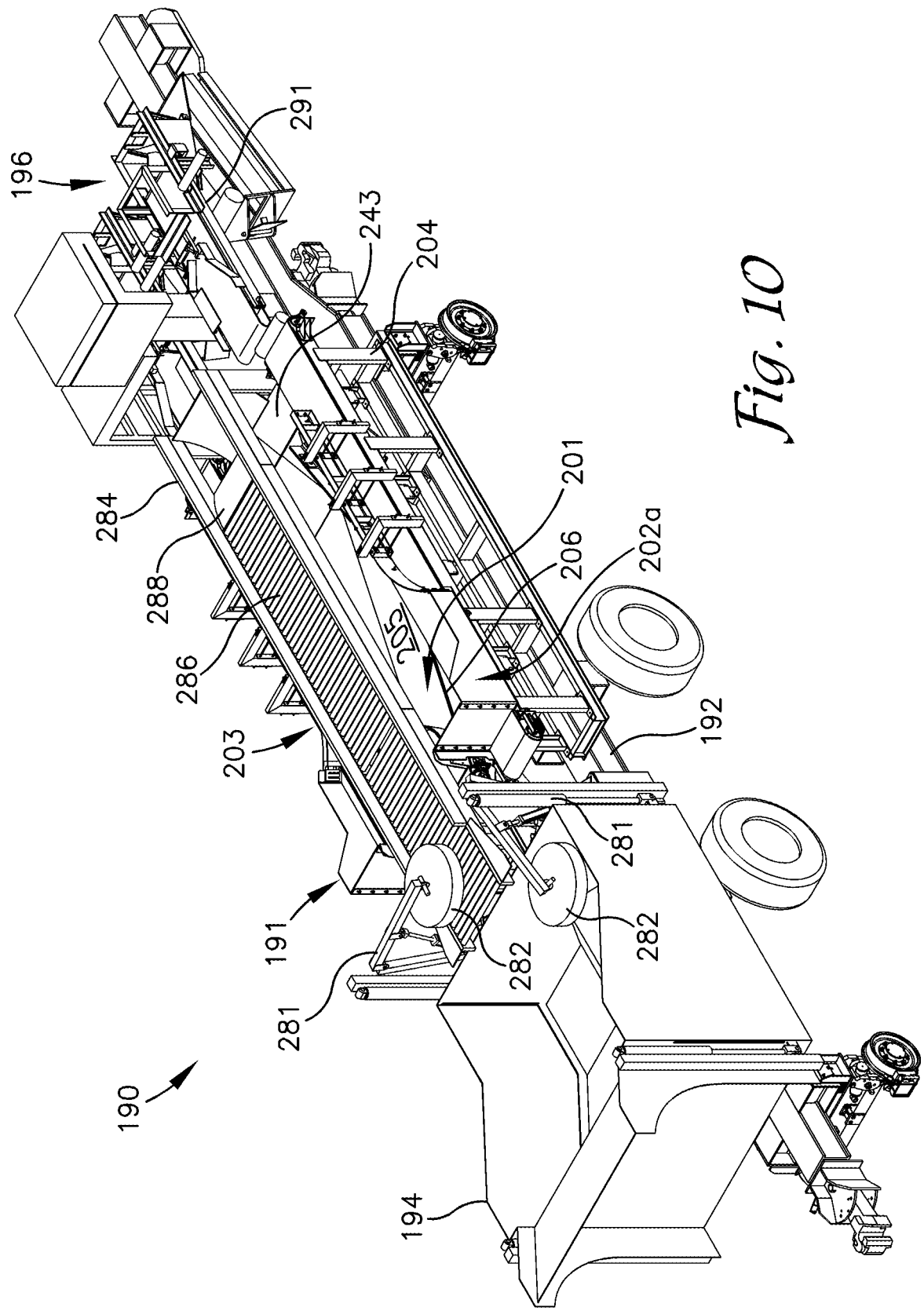
FIG. 10 is a rear, perspective view of an alternative embodiment of a rail tie distribution machine mounted on a trailer.
Figure 11:
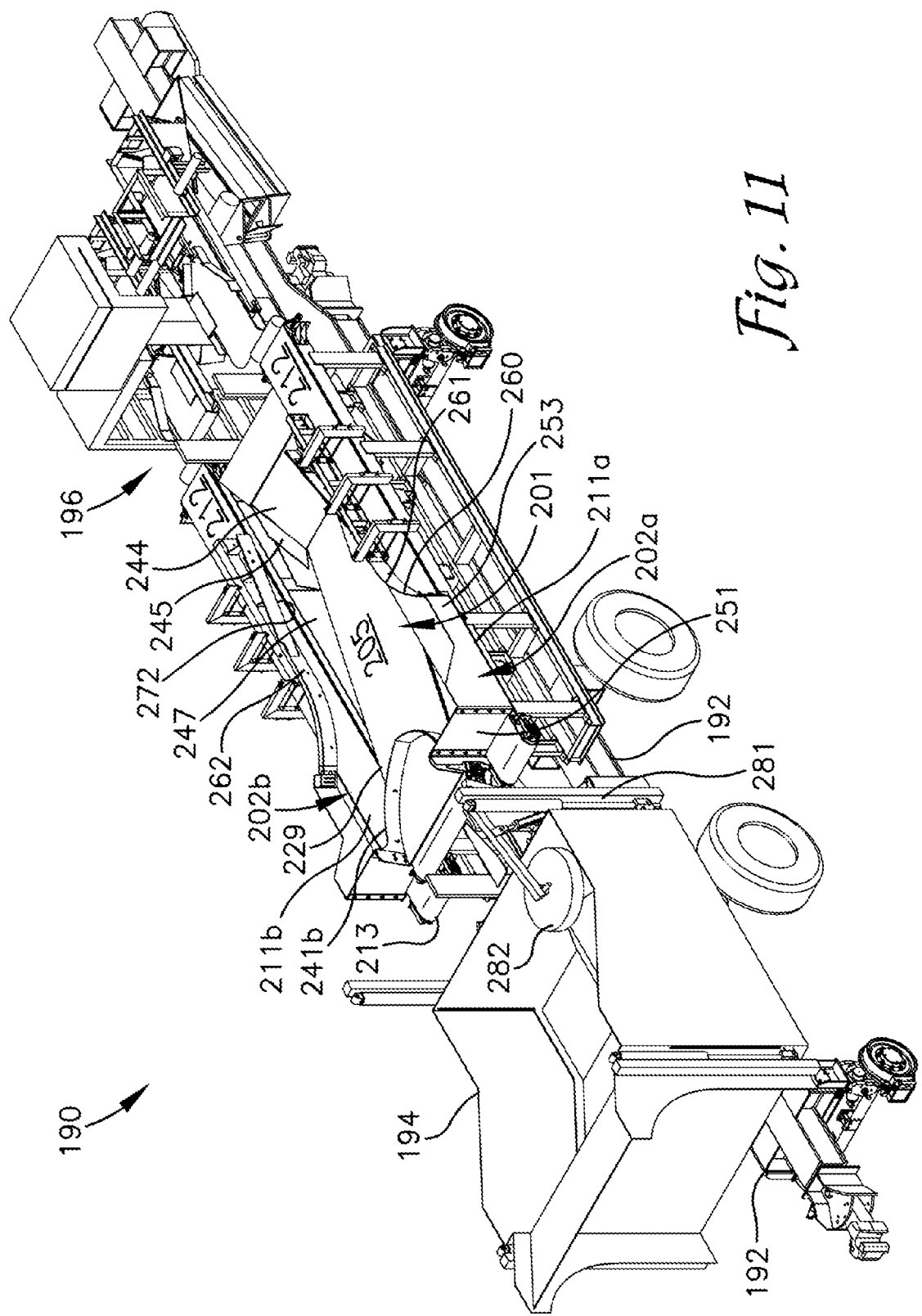
FIG. 11 as a rear, perspective view of the rail tie plate distribution machine on a trailer as in FIG. 10 with portions of the feed conveyor assembly removed to show detail.
Figure 12:
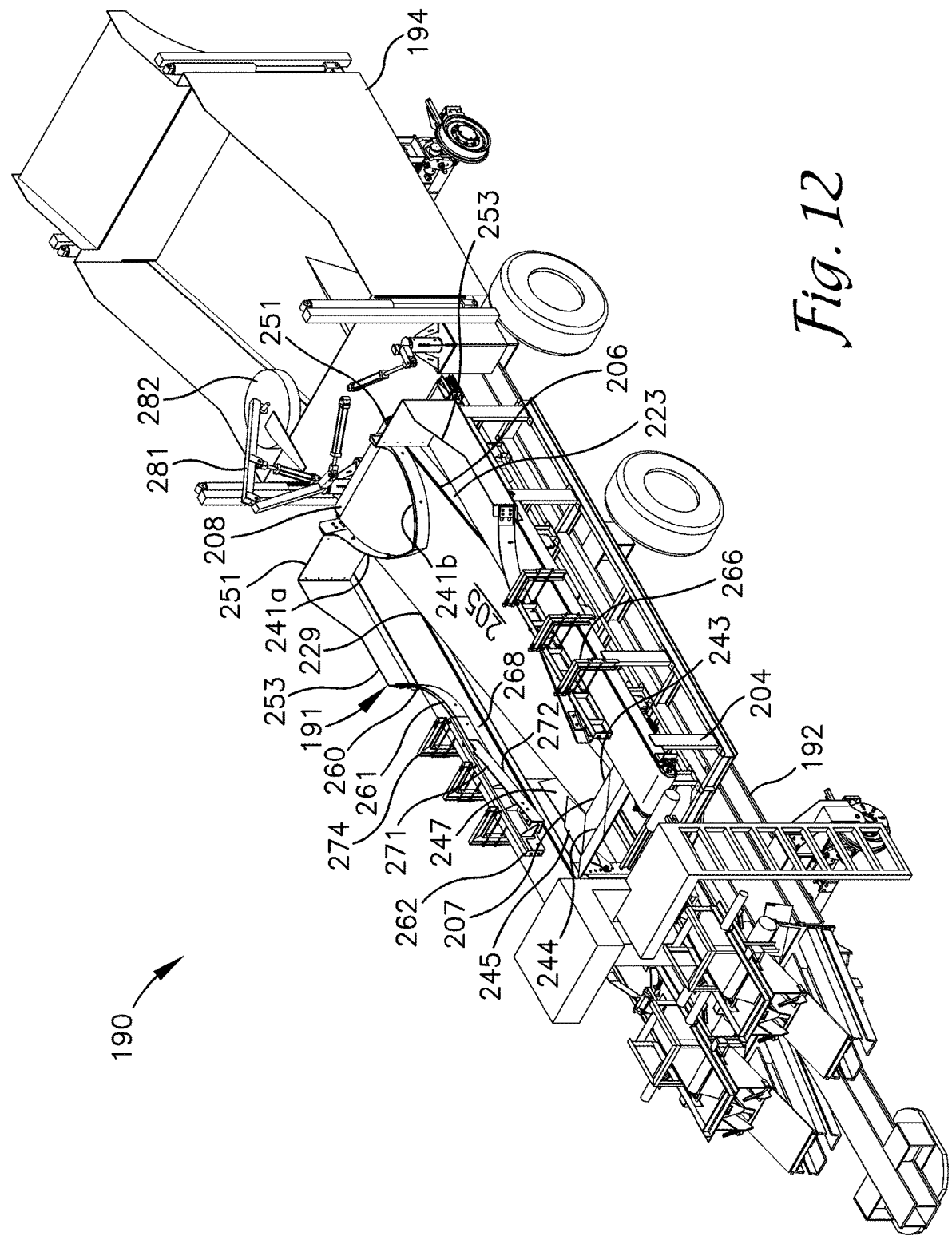
FIG. 12 is a front perspective view of the trail tie plate distribution machine as in FIG. 11 with portions of the feed conveyor assembly removed to show detail.

The rail tie plate distribution machine 20 includes a rail tie plate singulating assembly 40 as shown in FIGS. 7-9, mounted on the trailer frame 27 along with a rail tie plate feed assembly 43 and a rail tie plate orientation and distribution assembly 45. As discussed previously, the boom of the material handling machine may be outfitted with an electromagnetic head operable to attract and hold onto a plurality of rail tie plates 10 to lift the tie plates 10 from the gondola car 36 and then release and deposit the rail tie plates 10 into a bin 51 forming part of the rail tie plate feed assembly 43 on trailer 21.

The rail tie plate feed assembly 43 includes bin 51 and at least one material handling apparatus which in the embodiment shown comprises a crane 53 with an electromagnetic head 55 for transferring rail tie plates 10 from the bin 51 to an inlet end 61 of the singulating assembly 40.

The bin 51, which is sized for receiving and storing a quantity of rail tie plates 10, is mounted proximate a first end 65 of the trailer 21. Rail car coupler 35 for coupling the trailer 21 to a gondola car 36 is connected to the trailer frame 27 at the first end 65 of the trailer 21. The bin 51 may thereby be positioned in close proximity to the gondola car 36 to facilitate transfer of rail tie plates 10 into the bin 51 from a material handling machine operating on the gondola car 36. The rail tie plate singulating assembly 40 is shown supported on a trailer platform 67 proximate the bin 51 with the rail tie plate singulating assembly 40 extending from the side of the bin 51 extending toward the trailer coupler 28 and opposite the rail car coupler 35. In the embodiment shown, the singulating assembly 40 is shown mounted to one side of the trailer platform 67 with a worker platform 69 extending along the opposite side of the trailer platform 67 and adjacent to and along the singulating assembly 40.

Conveyors 71, chutes 73 and other equipment forming the rail tie plate orientation and distribution assembly 45 are mounted on the trailer platform 67 and trailer frame 27 and extend from an outlet end 77 of the singulating assembly 40 along the side of the bin 51, then back under and past the singulating assembly 40 and then back down below the trailer platform 67 to a discharge end 79 of the distribution assembly 45. Equipment mounted on the end of the last conveyor 71 or chute 73 is operable to selectively discharge rail tie plates 10 conveyed thereto by conveyors 71 and chutes 73 in a selected orientation.

The rail tie plate singulating assembly 40 is shown in greater detail in FIGS. 7-9. The rail tie plate singulating assembly 40 can be used separate from the rail tie plate distribution machine 20 and could, for example, be secured in place in a building or on a rail car in addition to the trailer mounting shown in FIGS. 3-6.

The rail tie plate singulating assembly 40, as shown in FIGS. 7-9, includes a lift conveyor 101 and a single singulating conveyor 102 mounted adjacent to the lift conveyor 101 on a singulator frame 104. In the embodiment shown, the singulating conveyor 102 is mounted to the right of the lift conveyor 101 relative to the direction of conveyance of the lift conveyor 101. An upper run or lift conveyor run 105 of a lift conveyor belt 106 slopes upward in a direction of conveyance from an inlet end 107 of the lift conveyor 101 to a distal end 108 thereof. In the embodiment shown, the singulating conveyor 102 includes a singulating conveyor belt 111 with an upper, singulating conveyor run 112 extending generally horizontally and having a direction of conveyance opposite from the direction of conveyance of the lift conveyor 101. The singulating conveyor belt 111 and singulating conveyor run 112 extend from a distal end 113 of the singulating conveyor 102 to an outlet end 114 thereof.

The lift conveyor 101 and singulating conveyor 102 are supported on and above the singulator sub frame 104. In the embodiment shown, the lift conveyor 101 and the singulating conveyor 102 are belt type conveyors. The lift conveyor belt 106 extends around a drive roller 121 and an idler roller 122 mounted on a lift conveyor frame 123. The lift conveyor drive roller 121 may be driven by a motor 124, such as a hydraulic motor, coupled to an axle for the lift conveyor drive roller 121. The singulating conveyor belt 111 of the singulating conveyor 102 extends around a drive roller 125 and a driven roller 126 mounted on a singulating conveyor frame 127. The drive roller 226 for each singulating conveyor 102 is driven by a motor 128, such as a hydraulic motor, coupled to an axle of the respective singulating conveyor drive roller 125.

The distal end 108 of the lift conveyor 101 is the driven end of the lift conveyor 101 and the outlet end 114 of the singulating conveyor 102 is the driven end of the singulating conveyor 102. The lift conveyor run 105 extends below the singulating conveyor run 112 from the lift conveyor inlet end 107 to a y-axis intercept 129 (see FIG. 9) between the lift conveyor run 105 and the singulating conveyor run 112 of the singulating conveyor 102. The lift conveyor run 105 extends above the singulating conveyor run 112 from the y-axis intercept 129 to the lift conveyor distal end 108. In the embodiment shown, the lift conveyor 101 and lift conveyor run 105 slope upward from the inlet end 107 to the distal end 108 at an angle of approximately thirty degrees. It is foreseen that the slope of the lift conveyor 101 and lift conveyor run 105 could vary including between fifteen and forty-five degrees. It is foreseen that between the y-axis intercept 129 and the distal end 108 of the lift conveyor run 105, the lift conveyor run 105 could extend horizontally and in planar alignment with or level with the adjacent singulating conveyor run 112.

In the embodiment shown, the singulating conveyor 102 has a singulating conveyor inner edge 131 extending longitudinally and adjacent an adjacent edge 132 of the lift conveyor 101. Lift conveyor transfer guide 141 extends in spaced relation above the lift conveyor run 105 in a spacing less than the height of a rail tie plate 10 supported on the lift conveyor run 105 so that a rail tie plate 10 will not pass under the lift conveyor transfer guide 141. The lift conveyor transfer guide 141 extends from a first position proximate an outer edge 142 of the lift conveyor 101, and proximate or past the y-axis intercept 129, toward the respective adjacent edge 132 of the lift conveyor 101 adjacent the inner edge 131 of the singulating conveyor 102 and toward the distal end 108 of the lift conveyor 101 such that rail tie plates 10 advanced up the lift conveyor run 105 engage the lift conveyor transfer guide 141 and are guided laterally toward and onto the adjacent singulating conveyor run 112 and past the respective y-axis intercept 129.

A funnel 143 or infeed chute 143, formed from an inlet panel 144 and side panels 145 connected to the singulator frame 104, is mounted at the inlet end 107 of the lift conveyor 101. The inlet panel 144 and side panels 145 slope downward toward the lift conveyor 101, proximate the inlet end 107, to guide or direct rail tie plates 10 discharged onto the inlet panel 144 or side panels 145 onto the lift conveyor 101 and prevent the rail tie plates 10 from falling off the inlet end 107 of the inlet conveyor 101. Sidewalls 147 may also be mounted to the singulator frame 104 below the singulating conveyor 102 along the inner edge 131 thereof and past the adjacent edge 132 of the lift conveyor 101 to prevent rail tie plates 10 from falling off the adjacent edge 132 of lift conveyor 101 below the singulating conveyor 102. A deflector strip 148 is mounted on the singulating conveyor 102 along the inner edge 131 thereof in closely spaced relation forward of the y-axis intercept 129 in the direction of conveyance of the singulating conveyor run 112. The deflector strip 148 covers the gap between the singulating conveyor frame 127 and the singulating conveyor belt 111 to prevent an edge of a rail tie plate 10 advancing up the lift conveyor run 105 from advancing between the conveyor frame 127 and the conveyor belt 111 of the singulating conveyor 102 proximate the y-axis intercept 129.

With reference to singulating conveyor 102, an end wall 151 is connected to the singulator frame 104 to extend across the distal end 113 of the singulating conveyor 102. A sidewall 153 connected to singulator frame 104 extends along an outer edge 155 of the singulating conveyor 102 from the end wall 151 to a position past the y-axis intercept 129 in the direction of conveyance on the singulating conveyor 102. The end wall 151 and sidewall 153 of each singulating conveyor 102 prevent rail tie plates 10 from advancing off of the singulating conveyor 102.

A singulating guide 160 having a first guide section 161 and a second guide section 162 is connected to the singulator frame 104 and extends in spaced relation above each singulating conveyor run 112 in a spacing less than the height of a rail tie plate 10 supported on the singulating conveyor run 112. The first guide section 161 extends in a direction of conveyance of the singulating conveyor 102 from a position at an outer edge or outer side 155 of the singulating conveyor run 112 and past the y-axis intercept 129 toward the outlet end 114 of the singulating conveyor 102 while sloping or curving toward the singulating conveyor inner edge 131. A second end 163 of the first guide section 161 of the singulating guide 160 terminates at or proximate a first end 164 of the second section 162 of the singulating guide 160. The second end 163 of the first guide section 161 and the second guide section 162 are mounted on a support frame 166 connected to the singulator frame 104 and extend over the singulating conveyor run 112.

The second section 162 of the singulating guide 160 extends parallel to and spaced outward from the singulating conveyor inner edge 131 a distance approximately equal to or narrower than a width of a rail tie plate 10 to form a reduced width conveying section 168 on the singulating conveyor run 112 along which a single rail tie plate, supported directly on top of the singulating conveyor run 112, may advance in a longitudinal orientation. The second section 162 of the singulating guide 160 extends from its first end toward the outlet end 114 of the singulating conveyor 102. At least some of the rail tie plates 10 advanced onto the singulating conveyor 102 from the lift conveyor 101 are guided by the singulating guide 160 into longitudinal alignment with the direction of conveyance on the reduced width conveying section 168. Rail tie plates 10 which are not advanced into longitudinal alignment on the reduced width conveying section 168 are advanced off of the singulating conveyor 102 past the y-axis intercept 129 in the conveying direction of the singulating conveyor 102 and fall onto the lift conveyor 101. As generally shown in FIG. 18, the reduced width conveying section 168 may be narrower than the width of a rail tie plate 10 advancing longitudinally therealong as long as the reduced with conveying section 168 is more than half as wide as the width of a rail tie plate 10 advancing longitudinally therealong so that the center of gravity of the rail tie plate 10 is positioned over reduced width conveying section 168. The reduced width conveying section 168 has a width selected to allow only a single rail tie plate 10 to advance in a longitudinal extending alignment along the reduced width conveying section 168.

A plate engaging wheel or plate engaging roller 171 is supported over the reduced width conveying section 168 on a roller support bracket 172 connected to the support frame 166. The plate engaging roller 171 is driven by a drive motor 173 connected to the roller support bracket 172. A lower periphery of the plate engaging roller rotates transverse to the singulating conveyor run 112. As best seen in FIGS. 17 and 18, the plate engaging roller 171 functions as a redirecting means and is operable to engage a rail tie plate 10 supported on top of another rail tie plate 10 advancing longitudinally along the reduced width conveying section 168 to advance the rail tie plate 10 engaged by the lower periphery of the plate engaging roller 171 laterally off of the reduced width conveying section 168 of the singulating conveyor 102 towards and onto the lift conveyor 101. The plate engaging roller 171 is mounted on the bracket 172 and support frame 166 so that the lower periphery of the plate engaging roller 171 is spaced above the singulating conveyor 102 a height which is slightly greater than a height or maximum height of a rail tie plate supported on the singulating conveyor 102 with a bottom of the rail tie plate 10 supported generally flush or horizontally on an upper surface of the singulating conveyor 102.

Figure 13:
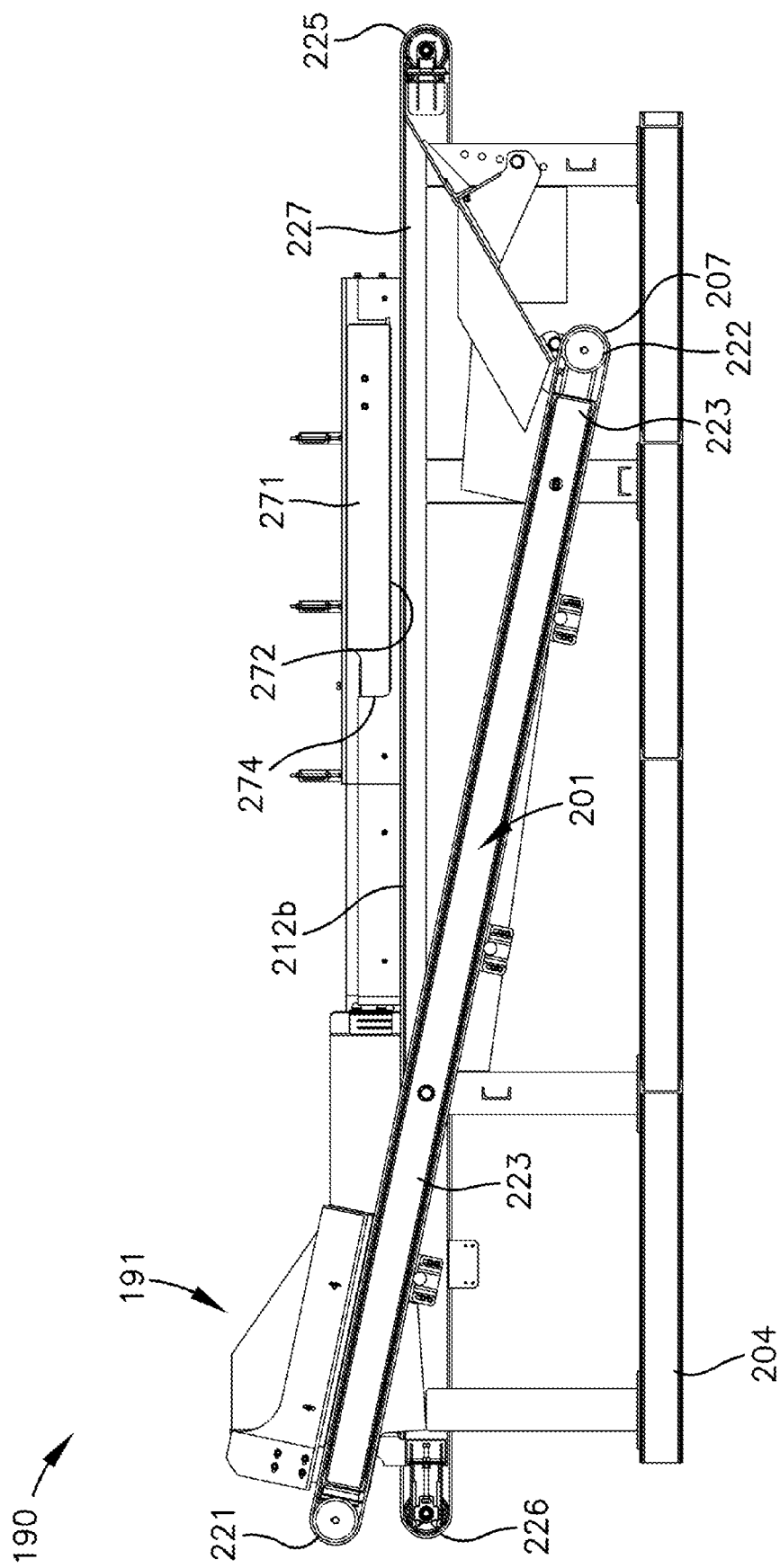
FIG. 13 is a cross-sectional view taken along line 13-13 of FIG. 14.
Figure 14:
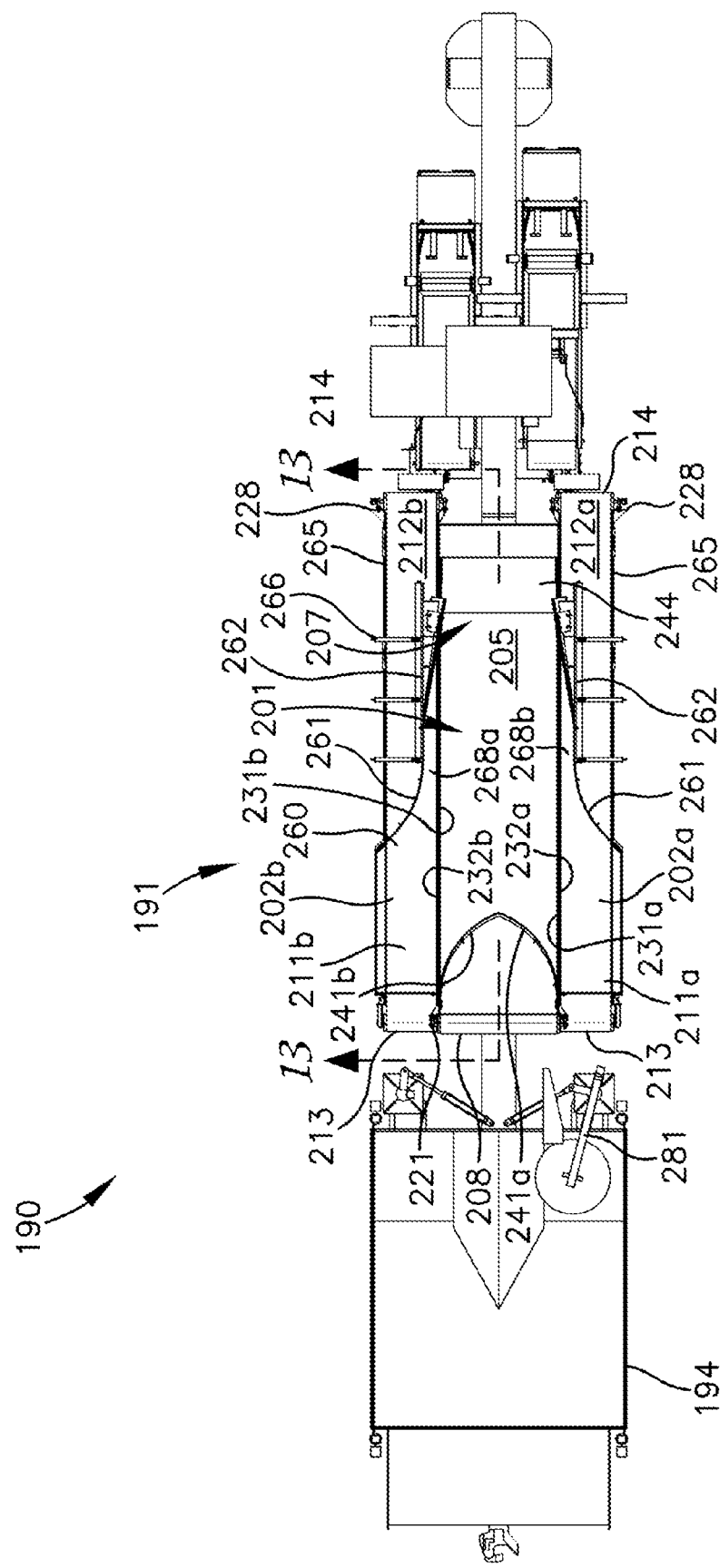
FIG. 14 is a top plan view of the rail tie plate distribution machine as in FIG. 11.
Figure 15:
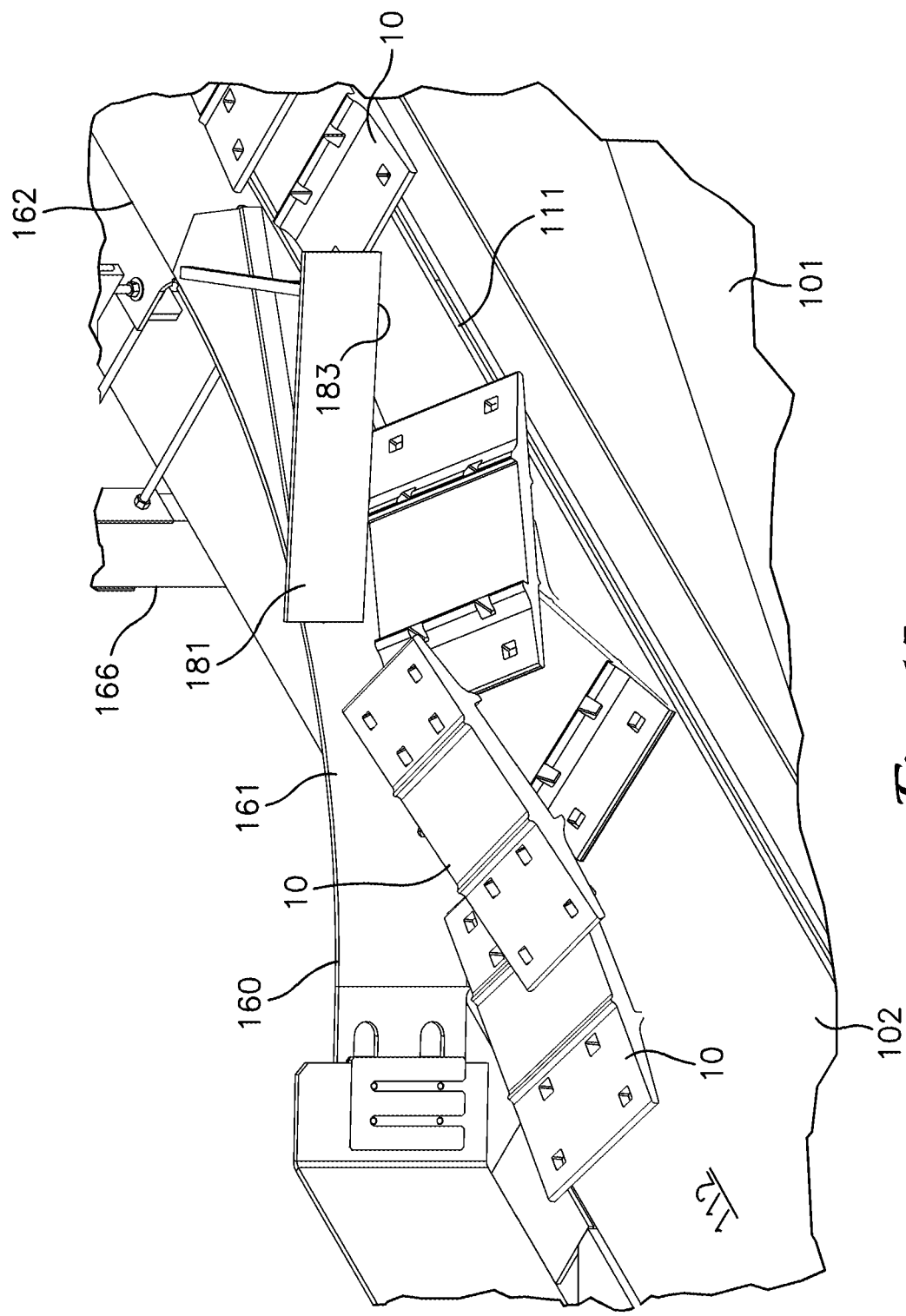
FIG. 15 is an enlarged and fragmentary perspective view of the rail tie plate singulating assembly shown in FIG. 7 with a plurality of rail tie plates advancing along a singulating conveyor toward a tie plate deflector.

In the embodiment shown, an axis of rotation of the plate engaging roller 171, which may be referred to as the roller axis RA (see FIG. 9), extends in a vertical plane which extends parallel to the longitudinal direction of conveyance of a rail tie plate 10 through the reduced width conveying section 168 of singulating conveyor 102. The roller axis RA is angled upward relative to an upper surface of the singulating conveyor run 112 at an acute angle in the direction opposite the direction of conveyance of the singulating conveyor run 112. A lower edge of the plate engaging roller 171 is thereby angled toward the direction from which the rail tie plates 10 are advanced by the singulating conveyor 102 into the roller 171 which may be referred to as from the upstream direction. In the embodiment shown the angle at which the roller axis RA extends relative to upper surface of the singulating conveyor run 112 is approximately twenty-five degrees but it is foreseen that a wide range of angles may be suitable including from approximately fifteen to forty-five degrees. As shown in an alternative embodiment in FIGS. 13 and 14 described hereafter it is foreseen that the redirecting means could alternatively be formed as a fixed structure in the nature of a finger or guide plate having a lower edge spaced above the upper surface of the singulating conveyor run 112 a distance greater than the height of a single rail tie plate 10 but less than the height of two rail tie plates 10 stacked on top of each other. The finger or guide plate might be angled away from the second section 162 of the singulating guide 160 and toward the lift conveyor in the direction of conveyance of the singulating conveyor run 112.

Referring again to FIGS. 7-9, 15 and 16, a tie plate deflector 181 is shown mounted over the singulating conveyor run 112 just prior to its advancement across the reduced width conveying section 168. The tie plate deflector 181 is mounted on the first guide section 161 of the singulating guide 160 approximately medially between the first and second ends thereof. The tie plate deflector 181 generally comprises a rectangular shaped panel extending from the first guide section 161 to and past the singulating conveyor inner edge 131 at an obtuse angle relative to the direction of conveyance of the singulating conveyor 102. A bottom or lower edge 183 of the tie plate deflector 181 is spaced above the singulating conveyor run 112 a distance just shorter than the width of a rail tie plate 10 so that the tie plate deflector 181 will knock down any tie plates 10 standing on edge that are advanced into the tie plate deflector 181. The tie plate deflector 181 also functions to knock down or knock off of the singulating conveyor 102 any relatively large stackings of rail tie plates 10 which might otherwise become lodged or wedged between the roller drive motor 173 and the singulating conveyor 102.

Rail tie plates 10 may be fed into the rail tie plate singulating assembly 40 by a variety of means and sources, including a crane 53 with an electromagnetic head 55 for transferring rail tie plates 10 from a separate hopper or pile into the funnel 143 and onto the lift conveyor 101 at the inlet end 107 therein. Rail tie plates 10 singulated by the singulating assembly 200 may be transferred off of the outlet end 114 of the singulating conveyor 102 to additional equipment or systems such as the rail tie plate distribution assembly 45 discussed previously for further handling and placement of the rail tie plates 10. Such equipment or systems may be selected to distribute or position the singulated rail tie plates at a specific location and in a specific orientation. The rail tie plate singulating assembly 40 could be used at a fixed location for singulating rail tie plates for further handling.

Referring to FIGS. 10-14 an alternative embodiment of a rail tie plate distribution machine 190 is shown having a modified rail tie plate singulating assembly 191 mounted on a trailer frame 192 between a bin 194 and a rail tie plate orienting and distribution assembly 196. The rail tie plate singulating assembly includes a lift conveyor 201 and first and second singulating conveyors 202a and 202b mounted on the trailer frame 192 on opposite sides of the lift conveyor 201. A feed conveyor assembly 203 mounted to the trailer frame 192 and above the lift conveyor 201 conveys rail tie plates 10 lifted from the bin 194 onto a first end of the feed conveyor assembly 203 to a second end thereof where they drop onto a lift conveyor run 205 of a lift conveyor belt 206 at an inlet end 207 thereof.

The rail tie plate singulating assembly 200 as shown in FIGS. 10-14, includes the lift conveyor 201 and first and second singulating conveyors 202a and 202b mounted adjacent to and on opposite sides of the lift conveyor 201 on a singulator sub-frame 204. The upper run or lift conveyor run 205 of the lift conveyor belt 206 slopes upward in a direction of conveyance from the inlet end 207 of the lift conveyor 201 to a distal end 208 thereof. In the embodiment shown, each of the singulating conveyors 202a and 202b includes a singulating conveyor belt 211a and 211b with an upper, singulating conveyor run 212a and 212b extending generally horizontally and having a direction of conveyance opposite from the direction of conveyance of the lift conveyor 201. Each singulating conveyor belt 211a and 211b and singulating conveyor run 212a and 212b extends from a distal end 213 of each singulating conveyor 202a and 202b to an outlet end 214 thereof.

The lift conveyor 201 and singulating conveyors 202a and 202b are supported on and above the trailer frame 192 by the singulator sub-frame 204. In the embodiment shown, each of the lift conveyor 201 and the singulating conveyors 202a and 202b are belt type conveyors. The lift conveyor belt 206 extends around a drive roller 221 and an idler roller 222 mounted on a lift conveyor frame 223. The lift conveyor drive roller 221a and 221b may be driven by a motor (not shown), such as a hydraulic motor, coupled to an axle for the lift conveyor drive roller 221. The singulating conveyor belt 211a and 211b of each of the singulating conveyors 202a and 202b extends around a drive roller 225 and a driven roller 226 (see FIG. 13) mounted on a singulating conveyor frame 227. The drive roller 225 for each singulating conveyor 202 is driven by a motor 228, such as a hydraulic motor, coupled to an axle of the respective singulating conveyor drive roller 225.

The distal end 208 of the lift conveyor 201 may be the driven end of the lift conveyor 201 and the outlet end 214 of each of the singulating conveyors 202a and 202b may be the driven end of the singulating conveyors 202a and 202b. The lift conveyor run 205 extends below each singulating conveyor run 212a and 212b from the lift conveyor inlet end 207 to a y-axis intercept 229 between the lift conveyor run 205 and the singulating conveyor runs 212a and 212b of each singulating conveyor 202a and 202b. The lift conveyor run 205 extends above the singulating conveyor runs 212a and 212b from the y-axis intercept 229 to each lift conveyor distal end 208. In the embodiment shown, the lift conveyor 201 and lift conveyor run 205 slope upward from the inlet end 207 to the distal end 208 at an angle of approximately thirty degrees. It is foreseen that the slope of the lift conveyor 201 and lift conveyor run 205 could vary including between fifteen and forty-five degrees. It is foreseen that between the y-axis intercept 229 and the distal end 208 of the lift conveyor run 205, the lift conveyor run 205 could extend horizontally and in planar alignment with or level with the adjacent singulating conveyor run 212a and 212b.

In the embodiment shown, each of the singulating conveyors 202a and 202b has a singulating conveyor inner edge 231a and 231b extending longitudinally and adjacent an adjacent edge 232a and 232b of the lift conveyor 201. Lift conveyor transfer guides 241a and 241b extend in spaced relation above the lift conveyor run 205 in a spacing less than the height of a rail tie plate 10 supported on the lift conveyor run 205 so that a rail tie plate 10 will not pass under the lift conveyor transfer guides 241a and 241b. Each of the lift conveyor transfer guides 241a and 241b extends from a first position spaced inward and medially between the outer or adjacent edges 232a and 232b of the lift conveyor 201, and proximate or past the y-axis intercept 229, toward the respective adjacent edge 232a and 232b of the lift conveyor 201 adjacent the inner edge 231 of the respective first or second singulating conveyors 202a and 202b and toward the distal end 208 of the lift conveyor 201. The lift conveyor transfer guides are configured such that at least some of the rail tie plates 10 advanced up the lift conveyor run 205 engage the lift conveyor transfer guide 241a and some of the rail tie plates engage the lift conveyor transfer guide 241b and are guided laterally toward and onto the respective, adjacent singulating conveyor runs 212a and 212b and past the respective y-axis intercept 229.

A funnel 243, formed from an inlet panel 244 and side panels 245 connected to the singulator sub-frame 204, is mounted at the inlet end 207 of the lift conveyor 201. The inlet panels 244 slope downward toward the inlet end 207 of the lift conveyor 201 to guide or direct rail tie plates 10 discharged onto the inlet panel 244 onto the lift conveyor 201 and prevent the rail tie plates 10 from falling off the inlet end 207 of the inlet conveyor 201. Sidewalls 247 may also be mounted to the singulator sub-frame 204 below each singulating conveyor 202a and 202b along the inner edge 231 thereof and past the respective outer, adjacent edge 232a and 232b of the lift conveyor 201 to prevent rail tie plates 10 from falling off the respective outer, adjacent edges 232a and 232b of lift conveyor 201 below the singulating conveyor 202a or 202b. A deflector strip (not shown but similar to deflector strip 148 in FIG. 7) is mounted on each singulating conveyor 202a and 202b along the inner edge 231 thereof in closely spaced relation forward of the y-axis intercept 229 in the direction of conveyance of the respective singulating conveyor run 212a and 212b. Each deflector strip covers the gap between the singulating conveyor frame 227 and the respective singulating conveyor belt 211a and 211b to prevent an edge of a rail tie plate 10 advancing up the lift conveyor run 205 from advancing between the conveyor frame 227 and the conveyor belt 211a or 211b of the respective singulating conveyor 202a or 202b proximate the y-axis intercept 229.

With reference to each singulating conveyor 202a and 202b, an end wall 251 is connected to the singulator sub-frame 204 to extend across the distal end 213 of the respective singulating conveyor 202a and 202b. A sidewall 253 connected to singulator sub-frame 204 extends along an outer edge 255 of the respective singulating conveyor 202a and 202b from the end wall 251 to a position past the y-axis intercept 229. The end wall 251 and sidewall 253 of each singulating conveyor 202a and 202b prevent rail tie plates 10 from advancing off of the respective singulating conveyor 202a and 202b.

A singulating guide 260 having a first guide section 261 and a second guide section 262 is connected to the singulator sub-frame 204 and extends in spaced relation above each first singulating conveyor run 212a and 212b in a spacing less than the height of a rail tie plate 10 supported on the respective first singulating conveyor run 212a and 212b. The first guide section 261 extends in a direction of conveyance of the singulating conveyor 202a and 202b from a position at an outer edge or outer side 265 of the singulating conveyor run 212a and 212b and past the y-axis intercept 229 toward the outlet end 214 of the singulating conveyor 202a and 202b while sloping or curving toward the singulating conveyor inner edge 231a and 231b. A second end of the first guide section 261 of the singulating guide 260 terminates at or proximate a first end of the second section 262 of the singulating guide 260. The second end of the first guide section 261 and the second guide section 262 are mounted on a support frame 266 connected to the singulator sub-frame 204 and extend over the singulating conveyor run 212a and 212b.

The second section 262 of the singulating guide 260 extends parallel to and spaced outward from the singulating conveyor inner edge 231a and 231b a distance approximately equal to or narrower than a width of a rail tie plate 10 to form a reduced width conveying section 268a and 268b on the singulating conveyor runs 212a and 212b respectively. The second section 262 of the singulating guide 260 extends from its first end toward the outlet end 214 of the singulating conveyor 202a or 202b. At least some of the rail tie plates 10 advanced onto the singulating conveyor 202a or 202b from the lift conveyor 201 are guided by the singulating guide 260 into longitudinal alignment with the direction of conveyance on the reduced width conveying section 268a and 268b. Rail tie plates 10 which are not advanced into longitudinal alignment on the reduced width conveying section 268a and 268b are advanced off of the singulating conveyor 202a or 202b past the y-axis intercept 229 in the conveying direction and fall onto the lift conveyor 201.

A knockdown panel 271 is supported on the support frame 166 over each reduced width conveying section 268a and 268b such that a lower edge 272 of the knockdown panel 271 is spaced higher than the height of a rail tie plate 10 supported generally flat on the singulating conveyor run 212a and 212b but lower than the height of two rail tie plates 10 stacked on top of each other or a rail tie plate 10 standing on edge. A leading end 274 of the knockdown panel 271 is positioned adjacent the singulating guide 260 and angles away from the second section 262 of the singulating guide 260 and toward the lift conveyor 201 in the direction of conveyance of the singulating conveyor run 212a and 212b. Portions of a rail tie plate 10 extending above the lower edge 272 of the knockdown panel 271 will be engaged by the knockdown panel 271 as the tie plate 10 is advanced into the knockdown panel 271 redirecting the tie plate 10 engaged by the knockdown panel laterally off of the reduced with conveying section 268a or 268b of the singulating conveyor 202a or 202b and onto the lift conveyor 201. In the embodiment shown, the leading end 274 of the knockdown panel 271 is shown positioned adjacent the second section 262 of the singulating guide 260 proximate the first end thereof. It is foreseen that the leading end 274 of the knockdown panel 271 could be positioned against different portions of the singulating guide 260 including proximate the transition from the first section 261 to the second section 262 of the singulating guide 260. For example, the knockdown panel 271 could be mounted to extend generally tangential to a curve of the first section 261 of the singulating guide 260.

In the embodiment shown in FIGS. 10-14, the bin 194 is mounted on the trailer frame 192 adjacent the distal end 208 of the lift conveyor 201 and the distal end 213 of each singulating conveyor 202a and 202b. Rail tie plates 10 to be singulated are loaded into the bin 194 from a separate source such as by a separate magnetic attachment on a material loader retrieving the rail tie plates 10 from gondola cars 36. Cranes 281, with magnetic heads 282, mounted on the trailer frame 192 can be used for loading the bin 194 with rail tie plates 10 or unloading tie plates 10 from the bin 194 and onto the first end of the feed conveyor assembly 203.

The feed conveyor assembly 203 includes a feed conveyor frame 284 connected to and mounted on the trailer frame 192, a feed conveyor 286 supported on the feed conveyor frame 284 and a ramp 288 mounted on the feed conveyor frame 284 at the discharge end of the feed conveyor 286. The feed conveyor 286 may be a driven belt type conveyor or a sloped roller type conveyor assembly by which tie plates 10 deposited on the rollers roll by gravity to the discharge end, or other suitable conveyor. A discharge end of the ramp 288 is positioned over the inlet end 107 of the lift conveyor 101 so that rail tie plates 10 conveyed off the discharge end of the feed conveyor 286 slide down the ramp 288 and fall into and through the funnel 243 and onto the lift conveyor 201.

The embodiment shown, includes two hoists or cranes 281 mounted on the trailer frame 192 on opposite sides of the feed conveyor assembly 203 and adjacent a front end of the bin 194. The cranes 281 may be remotely operated to pivot over the bin 194 and lower the electromagnetic head 282 into close proximity to tie plates 10 stored in the bin 194. Energization of the electromagnetic head 282 draws and secures a plurality of tie plates 10 to the electromagnetic head 282. The electromagnetic head 282 is then pivoted over the feed conveyor 286 and de-energized so that the attached tie plates 10 fall onto the feed conveyor 286 to be fed to the discharge end thereof to fall onto the inlet end 207 of the lift conveyor 201.

With reference to the embodiment shown in FIGS. 1-14, the rail tie plate orientation and distribution assembly 196 is mounted on a distributor sub-frame 291 connected to and supported on the trailer frame 192 proximate the outlet end 214 of the first and second singulating conveyors 202a and 202b. The rail tie plate orientation and distribution assembly 196 may include scanners (not shown) for determining the orientation of the rail tie plate 10 advancing off each singulating conveyor 202a and 202b and a system of conveyors, ramps, chutes or assemblies for rotating and flipping each singulated rail tie 10 as needed to place the rail tie plate 10 in a proper orientation for depositing on a cross tie 12. The rail tie plate orientation and distribution assembly 196 further includes at least one and preferably two aggregator ramps or assemblies (not shown) on which a plurality of properly oriented rail tie plates 10 may be aggregated prior to discharge onto a cross tie 12.

It is foreseen that the rail tie plate singulating assemblies 40 could be used in a variety of applications including vehicle mounted or stationary applications.

Referring now to FIGS. 19-33, one embodiment of the rail tie plate orientation and distribution assembly 45 is shown and includes a tie plate flipping assembly 300 as shown in FIGS. 19-21, a tie plate quarter turn assembly 310 as shown in FIGS. 22-24, and a tie plate distribution assembly 320 as shown in FIGS. 25-33. In the following description, the rail tie plate orientation and distribution assembly 45 will be described as oriented with respect to the rail tie plate distribution machine 20 in FIGS. 3-6

The tie plate flipping assembly 300 is positioned adjacent to and downstream of the outlet end 114 of the reduced width conveying section 168 on the singulating conveyor run 112 described above. In the embodiment shown, the tie plate flipping assembly 300 is mounted on a flipping assembly frame 325, which is mounted to the trailer platform 67 and the trailer frame 27, adjacent the bin 51. As shown in FIGS. 19, 20 and 21, the tie plate flipping assembly 300 includes a tie plate launch conveyor 330 and a dampening slide 334 extending in longitudinally spaced relation from a discharge end 335 of the launch conveyor 330. Separate tie plate flipping assemblies 300 could be utilized with each singulating conveyor run 212a and 212b in the embodiment of the rail tie plate distribution machine 190 shown in FIGS. 14-18.

The launch conveyor 330 is positioned to receive the longitudinally aligned rail tie plates 10 from the singulating conveyor 102 on a generally horizontally oriented launch conveyor run or upper run 336. In the embodiment shown, the launch conveyor 330 is a belt type conveyor having a launch conveyor belt 340 driven by a drive roller 342 located at an inlet end 346 of the launch conveyor 330. The drive roller 342 for the launch conveyor 330 is coupled to the drive roller 125 of the singulating conveyor 102 by a roller or drive chain (not shown). The drive chain extends around and engages a drive sprocket (not shown) on the singulating conveyor drive roller 125 and a driven sprocket 352 coupled to the launch conveyor drive roller 342. In a preferred embodiment, the driven sprocket 352 on the launch conveyor drive roller 342 is smaller than the drive sprocket 350 on the singulating conveyor drive roller 125.

A rate of revolution of the smaller driven sprocket 352 is inversely proportional to a radius of the smaller driven sprocket 352 relative to the larger drive sprocket 350, such that the smaller the radius of the smaller driven sprocket 352 as compared to the larger drive sprocket 350, the greater the number of revolutions the smaller driven sprocket 352 makes with each revolution of the larger drive sprocket 350 increasing the speed of the launch conveyor 330 relative to the singulating conveyor 102. In effect, the rail tie plates 10 accelerate in speed when advanced from the singulating conveyor 102 to the launch conveyor 330. In one embodiment, the launch conveyor belt 340 moves at approximately twice the speed of the singulating conveyor belt 111. In one embodiment, a rail tie plate 10 is advanced on the launch conveyor 330 at a speed of between approximately 250 feet per minute to approximately 350 feet per minute. The speed of the launch conveyor 330 relative to the singulating conveyor 102 may be adjusted to create a desired separation or spacing between the rail tie plates 10 launched off of the launch conveyor 330.

The launch conveyor 330 is mounted on a launch conveyor frame 353. Launch conveyor belt 340 extends around the drive roller 342 at an inlet end 346 of the launch conveyor 330 and a driven roller 354 at the discharge end 335 of launch conveyor 330. The inlet end 346 of the launch conveyor 330 is longitudinally aligned with the outlet end 114 of the singulating conveyor 102 in the direction of conveyance and is positioned such that the launch conveyor run 336 is just lower that the singulating conveyor run 112, such that as the rail tie plate 10 is advanced from the singulating conveyor run 112 to the launch conveyor run 336, a leading edge of the longitudinally aligned and singulated rail tie plate 10 drops down onto the launch conveyor run 336 followed by a trailing edge of the rail tie plate 10. The width of the launch conveyor run 336 is preferably slightly wider than the width of the rail tie plate 10 sitting generally flush or horizontally and longitudinally aligned on the launch conveyor run 336.

Rail tie plate conveyor guards 370 extend along a first section of both sides of the launch conveyor 330 to maintain alignment of the rail tie plates 10 as they drop onto and accelerate on the launch conveyor 330 and prevent the rail tie plates 10 from shifting or falling from the launch conveyor 330. Rail tie plate conveyor guard extension members 372 may extend along a second section of both sides of the launch conveyor 330, bridging the first section having the conveyor guards 370 to dampening slide walls 374 that extend beyond the launch conveyor 330 and along both sides of the dampening slide 334. The conveyor guards 370 and the conveyor guard extension members 372 may progressively narrow to square up or align the rail tie plates 10 as they advance toward the dampening slide 334.

Rail tie plates 10 exiting the singulating conveyor 102 may be oriented right-side or shoulder-side up or right-side or shoulder-side down relative to the singulating conveyor run 120. In a shoulder-side up orientation, the bottom surface 14 of the tie plate 10 is supported on or faces the singulating conveyor run 120 and the shoulders 15 and 16 extend or face upwards. In a shoulder-side down orientation, the shoulders 15 and 16 are oriented facing downward toward the singulating conveyor run 120 and the bottom surface 14 of the tie plate 10 faces upwards. Rail tie plates 10 exiting the singulating conveyor 102 may also be oriented with the short end 18 or the long end 19 as the leading end as the tie plate 10 exits the singulating conveyor 102.

The four expected orientations of tie plates 10 exiting the singulating conveyor 102 comprise, shoulder-side up with the short end 18 as the leading end, shoulder-side up with the long end 19 as the leading end, shoulder-side down with the short end 18 as the leading end or shoulder-side down with the long end 19 as the leading end.

As shown in the figures, the longitudinally aligned rail tie plates 10 are advanced from the singulating conveyor 102 by the launch conveyor 330 toward the dampening slide 334 at a speed and a spacing that result in the shoulder-side down rail tie plates 10 flipping or rotating forward approximately one hundred and eighty degrees into a shoulder-side up orientation, and the shoulder-side up rail tie plates 10 remaining in the same orientation with a leading end of the tie plate 10 bouncing off of the dampening slide 334 with the tie plate 10 changing direction longitudinally while remaining in the shoulder-side up orientation, prior to sliding down the dampening slide 334. Factors that contribute to orienting the rail tie plates 10 right-side up include: the geometry of the tie plate 10, a speed of the launch conveyor belt 340, a distance from the launch conveyor 330 to the dampening slide 334, and an angle of the dampening slide 334. It is also believed that as rail tie plates 10 positioned on the launch conveyor 330 in a shoulder-side down orientation reach the discharge end 335 of the launch conveyor 330, the greater distance that the leading end of the tie plate 10 drops as the shoulder 15 or 16 drops off the discharge end 335 of the conveyor than a tie plate 10 oriented shoulder-side up, and the lower center of mass of the leading end of the tie plate 10 in the shoulder-side down orientation imparts a greater rotational momentum on a shoulder-side down tie plate 10 exiting the launch conveyor 330 than a shoulder-side up tie plate 10 sufficient to cause the leading end of the shoulder-side down tie plate 10 to rotate more than ninety degrees below horizontal before hitting the dampening slide 334 which results in the leading end of the tie plate 10 sliding back under the trailing end of the tie plate 10 and causing the tie plate 10 to flip over into a shoulder-side up orientation.

An upper section 380 of the dampening slide 334 is spaced apart from the discharge end 335 of the launch conveyor 330 and extends approximately level or slightly above the launch conveyor run 336. The dampening slide 334 curves downward toward a flipping assembly outlet section 383 which extends under the discharge end 335 of the launch conveyor 330. In the embodiment shown, the rail tie plates 10 advance from the dampening slide 334 to the outlet section 383, advancing in a direction opposite the direction of conveyance of the launch conveyor 330.

The dampening slide 334 includes a resilient strip 390 overlying a dampening lining 392, both of which extend from the upper section 380 to the lower section 396 of the dampening slide 334 which slopes toward the outlet section 383. The dampening lining 392 absorbs the force or impact of each of the rail tie plates 10 as they are launched off the launch conveyor 330, minimizing rebound or bounce of each of the rail tie plates 10 after it impacts the dampening slide 334. The dampening lining 392 may be formed from a rubber or conveyor belt material that would be known to one skilled in the art. The resilient strip 390 provides a resilient, smooth surface on which the rail tie plates 10 slide without getting stuck due to friction or adherence and may be formed from an ultra-high molecular weight plastic or polyethylene with properties including high abrasion resistance and wear resistance. It is foreseeable that the dampening slide 334 could be formed from one or more layers of material. The lower section 396 of the dampening slide 334 may be secured to an adjustable paddle 398 supporting the lower section 396 of the dampening slide 334 or to another support structure to prevent curling of the dampening slide 334 or movement thereof.

A vertically extending guard flap or curtain 403 extends downward, unanchored at a lower end 405, from adjacent the discharge end 335 of the launch conveyor 330 to just above the rail tie plate flipping assembly outlet section 383. The guard flap 403 extends between and is fastened to each of the dampening slide walls 374. In the embodiment shown, fastening members or projections 406 are formed on and extend upward on each side of a rail tie plate recess 407 and are fastened to the dampening slide wall 374 on each side of the launch conveyor 330. The rail tie plate recess 407 is formed in the guard flap 403 such that the guard flap 403 does not interfere with a trajectory of the rail tie plates 10 advancing from the launch conveyor 330. After the rail tie plate 10 is launched off the launch conveyor 330 and impacts the dampening slide 334, some rail tie plates 10, particularly rail tie plates 10 launched off of the launch conveyor 330 in a shoulder-side up orientation, may impact or bounce into and then bounce off of the guard flap 403. The guard flap 403 remediates or prevents any rail tie plates 10 bouncing off of the dampening slide 334 from over rotating out of a shoulder-side up orientation. The rail tie plates 10 then advance under the guard flap 403. The guard flap 403 may be formed from a heavy, resilient rubber or plastic material, such as conveyor belt material or another foreseeable material.

The angle of the lower section 396 of the dampening slide 334 complements the trajectory of the rail tie plates 10 as they are flipped or as they slide down the dampening slide 334 such that the rail tie plates 10 remain in the shoulder-side up orientation and do not continue to rotate. The adjustable paddle 398 supports a middle section 408 of the dampening slide 334 and is adjustably positionable to adjust or optimize the angle of the dampening slide 334. The adjustable paddle 398 includes a longitudinally extending paddle underframe 409 that supports a paddle board 410 on which the dampening slide 334 is supported. The adjustable paddle 398 is rotatably supported on an upper end by a paddle shaft or support member 411 that extends through the dampening slide walls 374. As shown in the embodiment, the paddle board 410 is supported at a lower end by an actuator 412 that extends through a transverse support 414 secured between upwardly extending frame portions 416 secured to the rail tie plate flipping frame 325. The angle of the adjustable paddle 398 is adjusted by extension and retraction of the actuator 412. Actuator 412 may be controlled by a controller (not shown).

The dampening slide side walls 374 extend from each side of the launch conveyor 330 to at least the dampening slide 334. In the embodiment shown, the side walls 374 extend to the dampening slide end wall 420 such that the adjustable paddle 398 and the paddle support member 411 are enclosed between the side walls 374 and the end wall 420. The side walls 374 are positioned on each side of the dampening slide 334 with a distance between the side walls 374 slightly wider than the dampening slide 334 to help maintain the rail tie plates 10 in the desired longitudinal alignment within the rail tie plate flipping assembly 300. Inwardly extending flanges or rails 422 formed on or extending from an angled bottom edge of the side walls 374 support the lower section 396 of the dampening slide 334, below or after the adjustable paddle 398, and extend to the rail tie plate flipping assembly outlet section 383. In one embodiment, the rail tie plates 10 in a shoulder-side up alignment slide from the dampening slide 334 onto a lower slide surface 424 that extends between the flanges 422 from the end of the dampening slide 334 to an outlet 430 of the rail tie plate flipping assembly 300. In another embodiment a gap 432 extends between the dampening slide 334 and the lower slide surface 424. The rail tie plates 10 slide from the dampening slide 334 onto the inwardly extending flanges 422 of the gap 432 such that improperly aligned rail tie plates 10 fall through the gap 432. Properly aligned rail tie plates 10 slide along the flanges 422 to the lower slide surface 424 and then advance through the outlet 430 of the rail tie plate flipping assembly 300 and to an inlet end 434 of the rail plate quarter turn assembly 310.

In the embodiment shown if FIGS. 22, 23 and 24, the tie plate quarter turn assembly 310 includes a quarter turn conveyor 436 which conveys rail tie plates 10 received from the flipping assembly 300 in a shoulder-side up, longitudinally extending orientation past a profile scanner or sensor 438 for determining the longitudinal orientation of the tie plate 10, into and past a diverter 441 for redirecting and rotating the rail tie plates 10 to advance toward one side or either side 446 and 448 of the quarter turn conveyor 436 at an acute angle relative thereto and into a pivot inducing abutment 449 or 450 on opposite sides 446 and 448 of the quarter turn conveyor 436. Advancement of a portion of the leading edge of the rail tie plate 10 into the abutment 449 or 450 causes the rail tie plate 10 to further rotate into a transverse alignment relative to the direction of conveyance on the quarter turn conveyor 436 or approximately 90 degrees from the original longitudinal orientation.

The outlet 430 of the rail tie plate flipping assembly 300 extends toward and aligns with an inlet end 434 of the quarter turn conveyor 436. In the embodiment shown, the rail tie plate quarter turn assembly 310 extends under the launch conveyor 330 and the singulating conveyor 102 in a horizontal alignment generally parallel to the singulating conveyor 102 and the direction of conveyance of the quarter turn conveyor 436 is generally opposite the direction of conveyance of the singulating conveyor 102 and the launch conveyor 330.

The quarter turn conveyor 436 is supported on a quarter turn conveyor frame 502 which, in the embodiment shown, is mounted to the trailer platform 67 on the trailer frame 27 and extends under the rail tie plate flipping frame 325 and the singulating conveyor frame 127. The quarter turn conveyor 436 may be a belt type conveyor having a quarter turn conveyor belt 510 extending around a drive roller 512 and a driven roller 514. The drive roller 512 may be driven by a motor 520, such as a hydraulic motor, coupled to an axle of the quarter turn conveyor drive roller 512. In the embodiment shown, a distal end of the quarter turn conveyor 436 is the drive end of the quarter turn conveyor 436.

Guide walls 522 extend just above an upper run 523 of the quarter turn conveyor 436 between the inlet end 434 of the quarter turn conveyor 436 and the diverter 441. The guide walls 522 are supported above the quarter turn conveyor upper run 523 on a support frame 524 connected to the quarter turn conveyor frame 502. Bottom edges of the guide walls 522 are spaced just above the upper run 523 a height or distance less than the height of a single rail tie plate 10 sitting generally flush or horizontal on the quarter turn conveyor upper run 523. The guide walls 522 are laterally spaced apart a distance slightly greater than a width of a rail tie plate 10. The guide walls 522 extend in generally parallel spaced relation except for ends thereof proximate the inlet end 434 of the quarter turn conveyor 436 which are outwardly flared. The outwardly flared ends of guide walls 522 funnel rail tie plates 10 exiting the dampening slide 334 to advance longitudinally between the otherwise parallel extending guide walls 522 and into the path of the diverter 441 at the opposite end thereof.

In the embodiment shown, the profile scanner 438, which may be a proximity sensor, is mounted on the guide wall support frame 524 over the quarter turn conveyor upper run 523, between the guide walls 522 and proximate the inlet end 434 of the quarter turn conveyor 436. A triggering sensor 536, which may be a presence type sensor, is shown in FIG. 20 positioned at the rail tie plate flipping assembly outlet section 383 to detect each of the rail tie plates 10 as each tie plate 10 advances across the lower slide surface 424 to the inlet end 434 of the quarter turn conveyor 436. The sensor 536 activates the profile scanner 438 after a selected time, to take one or more readings and can be used to determine the longitudinal orientation of shoulder-side up rail tie plates 10. In the embodiment shown, the proximity sensor 438 takes two readings, approximately 30 microseconds (µs) apart, as each rail tie plate 10 advances along the quarter turn conveyor upper run 523 to determine the profile, orientation or direction of the rail tie plate 10. In one embodiment, the two readings correspond to the portions of the rail tie plate 10 that are outside the shoulders 15 and 16 or toward the extremities of the rail tie plate 10 and a differential between the two readings is determinative of the orientation of the rail tie plate 10 including whether the short end 18 or the long end 19 is the leading end of the rail tie plate 10. In alternate embodiments, the time interval between the readings and/or the number of readings may vary depending on at least the length, profile, and speed of the rail tie plate 10 on the quarter turn conveyor 436.

The proximity sensor 438 transmits the data or information from the readings of each rail tie plate 10 to a controller (not shown) that controls the diverter 441 for directing the corresponding rail tie plate 10 toward either one of a left side 446 or a right side 448 of the quarter turn conveyor 436 and a corresponding left or right side rotation inducing abutment 449 or 450, depending on the orientation of the rail tie plate 10. As used herein, directional references to the tie plate quarter turn assembly 310 are with respect to a direction of conveyance of a rail tie plate 10 on the quarter turn conveyor 436 with the left side 446 of the conveyor 436 being on the left side of a tie plate 10 when viewed from above and the right side 448 being on the right side of the tie plate 10 when viewed from above.

In the embodiment shown, the diverter 441 is adapted to divert rail tie plates 10 toward either the left side or right side rotation inducing abutment 449 or 450 depending on whether the short end 18 or long end 19 is the leading end of the rail tie plate 10. Advancement of a tie plate 10 against the left side abutment 449 causes the tie plate to rotate counter-clockwise as the conveyor 436 conveys the tie plate 10 past the left side abutment 449. Advancement of a tie plate 10 against the right side abutment 450 causes the tie plate to rotate clockwise as the conveyor 436 conveys the tie plate 10 past the right side abutment 450.

The diverter 441 includes a paddle 538 rotatably mounted on a paddle support structure or frame 540 that extends over the quarter turn conveyor 436 and left and right guides or guide walls 541 and 542. A linear actuator 543, such as a pneumatic cylinder, is connected between the quarter turn conveyor frame 502 and the paddle 538 to pivot the paddle 538 laterally. Operation of the pneumatic cylinder 543 and the paddle 538 connected thereto is controlled by the controller in communication with the proximity sensor 438. Based on the information from the readings of the rail tie plate 10 from the proximity sensor 438, the controller determines whether a short end 18 or a long end 19 of the rail tie plate 10 is the leading edge. Depending on which end is the leading edge, the controller selectively extends or retracts the pneumatic cylinder 543 to pivot the paddle 538 to either a first position or a second position respectively, to direct the rail tie plate 10 toward the left or right side rotation inducing abutment 449 or 450 in order to obtain a consistent orientation of the tie plates 10.

The paddle 538 includes an arm portion 556 that extends upward from a paddle body 557. An actuator mount 560 is formed on and extends upward from the paddle body 557 for connection of an end of the actuator 543 thereto. In the embodiment shown, the paddle body 557 is formed in a triangular shape that can be best described as an isosceles triangle with a smallest side or base 562 of the triangle facing in the direction of conveyance of the quarter turn conveyor 436 and a peak or vertex 564 pointed toward the incoming rail tie plates 10 or opposite the direction of conveyance.

The arm portion 556 extends upward from the paddle body 557 and is rotatably joined by bearings 566 to a shaft 567 extending above and below a crossbar 568 of the paddle support structure 540. First and second angled brackets 570 and 572 project from the crossbar 568 toward the inlet end 434 of quarter turn conveyor 436 to limit rotation of the paddle 538 relative to the paddle support structure 540. The paddle 538 is supported on the crossbar 568 such that the bottom edge of the paddle body 557 is spaced a distance less than the height of the rail tie plate 10 above the quarter turn conveyor run 523.

The guide walls 541 and 542 are connected to the quarter turn conveyor frame 502 and extend inward and over the upper run 523 of the quarter turn conveyor 436 at a spacing above the upper run 523 that is less than the height of a rail tie plate 10 extending above the upper run 523 of the quarter turn conveyor 436. Each guide wall 541 and 542 includes a first angled section 582 that angles inward toward a center of the quarter turn conveyor upper run 523 and creates a narrowing channel or funnel along with the rotation paddle 538 and a second angled section 584 that directs or guides each rail tie plate 10 toward the left or right rotation inducing abutment 449 or 450.

The left and right abutments 449 and 450 each include a shoulder 590 that is formed on and extends inwardly from a corresponding turning area wall 591 at an angle relative to the inside of the turning area wall 591 just greater than 90°. Each shoulder 590 is joined to a second guide wall 592 that extends approximately parallel to and in inwardly spaced relation from the quarter turn conveyor frame 502. Each second guide wall 592 is connected to the corresponding shoulder 590 and supported by at least one subframe support 593 that is secured to the quarter turn conveyor frame 502. The second guide walls 592 are spaced apart from each other a distance slightly greater than the length of the rail tie plate 10 such that a rail tie plate that has been rotated to extend transvers to the direction of conveyance can advance in alignment between the second guide walls 592. The shoulders 590 and the second guide walls 592 are supported above the quarter turn conveyor upper run 523 less than the height of a rail tie plate 10 sitting generally flush on the quarter turn conveyor run 523.

In the embodiment shown, an energy absorbing wall or compressible member 594 is positioned in front of each shoulder 590 and in the path of a portion of a leading edge of the rail tie plate 10 after it passes between the paddle 538 and the respective guide wall 541 or 542 to absorb the impact of the rail tie plate 10. In the embodiment shown, the energy absorbing wall 594 is formed as a leaf of a hinge pivotably secured to the turning area wall 591 on a hinge pin 595 upstream of each shoulder 590. The energy absorbing wall 594 extends from the hinge pin 595 toward the center of the quarter turn conveyor run 523, upstream of the shoulder 590 at an obtuse angle relative to the turning area wall 591 just greater than 90°, and an upstream facing surface of the energy absorbing wall 594 faces upstream toward the diverter 441. A shock absorber or dampener 596 extends behind the energy absorbing wall 594 to dampen or buffer the force of impact of the rail tie plate 10 as it advances into and against the energy absorbing wall 594 of the respective shoulder 590 to form the left and right rotation inducing abutments 449 and 450.

In an exemplary embodiment of the rail tie plate quarter turn assembly 310, after each rail tie plate 10 enters the inlet end 434 of the quarter turn assembly 310 the sensor 438 is triggered by sensor 536 to determine and communicate directional information of the rail tie plate 10 to the controller indicative of whether the short end 18 or the long end 19 of the rail tie plate 10 is the leading end of the tie plate. The controller directs the pneumatic cylinder 543 to extend or retract to pivot the paddle 538 between first or second positions depending on the sensed orientation of the tie plate 10 advancing toward the paddle 538. In a first position, the tip or apex of the paddle 538 is pivoted toward a left side of the quarter turn conveyor 436 opposite the right side of the conveyor 436 and abutment 450 toward which the rail tie plate 10 is to be directed. With the paddle 538 pivoted so that the paddle apex is pivoted toward the left side of the quarter turn conveyor 436, a rail tie plate 10 advancing between the angled paddle 538 and the right quarter turn guide wall 542 is diverted at an acute angle to advance toward the right rotation inducing abutment 450. With the paddle 538 pivoted so that the paddle apex is pivoted toward the right side of the quarter turn conveyor 436, a rail tie plate advancing between the angled paddle 538 and the left quarter turn guide wall 541 is diverted at an acute angle to advance toward the left rotation inducing abutment 449. When an outer portion of the leading edge of the rail tie plate 10 impacts the respective energy absorbing wall 594 of the left or right abutments 449 or 450, a trailing edge of the rail tie plate 10 rotates inward or toward the center of the quarter turn conveyor run 523 until the rail tie plate 10 is no longer contacting the abutments 449 or 450, such that the rail tie plate 10 extends transverse to the conveyor run 523. The transversely oriented tie plate 10 advances between the second guide walls 592 toward an outlet 600 of the rail tie plate quarter turn assembly 310.

In one application, if it is desired that the rail tie plates 10 exiting the quarter turn assembly 310 be oriented with the short end 18 of each tie plate 10 extending to the left side of the conveyor, the controller is programmed to cause the actuator 543 to pivot the paddle 538 to direct rail tie plates 10 to the left abutment 449 if the readings from the sensor 438 indicate that the leading end of the tie plate 10 is the short end 18 and to pivot the paddle 538 to direct rail tie plates 10 toward the right abutment 450 if the readings from the sensor 438 indicate that the leading end of the tie plate 10 is the long end 19. If it is desired that the rail tie plates 10 exiting the quarter turn assembly 310 be oriented with the long end 19 of each tie plate 10 extending to the left side of the conveyor, the controller is programmed to cause the actuator 543 to pivot the paddle 538 to direct rail tie plates 10 to the left abutment 449 if the readings from the sensor 438 indicate that the leading end of the tie plate 10 is the long end 19 and to pivot the paddle 538 to direct rail tie plates 10 toward the right abutment 450 if the readings from the sensor 438 indicate that the leading end of the tie plate 10 is the short end 18.

It is also foreseen that in some applications, the quarter turn assembly 310 could be operated without using a sensor 438 to determine the orientation of the tie plate 10 and the paddle 538 could be set to direct every tie plate 10 toward a single abutment 449 or 450 on one side of the quarter turn conveyor 436 and the orientation of the tie plates 10 could be determined at a later step in the process for determining how the tie plate 10 should be discharged from the system. For example, it is foreseen that approximately half of the rail tie plates 10 entering the quarter turn assembly 310 will be oriented with the short end 18 as the leading end and half with the long end 19 as the leading end. Directing each of the ties 10 against the right abutment 450 will result in approximately half of the tie plates 10 oriented with the short end 18 extending to the right side of the conveyor 436 and half with the long end 19 extending to the right side of the conveyor 436. Alternatively, directing each of the ties 10 against the left abutment 449 will result in approximately half of the tie plates 10 oriented with the short end 18 extending to the left side of the conveyor 436 and half with the long end 19 extending to the left side of the conveyor 436.

In one embodiment, as the rail tie plates 10 transition between the quarter turn conveyor run 523 and the rail tie plate distribution assembly 320 a squaring flap (not shown) extending from above the conveyor run 523 squares or lines up the rail tie plates prior to distribution.

The rail tie plate distribution assembly 320 shown in FIG. 25 includes an elevation conveyor 610, a first curved guide chute 612, a second curved guide chute 613, a splitter or router 614, chutes 73 including an accumulation slide or upper accumulation slide 616 and a lower accumulation slide 617, a dealer assembly 618, and a final orienting discharge assembly 620. The first and second guide chutes 612 and 613 and the router 614 may collectively be referred to as a routing assembly 619. In the embodiment shown, the elevation conveyor 610 is a belt type conveyor and is mounted to the trailer platform 67 on the trailer frame 27. The elevation conveyor 610 extends at an upward angle from the outlet 600 of the rail tie plate quarter turn assembly 310, under the singulating conveyor frame 127, to the first curved guide chute 612 which extends forward of the singulating conveyor end wall 151 above the singulating conveyor frame 127. A rail tie plate elevation belt 622 of the elevation conveyor 610 mounted on an elevation conveyor frame 623 extends around a drive roller 624 and a driven roller 626. The drive roller 624 may be driven by an elevation conveyor motor 632, such as a hydraulic motor, coupled to an axle of the elevation conveyor drive roller 624. In the embodiment shown a distal end 633 of the elevation conveyor 610 is the drive end of the elevation conveyor 610.

An inlet end 634 of an elevation conveyor run or upper run 636 is positioned slightly lower than the outlet 600 of the rail tie plate quarter turn conveyor run 523, such that a leading edge of the rail tie plate 10 drops down onto the elevation conveyor run 636 followed by a trailing edge of the rail tie plate 10. Elevation conveyor guards 650 extend in parallel relation to each other along both sides of the elevation conveyor frame 623 from the inlet end 634 to the distal end 633 of the elevation conveyor run 636, run parallel to the edges of the elevation conveyor frame 623 and are spaced apart from each other a distance slightly greater than the length or long side of the rail tie plate 10. The elevation conveyor guards 650 are secured to offset brackets 652 secured to the elevation conveyor frame 623 and maintain the rail tie plates 10 in alignment and prevent the rail tie plates from falling from the elevation conveyor run 636.

In the embodiment shown, one or more sensors 654 are positioned on a cantilevered arm 656 above the elevation conveyor run 636 near the distal end 633 of the elevation conveyor run 636. The sensors 654 are connected to a controller (not shown) that controls the router 614 that may be used to split the single stream of rail tie plates 10 into multiple streams of rail tie plates 10 to be distributed or routed to different areas or portions of a railroad track. The sensors 654 may be one or a combination of sensors known to one skilled in the art that may be used to determine the presence, orientation and/or profile of each of the rail tie plates 10. It is foreseeable that the sensors 654 may be alternately positioned, such as at positions along the side, in front or behind the rail tie plates 10, to detect and determine the presence and/or orientation of each rail tie plate 10.

As shown in FIGS. 25, 26, 27, and 28, multiple streams or accumulation slides 616 and 617 are connected to the elevation conveyor 610 by the first and second curved guide chutes 612 and 613. The sensors 654 may be utilized to control the router 614 to direct tie plates through either the first or second curved guide chutes 612 or 613 and then to accumulation slides 616 and 617 respectively. The router 614 includes a guide panel assembly 657 which is selectively positionable between a first orientation that guides or directs rail tie plates 10 exiting the elevation conveyor 610 through the first curved guide chute 612 and onto the upper accumulation slide 616 and a second orientation that guides or allows the rail tie plates 10 to advance out of the first curved guide chute 612 and into and through the second curved guide chute 613 and then to the lower accumulation slide 617.

The router 614 includes the guide panel assembly 657 fixedly secured at one end to a rotatable shaft 664 which is rotatably mounted on a routing assembly support frame 665. A linear actuator, such as pneumatic cylinder 667, is connected between the routing assembly support frame 665 and a lever arm 668 projecting outward from the rotatable shaft 664. Extension of the linear actuator 667 pivots the guide panel assembly 657 to the first orientation and retraction of the linear actuator 667 pivots the guide panel assembly 657 to the second orientation. The pneumatic cylinder 667 is communicably connected to the controller. The controller determines and controls which accumulation slide 616 and 617 each rail tie plate 10 advances onto based on information from the sensors 654 or from other input information or sensors.

The guide panel assembly 657 includes an upper bridge plate 681 and a lower or inner deflecting panel 682 welded to or otherwise mounted on panel supports 696 secured on the rotatable shaft 664. A width of the upper bridge plate 681 is slightly greater than the width of the rail tie plates 10 so that when the bridge plate 681 and guide panel assembly 657 are in the second position, tie plates 10 may slide across the bridge plate 681 and a length of the bridge plate 681 allows the bridge plate 681 to span a gap between the first curved guide chute 612 and the second curved guide chute 613 so that tie plates advancing across the bridge plate 681 slide into an entry 698 of the second guided curve chute 613 to the lower accumulation slide 617.

The first curved guide chute 612 is formed from and includes a first curved member or inner panel 710 that extends from the distal end 633 of the elevation conveyor run 636 and curves downward and back under an entry 699 of the first curved guide chute 612. Side walls 711 enclose each side of the first curved guide chute 612 and extend between the first curved inner panel 710 and a first top cover 712 that extends over the upper portion of the first curved inner panel 710. First guide rails 722 extend in spaced relation below the first curved inner panel 710 between an entry 724 of the accumulation slide 616 and the lower end of the inner deflecting panel 682.

As best shown in FIG. 33, when the guide panel assembly 657 is selectively raised by the controller, the distal end of the bridge plate 681 extends in closely spaced relation to an inner surface of the first top cover 712. A rail tie plate 10 advancing off of the distal end 633 of the elevation conveyor run 636 advances or slides on the first curved inner panel 710 and, through gravity and centrifugal force, advances through the first guide chute 612 and onto the first guide rails 722 with the first top cover 712 and raised deflecting panel 682 of the guide panel assembly 657 restraining the advancement of the tie plate 10 within the chute 612. As the rail tie plate 10 advances around the first curved inner panel 710 and onto the guide rails 722, the rail tie plate 10 turns over or flips such that the shoulders 15 and 16 face downward as the first tie plate 10 approaches the accumulation slide 616.

The first curved guide chute 612 and the second curved guide chute 613 are formed similarly. The second curved guide chute 613 is offset to the outside and slightly lower than the first curved guide chute 612. The second curved guide chute 613 includes a second curved member or inner panel 730 that extends from proximate pivot shaft 664 of the guide panel assembly 657 and curves downward and back under an entry 698 of the second curved guide chute 613. Second side walls 732 enclose each side of the second curved guide chute 613 and extend between the second curved inner panel 730 to a second top cover 734 and to second guide rails 736. The second side walls 732 and the second guide rails 736 extend to an entry 740 of the accumulation slide 617.

As best shown in FIG. 32, when the guide panel assembly 657 is selectively lowered by the controller, the bridge plate 681 spans a gap between the first curved inner panel 710 and the second curved inner panel 730 so that a rail tie plate 10 advances or slides from the entry 698 of the first curved guide chute 612 into the entry 731 of the second curved guide chute 613. The guide panel assembly 657 connects the entry 699 of the first curved guide chute 612 with the entry 698 of the second curved guide chute 613. Rail tie plates advance or slide over and across the bridge plate 681 of the guide panel assembly 657 onto the second inner curved inner panel 730 and, through gravity and centrifugal force, advance through the second curved guide chute 613 to the second guide rails 736 that begin within the second curved guide chute 613 and extend inward from the second side walls 732. As the rail tie plate 10 advances around the second inner curved inner panel 730 and onto the second guide rails 736, the rail tie plate 10 turns over or flips such that the shoulders 15 and 16 face downward as the rail tie plate 10 approaches the accumulation slide 617.

The first curved guide chute 612, the second curved guide chute 613, and the accumulation slides 616 and 617 are supported by the accumulation slide frame 665 mounted on the trailer platform 67 on the trailer frame 27. The accumulation slides 616 and 617 extend from the curved guide chutes 612 and 613 to proximate the track bed relative to which the rail tie plates 10 are to be distributed. The accumulation slides 616 and 617 may be positioned to extend to and distribute rail tie plates 10 to different areas, such as on opposite sides of a track, or may be positioned to extend to and distribute rail tie plates 10 to similar areas, such as on the same side of the track. The accumulation slides 616 and 617 may be straight or curved to accommodate the trailer platform 67 and/or the trailer frame 27 and to distribute the rail tie plates 10 to a desired area. The trailer platform 67 may also include at least one opening to accommodate the orientation or direction of the accumulation slides 616 and 617 extending to the area of distribution.

In one embodiment, a first gap 744 is positioned between the first curved guide chute 612 and the accumulation slide 616, and a second gap 746 is positioned between the second curved guide chute 613 and the accumulation slide 617. The rail tie plates 10 that are not positioned laterally across the guide rails 722 and 736 fall between the guide rails 722 and 736 at the gaps 744 and 746 and exit the distribution assembly 320 prior to the accumulation slides 616 and 617. The accumulation slide 617 may include a slide cover 750 that extends from the second curved inner panel 730 and covers the accumulation slide 617 where the rail tie plates 10 falling through the first gap 744 may impact or interfere with the rail tie plates 10 advancing or sliding on the accumulation slide 617.

In one embodiment of the rail tie plate distribution assembly 320, the elevation conveyor 610 advances rail tie plates 10 to the first curved guide chute 612 connected to the accumulation slide 616 positioned to distribute rail tie plates 10, without the second curved guide chute 613, guide panel assembly 657 or the accumulation slide 617.

In the embodiment shown, accumulation slides 616 and 617 have similar or equivalent features and the following description, although described relative to accumulation slide 616, is applicable to both sides. Slide walls 752 extend on both sides of the accumulation slide 616 from the end of the side walls 711 of the curved guide chute 612 to the end of the accumulation slide 616. The guide rails 722 continue to extend inward from each slide wall 752 and may be formed on or fastened to the slide wall 752. In one embodiment, the rail tie plate 10 advances down the accumulation slide 616, by gravity, on the guide rails 722. In another embodiment, a slide platform (not shown), that may be a solid surface, may be positioned extending between the guide rails 722 and the rail tie plates 10 may advance down the accumulation slide 616 on the slide platform.

The dealer assembly 618 may be connected to the accumulation slide 616 proximate an end thereof as shown in FIGS. 29, 30 and 31. The dealer assembly 618 shown includes a mechanical actuator 760, such as a hydraulic cylinder, and a carriage assembly 762 that is actuated to raise or lower a roller 766 within the accumulation slide 616 to control the advancement and/or stoppage of the rail tie plates 10 to the final orienting discharge assembly 620.

The actuator 760 is secured to an actuator support frame 772 that extends above and is secured to the accumulation slide 616. As shown in the figures, the carriage assembly 762 includes two L-shaped carriage levers 773, each having a vertical leg and a horizontal leg, that extend along the outside of the actuation slide 616 and are connected by a connecting brace 774 above the accumulation slide 616 and a base plate 775 fixed to the bottoms of the carriage levers 773 under the accumulation slide 616. A hinge 781 rotatably joins the actuator 760 to the connecting brace 774 of the carriage assembly 762. In a vertical plane that extends through the hinge 781, a carriage rod 778 is rotatably joined to corners of the carriage levers 773 where the vertical leg and the horizontal leg intersect. The carriage rod 778 is rotatably fixed to and extends through projections 779 secured to the bottom of the accumulation slide 616, such that when the actuator 760 is retracted or extended horizontally, the carriage assembly 762 rotates about the longitudinal axis of the carriage rod 778. The rotation of the carriage assembly 762 rotates a distal end of the carriage assembly that is joined to a plate stop 776 and the roller 766. The distal end of the carriage assembly 762 may either be in an upward position, such that the rail tie plates 10 are stopped behind the elevated plate stop 776 or behind stopped rail tie plates 10, or in a downward position, such that the a top of the plate stop 776 is lowered below or level with the top of the guide rails 722, and the rail tie plates 10 are advanced over the roller 766 and through the dealer assembly 618.

When the actuator 760 is in a first or retracted position, the carriage assembly 762 is rotated rearward such that the roller 766 is raised to a first or upward position and the rail tie plates 10 accumulate along the accumulation slide 616 behind the plate stop 776 or behind the rail tie plates 10 that are stopped. When the actuator 760 is extended to a second or extended position, the carriage assembly 762 is rotated forward such that the plate stop 776 and the roller 766 lower to a second or downward position, which lowers the top of the plate stop 776 to at least even with a top of the guide rails 722 such that the rail tie plates 10 are able to slide over the plate stop 776 and the roller 766. The rail tie plates 10 then advance over multiple rollers 780 in descending positions. The rollers 766 and 780 assist in accelerating and advancing each rail tie plate toward the final orienting discharge assembly 620. In one embodiment, the rail tie plates 10 accumulate behind the plate stop 776 and the controller advances one rail tie plate 10 at a time over the plate stop 776 at a desired spacing to the final orienting discharge assembly 620.

Actuation of the carriage assembly 762 may be controlled by the controller which uses data from an encoder (not shown) or sensors, including data regarding the distribution of the rail tie plates 10 to the track, information regarding the accumulation of the rail tie plates 10 behind the plate stop 776 and/or the advancement of the rail tie plates 10 through the plate stop 776. The encoder may be positioned on one of the rail wheels 32 to record a signal at intervals in the track. In addition, the controller may slow down or pause the rail tie plate distribution machine 20 depending on this data or other factors.

The final orienting discharge assembly 620 may vary depending upon the desired application or orientation of the rail tie plates 10. In the embodiment shown in the figures, each rail tie plate 10 is advanced from the multiple rollers 780 of the dealer assembly 618 to a discharge run 782. The slide walls 752 extend past the discharge run 782 to an end wall 784. Formed between the end of the discharge run 782, the slide walls 752 and the end wall 784 is a rail tie plate drop space 790 through which the rail tie plates 10 fall. The drop space 790 is just larger than a rail tie plate 10. A container or bin 792 captures or catches the rail tie plates 10 as they fall through or advance off the discharge run 782, the bin 792 may be adjustably and rotatably positioned as understood by one skilled in the art, depending upon a type and direction of connectors, to direct the rail tie plate 10 to a desired location and in a desired orientation. In one embodiment, the bin 792 has a rectangular base 794 just larger than a rail tie plate 10, walls 796 extending from three sides of the rectangular base 794, and an opening 798 on one side of the base 794 for the rail tie plate 10 to slide from the bin 792. The wall 796 opposite the opening 798 of the bin 792 is rotatably connected to one of the slide walls 752 or the end wall 784, such that the bin 792 is angled downward toward the opening 798. In the embodiment shown, two corner or L-shaped brackets 800 are fixed to the outside of the bin 792 extending around the base 794 and the wall 796 opposite the opening 798. Legs 802 of the L-shaped brackets 800 include apertures with a shaft 804 extending therethrough and through corresponding apertures on a mounting or U-shaped bracket 810 fastened to one of the slide walls 752 or the end wall 784, such that bin 792 is positioned to catch and advance the rail tie plate 10 to the desired location.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

The invention claimed is:

1. A rail tie plate singulating machine for singulating a plurality of rail tie plates comprising:
a singulating conveyor having a singulating conveyor run extending from a singulating conveyor distal end to a singulating conveyor outlet end, the singulating conveyor having a singulating conveyor inner edge;
a singulating guide extending in spaced relation above the singulating conveyor run in a spacing less than a height of a rail tie plate supported on the singulating conveyor run, the singulating guide having a first portion extending from an outer side of the singulating conveyor in a direction of conveyance of the singulating conveyor run toward the outlet end of the singulating conveyor and toward the singulating conveyor inner edge, a second portion of the singulating guide extending parallel to and spaced outward from the singulating conveyor inner edge to form a reduced width conveying section on the singulating conveyor run extending from the first portion of the singulating guide toward the distal end of the singulating conveyor, the reduced width conveying section having a width approximately equal to or narrower than a width of a rail tie plate, wherein at least some of the rail tie plates advanced onto the singulating conveyor toward the singulating conveyor distal end are guided by the singulating guide into longitudinal alignment on the reduced width conveying section and rail ties which are not advanced into longitudinal alignment with the reduced width conveying section are advanced off of the singulating conveyor across the inner edge thereof; and
redirecting means supported over the reduced width conveying section for engaging a rail tie plate supported on top of another rail tie plate advancing longitudinally along the reduced width conveying section and advancing the rail tie plate laterally off of the singulating conveyor across the inner edge thereof.

2. The rail tie plate singulating machine as in claim 1 wherein the width of the reduced width conveying section on the singulating conveyor is greater than half the width of one of the rail tie plates advanced longitudinally along the reduced width conveying section.

3. The rail tie plate singulating machine as in claim 1 wherein the redirecting means comprises a driven roller having a lower periphery rotating transverse to the singulating conveyor run along the reduced width conveying section.

4. The rail tie plate singulating machine as in claim 3 wherein the driven roller is mounted on the rail tie plate singulating machine so that the lower periphery of the driven roller is spaced above the singulating conveyor a height which is slightly greater than a height of a rail tie plate supported on the singulating conveyor with a bottom of the rail tie plate supported generally flush on an upper surface of the singulating conveyor.

5. The rail tie plate singulating machine as in claim 3 wherein an axis of rotation of the driven roller extends in a vertical plane extending parallel to a direction of conveyance of the singulating conveyor and the axis of rotation of the driven roller is angled upward at an acute angle in a direction opposite the direction of conveyance of the singulating conveyor.

6. The rail tie plate singulating machine as in claim 3 further comprising a tie plate deflector mounted above the singulating conveyor upstream of the driven roller and extending from the first section of the singulating guide toward the inner edge of the singulating conveyor and wherein a lower edge of the tie plate deflector extends above the singulating conveyor run a distance shorter than the width of a rail tie plate so that the tie plate deflector is operable to knock down a tie plate standing on an edge of the tie plate.

7. The rail tie plate singulating machine as in claim 1 further comprising:
   a lift conveyor having a lift conveyor run sloping upward from a lift conveyor inlet end toward a lift conveyor distal end, the lift conveyor extending adjacent the singulating conveyor with a lift conveyor adjacent edge extending longitudinally adjacent the singulating conveyor inner edge, the lift conveyor run extending below the singulating conveyor run from the lift conveyor inlet end to a y-axis intercept between the lift conveyor run and the singulating conveyor run and the lift conveyor run extending at least level with or above the singulating conveyor run from the y-axis intercept to the lift conveyor distal end; and
   a conveyor transfer guide extending in spaced relation above the lift conveyor run in a spacing less than a height of a rail tie plate supported on the lift conveyor run and the conveyor transfer guide extending from a first position spaced laterally away from the lift conveyor adjacent edge, and proximate or past the y-axis intercept, toward the lift conveyor adjacent edge and toward the distal end of the lift conveyor such that at least some of the plurality of rail tie plates advanced up the lift conveyor run engage the conveyor transfer guide and are guided laterally toward and onto the singulating conveyor run past the y-axis intercept in a direction of conveyance of the lift conveyor run; wherein
   rail tie plates which are advanced off of the singulating conveyor, across the inner edge thereof, fall onto the lift conveyor.

8. The rail tie plate singulating machine as in claim 7 wherein the redirecting means comprises a driven roller having a lower periphery rotating transverse to the singulating conveyor run along the reduced width conveying section and toward the lift conveyor.

9. The rail tie plate singulating machine as in claim 8 wherein the driven roller is mounted on the rail tie plate singulating machine so that the lower periphery of the driven roller is spaced above the singulating conveyor a height which is slightly greater than a height of a rail tie plate supported on the singulating conveyor with a bottom of the rail tie plate supported generally flush on an upper surface of the singulating conveyor.

10. The rail tie plate singulating machine as in claim 8 wherein an axis of rotation of the driven roller extends in a vertical plane extending parallel to a direction of conveyance of the singulating conveyor and the axis of rotation of the driven roller is angled upward at an acute angle in a direction opposite the direction of conveyance of the singulating conveyor.

11. The rail tie plate singulating machine as in claim 8 further comprising a tie plate deflector mounted above the singulating conveyor upstream of the driven roller and extending from the first section of the singulating guide toward the inner edge of the singulating conveyor and wherein a lower edge of the tie plate deflector extends above the singulating conveyor run a distance shorter than the width of a rail tie plate so that the tie plate deflector is operable to knock down a tie plate standing on an edge of the tie plate.

12. The rail tie plate singulating machine as in claim 7 further comprising:
   a bin sized to receive and hold a plurality of rail tie plates and mounted on the rail tie plate singulating machine proximate the distal end of the lift conveyor;
   a feed conveyor extending above the lift conveyor run and extending from proximate the bin toward an inlet end of the lift conveyor; and
   a magnetic crane pivotably mounted proximate the bin and operable to lift a plurality of rail tie plates from the bin and release the plurality of rail tie plates onto the feed conveyor proximate the lift conveyor distal end;
   wherein the plurality of rail tie plates released onto the feed conveyor are conveyed by the feed conveyor to an outlet end of the feed conveyor where the plurality of rail tie plates fall onto the lift conveyor proximate the lift conveyor inlet end.

13. The rail tie plate singulating machine as in claim 7 wherein the rail tie plate singulating machine is supported on flanged wheels for movement on a railroad track having a pair of rails.

14. A rail tie plate singulating machine for singulating a plurality of rail tie plates comprising:
   a singulating conveyor having a singulating conveyor run extending from a singulating conveyor distal end to a singulating conveyor outlet end, the singulating conveyor having a singulating conveyor inner edge;
   a singulating guide extending in spaced relation above the singulating conveyor run in a spacing less than a height of a rail tie plate supported on the singulating conveyor run, the singulating guide having a first portion extending from an outer side of the singulating conveyor in a direction of conveyance of the singulating run toward the outlet end of the singulating conveyor and toward the singulating conveyor inner edge, a second portion of the singulating guide extending parallel to and spaced outward from the singulating conveyor inner edge a distance approximately equal to or narrower than a width of a rail tie plate to form a reduced width conveying section on the singulating conveyor run and the second portion of the singulating guide extending toward the outlet end of the singulating conveyor, wherein at least some of the rail tie plates advanced onto the singulating conveyor toward the singulating conveyor distal end are guided by the singulating guide into longitudinal alignment on the reduced width conveying section and rail ties which are not advanced into longitudinal alignment with the reduced width conveying section are advanced off of the singulating conveyor; and a driven roller supported over the reduced width conveying section and having a lower periphery rotating transverse to the singulating conveyor run along the reduced width conveying section wherein the lower periphery of the driven roller is spaced above the singulating conveyor a height which is slightly greater than a height of a rail tie plate supported on the singulating conveyor with a bottom of the rail tie plate supported generally flush on an upper surface of the singulating conveyor such that the lower periphery of the driven roller engages a second rail tie plate supported on top of a first rail tie plate advancing longitudinally along the reduced width conveying section to advance the second rail tie plate engaged by the lower periphery of the driven roller laterally off of the singulating conveyor.

15. The rail tie plate singulating machine as in claim 14 wherein an axis of rotation of the driven roller extends in a vertical plane extending parallel to a direction of conveyance of the singulating conveyor and the axis of rotation of the driven roller is angled upward at an acute angle in a direction opposite the direction of conveyance of the singulating conveyor.

16. The rail tie plate singulating machine as in claim 14 further comprising a tie plate deflector mounted above the singulating conveyor upstream of the driven roller and extending from the first section of the singulating guide toward the inner edge of the singulating conveyor and wherein a lower edge of the tie plate deflector extends above the singulating conveyor run a distance shorter than the width of a rail tie plate so that the tie plate deflector is operable to knock down a tie plate standing on an edge of the tie plate.

17. The rail tie plate singulating machine as in claim 14 further comprising:

a lift conveyor having a lift conveyor run sloping upward from a lift conveyor inlet end toward a lift conveyor distal end, the lift conveyor extending adjacent the singulating conveyor with a lift conveyor adjacent edge extending longitudinally adjacent the singulating conveyor inner edge, the lift conveyor run extending below the singulating conveyor run from the lift conveyor inlet end to a y-axis intercept between the lift conveyor run and the singulating conveyor run and the lift conveyor run extending at least level with or above the singulating conveyor run from the y-axis intercept to the lift conveyor distal end; and a conveyor transfer guide extending in spaced relation above the lift conveyor run in a spacing less than a height of a rail tie plate supported on the lift conveyor run and the conveyor transfer guide extending from a first position spaced inward from the lift conveyor adjacent edge, and proximate or past the y-axis intercept, toward the lift conveyor adjacent edge and toward the distal end of the lift conveyor such that at least some of the plurality of rail tie plates advanced up the lift conveyor run engage the conveyor transfer guide and are guided laterally toward and onto the singulating conveyor run past the y-axis intercept in a direction of conveyance of the lift conveyor run; wherein rail tie plates which are advanced off of the singulating conveyor, because the rail tie plates are not advanced into longitudinal alignment with the reduced width conveying section or by the driven roller, fall onto the lift conveyor.

18. A rail tie plate singulating machine for singulating a plurality of rail tie plates comprising:

a lift conveyor having a lift conveyor run sloping upward from a lift conveyor inlet end toward a lift conveyor distal end, the lift conveyor having first and second outer edges;

a first singulating conveyor extending adjacent the first outer edge of the lift conveyor and having a first singulating conveyor run extending from a first singulating conveyor distal end to a first singulating conveyor outlet end, the first singulating conveyor having a first singulating conveyor inner edge extending longitudinally adjacent the first outer edge of the lift conveyor;

a second singulating conveyor extending adjacent the second outer edge of the lift conveyor and having a second singulating conveyor run extending from a second singulating conveyor distal end to a second singulating conveyor outlet end, the second singulating conveyor having a second singulating conveyor inner edge extending longitudinally adjacent the second outer edge of the lift conveyor;

the lift conveyor run extending below the first and second singulating conveyor runs from the lift conveyor inlet end to a y-axis intercept between the lift conveyor run and the first and second singulating conveyor runs and the lift conveyor run extending at least level with or above the first and second singulating conveyor runs from the y-axis intercept to the distal ends of the first and second singulating conveyors;

a first conveyor transfer guide extending in spaced relation above the lift conveyor run in a spacing less than a height of a rail tie plate supported on the lift conveyor run and the first conveyor transfer guide extending from a first position spaced inward from the first outer edge of the lift conveyor, and proximate or past the y-axis intercept, toward the first outer edge of the lift conveyor and toward the distal end of the lift conveyor such that at least some of the rail tie plates advanced up the lift conveyor run engage the first conveyor transfer guide and are guided laterally toward and onto the first singulating conveyor run past the y-axis intercept;

a second conveyor transfer guide extending in spaced relation above the lift conveyor run in a spacing less than the height of a rail tie plate supported on the first conveyor run and the second conveyor transfer guide extending from a first position spaced inward from the second outer edge of the lift conveyor, and proximate or past the y-axis intercept, toward the second outer edge of the lift conveyor and toward the distal end of the lift conveyor such that at least some of the rail tie plates advanced up the lift conveyor run engage the second conveyor transfer guide and are guided laterally toward and onto the second singulating conveyor run past the y-axis intercept;

a first singulating guide extending in spaced relation above the first singulating conveyor run in a spacing less than the height of a rail tie plate supported on the first singulating conveyor run, the first singulating guide having a first section extending from an outer side of the first singulating conveyor and past the y-axis intercept in a direction of conveyance of the first singulating conveyor run toward the outlet end of the first singulating conveyor and toward the first singulating conveyor inner edge, a second end of the first section of the first singulating guide terminating proximate a second section of the first singulating guide, the second section of the first singulating guide extending parallel to and spaced outward from the first singulating conveyor inner edge a distance approximately equal to or narrower than a width of a rail tie plate to form a first reduced width conveying section on the first singulating conveyor run and the second section of the first singulating guide extending toward the outlet end of the first singulating conveyor, wherein at least some of the rail tie plates advanced onto the first singulating conveyor from the lift conveyor are guided by the first singulating guide into longitudinal alignment on the first reduced width conveying section and rail ties which are not advanced into longitudinal alignment on the first reduced width conveying section are advanced off of the first singulating conveyor past the y-axis intercept in the conveying direction and fall onto the lift conveyor;

first redirecting means supported over the first reduced width conveying section for engaging a rail tie plate supported on top of another rail tie plate advancing longitudinally along the first reduced width conveying section and advancing the rail tie plate laterally towards and onto the lift conveyor;

a second singulating guide extending in spaced relation above the second singulating conveyor run in a spacing less than the height of a rail tie plate supported on the second singulating conveyor run, the second singulating guide having a first section extending from an outer side of the second singulating conveyor and past the y-axis intercept in a direction of conveyance of the second singulating conveyor run toward the outlet end of the second singulating conveyor and toward the second singulating conveyor inner edge, a second end of the first section of the second singulating guide terminating proximate a second section of the second singulating guide, the second section of the second singulating guide extending parallel to and spaced outward from the second singulating conveyor inner edge a distance approximately equal to or narrower than a width of a rail tie plate to form a second reduced width conveying section on the second singulating conveyor run and the second section of the second singulating guide extending toward the outlet end of the second singulating conveyor, wherein at least some of the rail tie plates advanced onto the second singulating conveyor from the lift conveyor are guided by the second singulating guide into longitudinal alignment on the second reduced width conveying section and rail ties which are not advanced into longitudinal alignment on the second reduced width conveying section are advanced off or fall off of the second singulating conveyor past the y-axis intercept in the conveying direction and fall onto the lift conveyor; and second redirecting means supported over the second reduced width conveying section for engaging a rail tie plate supported on top of another rail tie plate advancing longitudinally along the second reduced width conveying section for advancing the rail tie plate laterally towards and onto the lift conveyor.

* * * * *